United States Patent [19]

Maruyama

[11] Patent Number: 6,118,597
[45] Date of Patent: Sep. 12, 2000

[54] CHROMATIC ABERRATION CORRECTING ELEMENT AND ITS APPLICATION

[75] Inventor: Koichi Maruyama, Tokyo, Japan

[73] Assignee: Asahi Kogak Kogyo Kabushiki Kaisha, Tokyo, Japan

[21] Appl. No.: 09/190,365

[22] Filed: Nov. 12, 1998

Related U.S. Application Data

[62] Division of application No. 08/386,091, Feb. 9, 1995, Pat. No. 5,914,822, which is a division of application No. 08/091,983, Jul. 16, 1993, Pat. No. 5,629,799.

[30] Foreign Application Priority Data

| Jul. 16, 1992 | [JP] | Japan | 4-189474 |
| Dec. 21, 1992 | [JP] | Japan | 4-340562 |
| Dec. 28, 1992 | [JP] | Japan | 4-348593 |
| Jan. 14, 1993 | [JP] | Japan | 5-004958 |
| Mar. 25, 1993 | [JP] | Japan | 5-066504 |
| Jun. 10, 1993 | [JP] | Japan | 5-138300 |
| Jun. 10, 1993 | [JP] | Japan | 5-138301 |
| Jun. 10, 1993 | [JP] | Japan | 5-138302 |
| Jun. 25, 1993 | [JP] | Japan | 5-155074 |

[51] Int. Cl.[7] ............................ G02B 03/08; G02B 27/44
[52] U.S. Cl. ................................. 359/743; 359/565
[58] Field of Search ................................ 359/743, 565

[56] References Cited

U.S. PATENT DOCUMENTS

| 4,932,763 | 6/1990 | Matsuoka | 359/708 |
| 4,936,665 | 6/1990 | Whitney | 359/565 |
| 4,973,832 | 11/1990 | Marchant et al. | 250/201.5 |
| 4,995,715 | 2/1991 | Cohen | 351/161 |
| 5,078,513 | 1/1992 | Spaulding et al. | 385/14 |
| 5,116,111 | 5/1992 | Simpson et al. | 351/161 |
| 5,129,718 | 7/1992 | Futhey et al. | 351/161 |
| 5,148,314 | 9/1992 | Chen | 359/642 |
| 5,152,788 | 10/1992 | Isaacson et al. | 623/6 |
| 5,153,778 | 10/1992 | Sasian-Alvarado | 359/742 |
| 5,161,040 | 11/1992 | Yokoyama et al. | 359/19 |
| 5,173,809 | 12/1992 | Iwaki et al. | 359/784 |
| 5,227,915 | 7/1993 | Grossinger et al. | 359/565 |
| 5,257,133 | 10/1993 | Chen | 359/565 |
| 5,260,828 | 11/1993 | Londono et al. | 359/565 |
| 5,299,062 | 3/1994 | Ogata | 359/571 |
| 5,349,471 | 9/1994 | Morris et al. | 359/565 |

FOREIGN PATENT DOCUMENTS

| 59-26714 | 2/1984 | Japan . |
| 2-195317 | 8/1990 | Japan . |
| 3-155514 | 7/1991 | Japan . |
| 3-155515 | 7/1991 | Japan . |
| 4-234014 | 8/1992 | Japan . |

OTHER PUBLICATIONS

Stone et al., "Hybrid diffractive–refractive lenses and achromats,"*Applied Optics,* V27, N14, Jul. 15, 1988, pp.2760—71.

Sasian et al., "Staircase lens: a binary and diffractive field curvature corrector, "*Applied Optics,* V32, N1, Jan. 1, 1993 pp. 60–66.

Southwell, W., "Ray tracing kinoform lens surfaces,"*Applied Optics,* V321, N13, May 1, 1992, pp. 2244—47.

(List continued on next page.)

*Primary Examiner*—Georgia Epps
*Assistant Examiner*—Ricky Mack
*Attorney, Agent, or Firm*—Sughrue, Mion, Zinn, Macpeak & Seas, PLLC

[57] ABSTRACT

A chromatic aberration correcting element that is a simple lens having at least one aspheric surface, the radius of curvature of which increases from the optical axis toward the periphery. At least one of the surfaces is formed as a diffraction lens surface that consists of annular segments that shift discretely in a direction in which the lens thickness increases as a function of the distance from the optical axis. Also disclosed is a chromatic aberration correcting device having annular segments formed in steps on either a light entrance face or a light exit face or both. The annular segments are composed of planes perpendicular to and concentric with the optical axis.

3 Claims, 29 Drawing Sheets

OTHER PUBLICATIONS

English translation of Japanese Document entitled, "Unconventional Lens for Image Forming Hybrid Achromatic Lens Using Binary Optical Elements, " Nobuo Nishida, Opt. Elect. Laboratory, NEC., Feb. 1993.

Londono et al., "The design of achromatized hybrid diffractive lens systems,"*International Lens Design Conference 1990*, SPIE, V1354, pp. 30–37.

Londono et al., "Modeling diffraction efficiency effects when designing hybrid diffractive lens systems,"*Applied Optics,* V31, N13, May 1, 1992, pp. 2248–52.

Wood, A., "Design of infrared hybrid refractive–diffractive lenses," *Applied Optics,* V31, N13, May 1, 1992, pp. 2253–58.

Southwell, W., "Binary Optics from a Raytracting Point of View, "*International Lens Design Conference 1990,* pp. 38–42.

Kubalak et al., "Hybrid Achromatic Objective Lens Design for Optical Data Storage, " ISOM, Dec. 1993, pp. 176–77.

WAVEFRONT 101  102  103

CHROMATIC ABERRATION CORRECTING ELEMENT AND ITS APPLICATION

This is a divisional of Application No. 08/386,091 filed Feb. 5, 1995, now U.S. Pat. No. 5,914,822, which is a divisional of Application No. 08/091,983 filed Jul. 16, 1993, now U.S. Pat. No. 5,629,799, the disclosure of which is incorporated herein by reference.

BACKGROUND OF THE INVENTION

The present invention relates to a lens that is capable of correcting chromatic aberration by itself. Also, the present invention relates to a device for correcting the chromatic aberration inherent in optical system. More particularly, the present invention relates to a chromatic aberration correcting device that is intended for use in combination with a single aspheric lens that is corrected for aberrations other than chromatic ones.

The use of a single objective lens having an aspheric surface on both sides has expanded these days in the art of optical disks and one of the principal reasons for this use is its contribution to weight reduction. However, the single lens in conventional use has been incapable of effective correction of chromatic aberration. A laser diode which is used as a light source for optical disks has the disadvantage that its emission wavelength is shifted on account of the change either in the output power of the laser or in the temperature. Hence, if the objective lens is not corrected for chromatic aberration, the focusing position of light rays will change in response to the shift in wavelength and this can cause errors when reading or writing information.

To solve this problem, the present inventors previously proposed chromatic aberration correcting devices that had two or three glass lens elements cemented together (see Japanese Patent Public Disclosure Nos. Hei 3-155514 and 3-155515). By combining either one of these chromatic correcting devices with a single aspheric lens, one could offer a lens system that was immune to the effect of wavelength variations, requiring less lens elements than the conventional system that is effectively corrected for chromatic aberration.

However, the techniques proposed in the two patents cited above suffer from the disadvantage that in order to correct chromatic aberration, it is necessary to provide a device that is not directly concerned with the focusing action inherent in the objective lens. Therefore, optical system that is properly corrected for chromatic aberration weighs more and requires more parts than optical system that is not corrected.

The conventional chromatic aberration correcting device has had the problem that its manufacturing cost is so high as to cancel the advantage of lower cost that results from the use of a single aspheric lens, whereby the net benefit is reduced to nil.

The present invention has been accomplished under these circumstances and has as an object providing a lens that utilizes diffraction effect so as to correct chromatic aberration effectively without unduly increasing the number of lens elements.

The present invention has been accomplished under these circumstances and has as an object providing a chromatic aberration correcting device that can be manufactured at a lower cost than devices that consist of two or three glass plates cemented together.

SUMMARY OF THE INVENTION

In order to meet the above-described requirement, according to the present invention, there is provided a single chromatic aberration correcting lens that is a single lens having at least one aspheric surface the radius of curvature of which increases from the optical axis toward the periphery, at least either one of the surfaces being formed as a diffractive lens surface that consists of annular segments in steps that are shifted discretely in a direction in which the lens thickness increases as a function of the distance from the optical axis.

The single chromatic aberration correcting lens satisfies the following condition:

$$0.8 \leq t(n-1)/\lambda_0 \leq 10$$

where $\lambda_0$: arbitrary wavelength in the operating wavelength;
t: the amount of axial shift of each annular segment (difference in height between adjacent steps);
n: the refractive index of the medium of which the lens is made.

The diffractive lens surface is provided by the surface closer to the far conjugate point whereas a continuous aspheric surface is provided by the surface closer to the near conjugate point, the diffractive lens surface being formed in steps as annular segments that are shifted discretely on a pitch that is substantially in inverse proportion to the square of the height from the optical axis.

The correcting lens according to the present invention may be provided in the optical system of an optical information recording and reproducing apparatus and which functions as an objective lens that causes incident parallel rays of light coming from the side closer to the far conjugate point to be focused on an optical recording medium.

Alternativelly, the diffractive lens surface is provided by the surface closer to the near conjugate point whereas a continuous aspheric surface is provided by the surface closer to the far conjugate point, the diffractive lens surface being formed in steps as annular segments that are shifted discretely on a pitch that is substantially in inverse proportion to the square of the height from the optical axis.

According to another aspect of the invention, there is provided a chromatic aberration correcting device having annular segments formed in steps on either a light entrance face or a light exit surface or both, the annular segments being composed of planes perpendicular to and concentric with the optical axis.

The shift amount in the optical direction of adjacent annular zone t of the planes defined by the following condition:

$$t = m\lambda_0/(n-1)$$

where m is an integer, n is the refractive index, and $\lambda 10$ is an arbitrary wavelength in the operating wavelength range.

The surface on which the step-like annular segments are formed is macroscopically a concave surface.

Alternatively, the surface on which the step-like annular segments are formed is macroscopically a convex surface.

According to the invention, in an optical information recording and reproducing apparatus that allows beams of light from a light source to be focused on an information recording medium by means of an objective lens so as to record or reproduce information, the improvement wherein a chromatic aberration correcting device is provided in the optical path between the light source and the objective lens, the chromatic aberration correcting device having annular segments formed in steps on either a light entrance surface or a light exit surface or both, the annular segments being composed of planes perpendicular to and concentric with the optical axis.

According to another aspect of the invention, in a chromatic aberration correcting device of a diffraction type that has annular segments formed in steps on either a light entrance surface or a light exit surface or both, the annular segments being composed of planes perpendicular and concentric with the optical axis, the improvement wherein the base curve which is a macroscopic curvature of the planes formed in steps is an aspheric surface the radius of curvature of which decreases in absolute value with the increasing distance from the optical axis and, when the axial displacement of the base curve at a point having distance h from the optical axis is written as $\Delta X(h)$, the displacement $\Delta X'(h)$ of the planes formed in steps at a point having distance h from the optical axis is given by equation (3B):

$$\Delta X'(h) = (m\lambda_0/(n-1))\text{Int}((\Delta X(h)/m\lambda_0/(n-1))+0.5) \quad (3B)$$

where m is an integer; n is the refractive index; $\lambda_0$ is the wavelength at which the chromatic aberration correcting device is used or an arbitrary wavelength within the operating wavelength range of the device; and Int(X) is a function giving an integer not greater than X.

The base curve is an aspheric surface resembling a spheroidal surface having a positive conic constant and, when the departure $\epsilon(h)$ from the spheroidal surface at a point having distance h from the optical axis is expressed by equation (1B), the base curve satisfies condition (4B) at all values of distance h within the effective maximum radius of passing beams of light:

$$\varepsilon(h) = \Delta X(h) - Ch^2 \Big/ \left(1 - \sqrt{1-(1+K)C^2h^2}\right) \quad (1B)$$

$$|\varepsilon(h)| < \lambda/(n-1) \quad (4B)$$

where C is the paraxial curvature; K is the conic constant; and $\lambda$ is the maximum operating wavelength.

Optical system for an optical information recording and reproducing apparatus comprises:

a light source;

an objective lens that causes beams of light from the light source to be focused on an optical recording medium; and a beam splitter by means of which the reflected light from the optical recording medium is isolated from the optical path of incident light beams;

the beam splitter having a surface that generates chromatic aberration which at least cancels the chromatic aberration that develops in the objective lens.

According to the present invention, optical system for an optical information recording and reproducing apparatus at least comprises:

a light source;

an optical path deflecting means that causes beams of light from the light source to be deflected toward an optical recording medium;

an objective lens that causes the deflected light beams to be focused on the optical recording medium;

a beam splitter by means of which the reflected light from the optical recording medium is isolated from the optical path of incident light beams;

the optical path deflecting means having a surface that generates chromatic aberration which at least cancels the chromatic aberration that develops in the objective lens.

According to the present invention, a chromatic aberration correcting device having at least one prism and annular planes concentric with the optical axis being formed in steps on at least one of the beam passing surfaces of the prism in such a way that the annular planes produce a macroscopically concave shape, chromatic aberration being generated by the step-like planes.

According to another aspect of the invention, a hybrid lens that comprises:

a glass lens having a refractive action; and a plastic diffraction element one surface of which is joined to the glass lens and the other surface of which is provided with a plurality of annular planes that are concentric with the optical axis and which are formed in steps in such a way that the lens thickness increases as a function of the distance from the optical axis.

The hybrid lens may further satisfy the following condition:

$$0.8 \leq t(n-1)/\lambda_0 \leq 10$$

where $\lambda_0$: arbitrary wavelength in the operating wavelength;

t: the axial difference in the thickness of the diffraction element between individual annular segments; and n: the refractive index of the medium of which the diffraction element is made.

According to still another aspect of the invention, there is provided a chromatic aberration correcting device of a reflection and diffraction type that has a reflecting surface comprising the central reflecting surface and a plurality of annular reflecting surfaces that are concentric with the central reflecting surface, the reflecting surfaces being such that the shapes of their orthogonal projections onto a plane perpendicular to the optical axis are characterized by rotation symmetry with respect to the optical axis serving as the center of rotation, the central reflecting surface, an annular reflecting surface just outward of the central reflecting surface and an adjacent annular reflecting surface being offset in position by the same step distance t in a direction perpendicular to those reflecting surfaces, so that when seen macroscopically, those reflecting surfaces provide a concave or a convex surface as a whole, the step distance t being specified in such a way that light entering as a plane wave at a reference wavelength will also emerge as a plane wave whereas light entering as a plane wave at a wavelength different from the reference wavelength will emerge as either a divergent or a convergent wavefront.

DETAILED DESCRIPTION OF THE PREFERRED EMBODIMENTS

Figure 1:
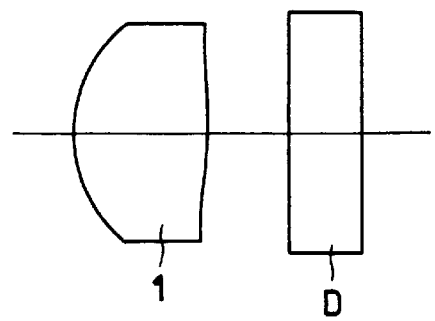
FIG. 1 shows schematically optical system in a case where the single chromatic aberration correcting lens according to Example 1 of the present invention is used as an objective lens of an infinite system in an optical disk apparatus.

Embodiments of the single chromatic aberration correcting lens according to the present invention are described below. First, let us describe the operating theory of the invention.

Suppose a thin lens having a focal length of f that is made from a material having a refractive index n which varies by $\Delta n$ in response to the change in wavelength. The change in the power of this lens $\Delta R$ in response to the change in wavelength is expressed by the following equation (1):

$$\Delta R = \Delta n / (f(n-1)) \qquad (1)$$

In the absence of a -material that has a sufficient refractive index n to make a lens and which yet experiences only a small index change $\Delta n$, no ordinary single lens having power is capable of suppressing the power change $\Delta R$ that occurs as a result of this change in wavelength.

Under the circumstances, the single chromatic aberration correcting lens of the present invention is adapted to form a diffractive lens surface on either one of the surfaces of a single lens in such a way that the diffractive action of that surface is effectively used to cancel the chromatic aberration that will develop on account of the refractive action of the single lens.

A diffractive lens may be available as either an amplitude diffraction or a phase diffractive lens depending upon the type of diffraction that occurs. From the viewpoint of efficient light utilization, a phase diffractive lens is desirably used. The phase diffractive lens is formed by providing a series of annular segments in steps that are planes perpendicular to and concentric with the optical axis.

If the refractive power of a lens is written as φR and if the power of a diffractive lens surface formed on one surface of that lens is written as φD, the composite power φT is expressed by the following equation (2):

$$\phi T = (HR/H1)\phi R + (HD/H1)\phi D \quad (2)$$

where H1: the height of a paraxial ray at which it enters the lens system;

HR: the height of the H1 incident paraxial ray at which it enters the refractive lens on the front principal point;

HD: the height of the Hi incident paraxial ray at which it enters the diffractive lens on the front principal point.

For the sake of simplicity, let each lens be assumed as a thin lens. Then, equation (2) can be rewritten as follows:

$$\phi T = \phi R + \phi D \quad (3)$$

With an ordinary refractive lens, the change in lens power ΔR that is caused by the index change Δn due to a variation in wavelength is expressed by equation (4):

$$\Delta R = \phi R(\Delta n/(n-1)) \quad (4)$$

where φR is the refractive power of the lens.

The power of a diffractive lens surface φD is calculated by taking the differential coefficient of second order of the optical pathlength difference (as caused by diffraction) with respect to the distance from the optical axis. Since the optical pathlength difference is proportional to wavelength, the power change ΔD due to the diffraction that occurs when the wavelength is shifted by Δλ from the design reference value $\lambda_0$ is expressed by the following equation (5):

$$\Delta D = (\Delta \lambda/\lambda_0)\phi D \quad (5)$$

Suppose here that a lens having a focal length of 10 mm that is to be operated with a laser diode emitting light at a reference wavelength ($\lambda_0$) of 780 nm with a shift (Δλ) of ±10 nm is fabricated from LAL 13 (trade name of Ohara Co., Ltd.; n780=1.68468; Δn=−0.000032). Equations (4) and (5) give the following values:

$$\Delta R = \phi R(\Delta n/(n-1)) = -4.67 \times 10^{-4} \cdot \phi R$$

$$\Delta D = \phi D(\Delta\lambda/\lambda_0) = 1.28 \times 10^{-2} \cdot \phi D$$

In order to suppress the variation in composite power due to the difference in wavelength, ΔR and ΔD may be so set that their sum is zero (ΔR+ΔD=0). In other words, a lens that is free from chromatic aberration at wavelengths near the reference value 780 nm can be fabricated by satisfying the following condition (7):

$$\phi R:\phi D = 1:0.0364 \quad (7)$$

Further, in order to insure the focal length 10 mm, the following equation (8) must hold:

$$\phi R + \phi D = 0.100 \quad (8)$$

Equations (7) and (8) show that the refractive and diffractive powers are respectively expressed by the following equations (9) and (10):

$$\phi R = 0.09649 \quad (9)$$

$$\phi D = 0.00351 \quad (10)$$

By the second integration of equation (10) with respect to the distance from the optical axis, the optical pathlength difference OPD(h) at the point on the diffractive lens surface that departs from the optical axis by height h is determined as follows:

$$OPD(h) = 0.5^* \phi D^* h^2 \quad (11)$$
$$= 0.5^* 0.00351^* h^2$$
$$= 1.755 \times 10^{-3*} h^2$$

It should be noted here that in order to develop diffraction, the optical pathlength difference must be varied not continuously but intermittently or discretely in steps. Stated more specifically, the optical pathlength difference that occurs between light passing through a medium with the thickness t along the optical path and light passing through air is given by (n−1)t and, hence, the difference in height between adjacent steps on the diffractive lens must be t which is given by the following equation (12), or an integral multiple of the same:

$$t(h) = 0.780 \times 10^{-3} / (n-1) \quad (12)$$
$$= 0.780 \times 10^{-3} / 0.68468 = 1.14 \times 10^{-3*} h^2$$

Therefore, macroscopically, the diffractive lens is shaped like a concave lens the thickness of which increases in proportion to the square of the distance from the optical axis but, microscopically, annular segments are formed in steps concentric with the optical axis in the manner already defined hereinabove. By meeting these requirements, the diffractive lens can provide a desired power.

The foregoing discussion assumes that the single chromatic aberration correcting, lens of the present invention is a thin lens and that, therefore, the height of ray incidence does not change on the two surfaces of the lens. In practice, however, the height of ray incidence differs between the front and rear surfaces of the lens and, hence, the change in h must also be taken into consideration.

It should also be noted that the ratio between the optical pathlength difference t(n−1) and the wavelength $\lambda_0$ desirably satisfies the following condition (A):

$$0.8 \leq t(n-1)/\lambda_0 \leq 10 \quad (A)$$

It is generally held that if a diffractive lens surface is formed in such a way that the difference in height between adjacent steps is equal to the wavelength $\lambda_0$, one will use light of first-order diffraction and, hence, is capable of suppressing the deterioration in wavefront aberration due to the change in wavelength, thereby preventing the drop in diffraction efficiency and imaging performance which would other-wise occur on account of the wavelength change.

If the operating wavelength range is narrow or, in a case like that where the width of each annular segment is small enough to present difficulty in lens manufacture, the difference in height between adjacent steps may be increased to twice the wavelength or an integral multiple (≧3) of the same and, yet, it is possible to perform the correction of chromatic aberration. However, if the difference in height between steps exceeds the upper limit of condition (A) and becomes greater than ten times the wavelength λ, the lens geometry will be no different from the conventional Fresnel lens and the following two problems will occur: due to a possible manufacturing error in the difference in height between steps, there is high likelihood of increased phase mismatching and, secondly, the efficiency of the diffractive lens decreases if the incident light has a wavelength departing from the design value.

If, on the other hand, the lower limit of condition (A) is not reached, the phase matching necessary for the diffractive lens cannot be accomplished and it is substantially incapable of working as a "diffractive" lens.

If the diffractive lens and the refractive lens are to be combined in an integral unit for the purpose of correcting chromatic aberration, almost all the power that develops is created by the refractive lens as equation (7) shows. Therefore, it is necessary that the refractive lens be adapted to be capable of substantial correction of aberrations by itself. On the other hand, the power of the diffractive lens is almost nil since its sole function is to correct the chromatic aberration that develops in the refractive lens. Therefore, the single chromatic aberration correcting lens as an integral unit has no marked difference from the conventional single aspheric lens as far as the macroscopic geometry is concerned.

EXAMPLE 1

FIG. 1 shows optical system that uses a single chromatic aberration correcting lens according to Example 1 of the present invention, in which the lens is used as an objective lens in an optical disk system. Beams of parallel light entering the lens 1 form the left are focused to from a spot on the recording surface located on the inner (right) side of the cover glass D of the optical disk. The lens 1 is an objective lens both surfaces of which are macroscopically convex.

Figure 2A:
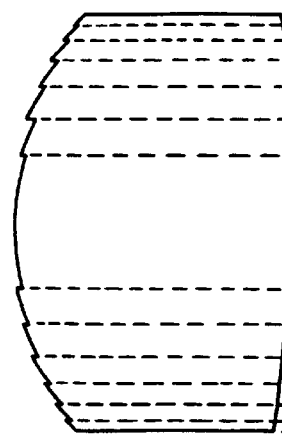
FIG. 2(a) is a cross section showing the objective lens of FIG. 1 in an exaggerated form.
Figure 2B:
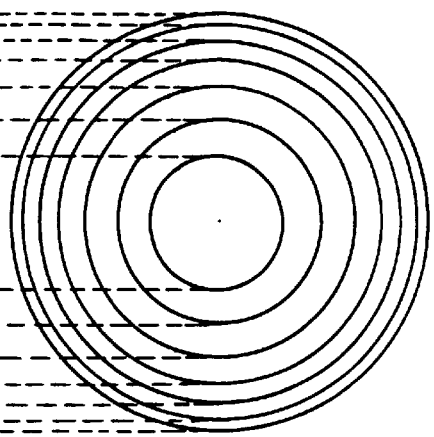
FIG. 2(b) is a plan view of the same objective lens in an exaggerated form.

FIGS. 2(a) and 2(b) are a cross section and a plan view, respectively, that show the objective lens 1 as it is exaggerated to clarify the geometry of the annular segments formed on it. The left side of lens 1 (as seen in FIG. 2(a)) on which the parallel light is to be incident provides a discontinuous surface that is the combination of an aspheric surface of a refractive lens with annular segments that are formed on it to create a surface working as a diffractive lens surface. The annular segments are formed concentrically in steps that are shifted discretely in a direction in which the lens thickness increases as a function of the distance from the optical axis. The side of the lens 1 that faces the cover glass D forms an ordinary continuous aspheric surface.

In order to correct spherical aberration and coma at the same time in the case where a high NA (numerical aperture) lens like the objective lens in an optical disk system is composed of a single lens, the surface on the side where parallel beams of light are incident, namely, on the side at the far conjugate point, must be formed as a convex aspheric surface the radius of curvature of which increases from the optical axis toward the periphery.

In order for a lens to be bright, the sine condition for coma correction must be substantially satisfied. Hence, when combining a high NA lens with the diffractive lens, the optical pathlength that should be provided by the latter is not proportional to the square of the height of ray incidence h, but proportional to the square of the sine of the incident or emerging angle. Therefore, except in the case where the diffractive lens surface is on the sides where the parallel light enters and emerges, the geometry of the diffractive lens surface must be such that its curvature is not strictly proportional to the square of distance h from the optical axis but decreases gradually toward the periphery. It should also be noted that if the incident ray enters the diffractive lens at an angle (obliquely), the effective lens thickness will increase; therefore, in the case where the diffractive lens is located on the side of the high NA lens that is closer to the exit surface, the amount of shift must also be considered as a function of h.

If the diffractive lens to be combined in a unitary assembly is located at the far conjugate point as in the case of Example 1, the incident rays are subjected to the angle varying action on the diffractive lens surface in the axial direction and, hence, the difference in height between angular steps on the diffractive lens surface will increase from the optical axis toward the periphery. However, it is difficult to manufacture a system in which the lens surface is shifted in the direction in which the ray travel; therefore, in the actual manufacturing operation, the lens surface may be shifted in the axial direction.

Figure 3:
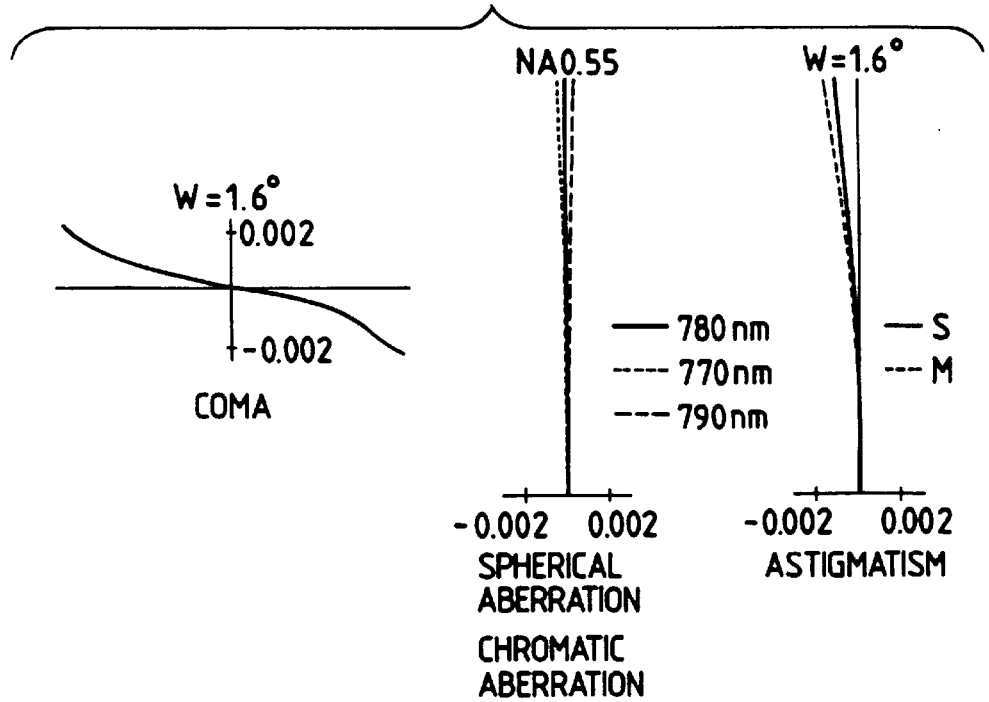
FIG. 3 is a set of graphs plotting the aberrations curves that are obtained with the optical system shown in FIG. 1.

The specific numerical data for Example 1 are listed in Tables 1 to 3 below. FIG. 3 shows the three aberrations that develop in the system composed in accordance with those data: coma, chromatic aberration expressed in terms of spherical aberrations at 770 nm, 780 nm and 790 nm, and astigmatism (S, sagittal; M, meridional).

TABLE 1

| Reference wavelength | $\lambda_0$ | 780 nm |
|---|---|---|
| Focal length | f | 3.30 mm |
| Numerical aperture | NA | 0.55 |
| Lens quality | n780 | 1.53677 |
| | $\Delta n$ | 0.000025/nm |
| Lens thickness | t | 2.21 mm |
| Disk thickness | tD | 1.20 mm |
| Refractive index of disk | nD | 1.57346 |

The shape of the first surface of the single chromatic aberration correcting lens is given by the coefficients listed in Table 2 (see below) if the sag X(h) of the aspheric surface at the point that is separated from the optical axis by distance h is defined by the following equation (13) which has the term $\Delta N$ added to the common expression of aspheric surface. Symbol INT(x) in Table 2 denotes a function for separating out the integral part of x:

$$X(h) = h^2 / \left( r_N * \left( 1 + \sqrt{1 - (1 + K_N) * h^2 / r_N^2} \right) \right) + \qquad (13)$$
$$A4_N * h^4 + A6_N * h^6 + A8_N * h^8 + A10_N * h^{10} + \Delta_N$$

where r is the radius of curvature of the vertex of the aspheric surface; N is the number for the annular segment to which the point at height h belongs; K is the conic constant; and A4, A6, A8 and A10 are the aspheric coefficients of the fourth, sixth, eighth and tenth orders, respectively.

TABLE 2

N = INT (4.71*h$^2$ + 0.5)
rN = 2.126 + 5.09 × 10$^{-4}$*N
KN = −0.3689
A4N = −1.470 × 10$^{-3}$ + 1.45 × 10$^{-6}$*N
A6N = −2.180 × 10$^{-4}$ + 8.72 × 10$^{-8}$*N
A8N = −1.000 × 10$^{-5}$ + 4.36 × 10$^{-8}$*N
A10N = −1.400 × 10$^{-5}$ + 3.49 × 10$^{-8}$*N
ΔN = −0.001453*N

The shape of the second surface of the single chromatic aberration correcting lens 1 is given by the coefficients listed in Table 3 (see below) if the aspheric surface is defined by equation (14):

$$X(h)=h^2/(r \cdot (1+\sqrt{1-(1+K) \cdot h^2/r^2}))$$
$$+A4*h^4+A6*h^6+A8*h^8+A10*h^{10} \tag{14}$$

TABLE 3

| |
| --- |
| r = −6.763 |
| K = 0.000 |
| A4 = 1.777 × 10⁻² |
| A6 = −3.950 × 10⁻³ |
| A8 = 5.770 × 10⁻⁴ |
| A10 = −2.960 × 10⁻⁵ |

EXAMPLE 2

Figure 4:
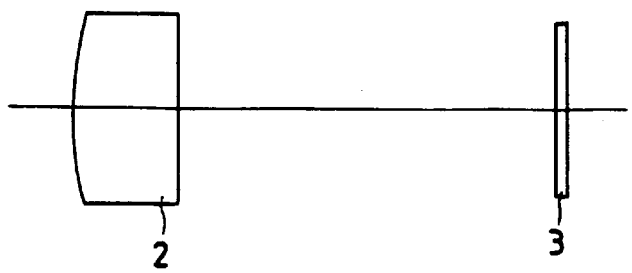
FIG. 4 shows schematically optical system in a case where the single chromatic aberration correcting lens according to Example 2 of the present invention is used as a collimator lens.

FIG. 4 shows the case where the single chromatic aberration correcting lens according to Example 2 of the present invention is used as a collimator lens which collimates the divergent light from a laser diode. The collimator lens indicated by 2 has a meniscus shape which, as seen macroscopically, is convex on the left side from which beams of the collimated light emerge.

Figures 5A, 5B:
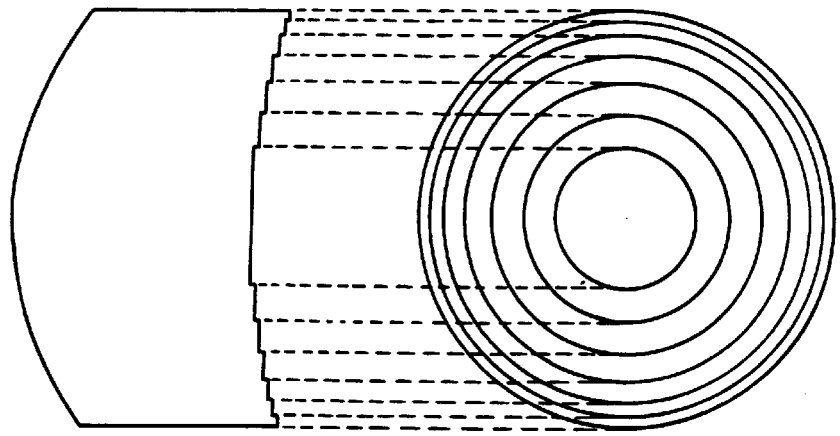
FIG. 5(a) is a cross section showing the collimator lens of FIG. 4 in an exaggerated form.
FIG. 5(b) is a plan view of the same collimator lens in an exaggerated form.

FIGS. 5(a) and 5(b) are a cross section and a plan view, respectively, that show the collimator lens 2 as it is exaggerated to clarify the geometry of the annular segments formed on it. The right side of lens 2 (as seen in FIG. 5(a)) which faces the cover glass 3 of the laser diode provides a discontinuous surface that has annular segments formed on it to create a surface working as a substantially powerless diffractive lens surface. The annular segments are formed concentrically in steps that are shifted discretely in a direction in which the lens thickness increases as a function of the distance from the optical axis. The left side of the lens 2 from which beams of collimated light emerge forms an ordinary continuous aspheric surface.

In a case like that of Example 2 where a diffractive lens surface is formed on the side closer to the near conjugate point, one may employ an optical material having a refractive index ranging from 1.65 to 1.80. With such material, both spherical aberration and coma can be corrected by rendering only one surface aspheric whereas the other surface is left powerless. Thus, the diffractive lens surface can be formed on the basis of a plane and this facilitates the preparation of a lens forming mold.

If the refractive index is not within the range 1.65 to 1.80, it is difficult to correct both spherical aberration and coma by means of a plane diffractive lens surface and some part of coma will remain uncorrected. Hence, the lens having an index outside the above-specified range is not suitable for use as a high NA lens.

Figure 6:
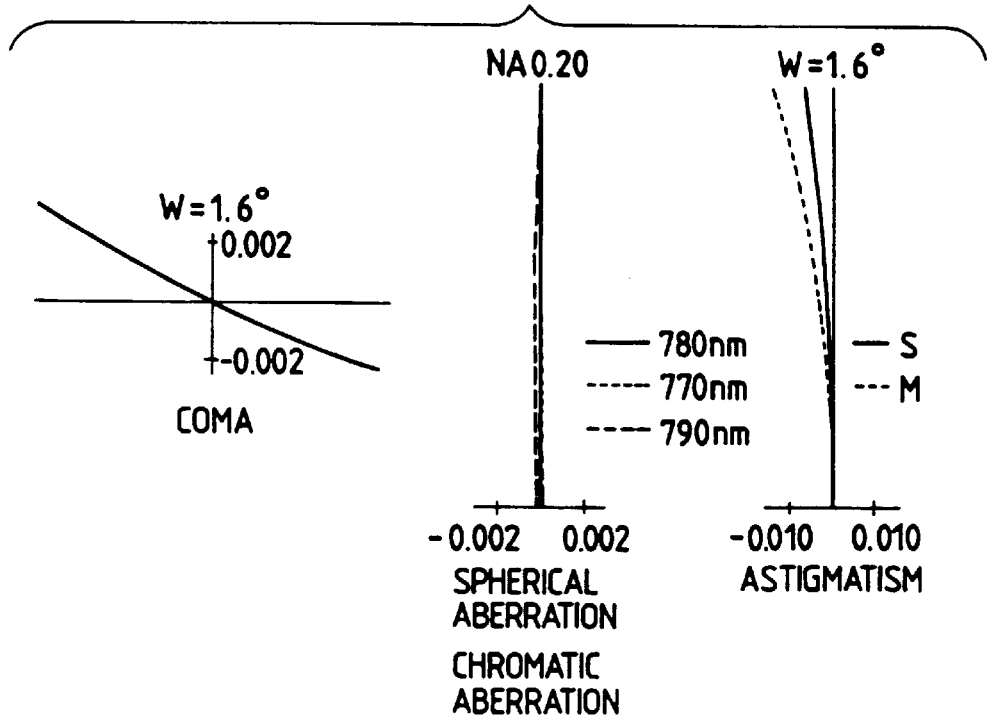
FIG. 6 is a set of graphs plotting the aberration curves obtained with the optical system shown in FIG. 4.

The specific numerical data for Example 2 are listed in Tables 4 and 5 below. The shape of the first surface of collimator lens 2 which is on the left side as seen in FIG. 4 is given by equation (14) (see Example 1) into which the values listed in Table 5 are substituted. FIG. 6 shows the three aberrations that develop in the system composed in accordance with the data listed in Tables 4 and 5: coma, chromatic aberration expressed in terms of spherical aberrations, and astigmatism.

TABLE 4

| | | |
| --- | --- | --- |
| Reference wavelength | λ₀ | 780 nm |
| Focal length | f | 10.8 mm |
| Numerical aperture | NA | 0.20 |
| Lens quality | n780 | 1.66959 |
| | Δn | 0.000030/nm |
| Lens thickness | t | 2.50 mm |
| Cover glass thickness | tC | 0.25 mm |
| Refractive index of cover glass | nC | 1.51072 |

TABLE 5

| |
| --- |
| r = 7.231 |
| K = −0.5933 |
| A4 = 0.000 |
| A6 = −3.440 × 10⁻⁷ |
| A8 = −4.370 × 10⁻⁹ |
| A10 = 0.000 |

The shape of the second surface of the single chromatic aberration correcting lens is given by the following equation (15) in terms of X(h), or the sag at the point that is separated from the optical axis by distance h:

$$X(h)=\Delta N \tag{15}$$

where N is the number for the annular segment to which the point at height h belongs and the asphericity-describing coefficient is the following function of N:

$$N=INT(2.70*h^2-0.0318*h^4+0.5)$$

$$\Delta N=0.001165*N$$

EXAMPLE 3

Figure 7:
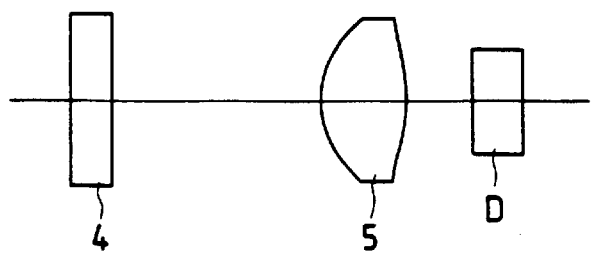
FIG. 7 shows schematically optical system in a case where the single chromatic aberration correcting lens according to Example 3 of the present invention is used as an objective lens of a finite system in an optical disk apparatus.

FIG. 7 shows optical system in which the single chromatic aberration correcting lens according to Example 3 of the present invention is used as an objective lens of a finite system for an optical disk. A laser beam from a laser light source (not shown) passes through a substrate 4 from the left and enters an objective lens 5 as divergent light, which is focused by that objective lens 5 to form a spot on the back side of the cover glass D of the optical disk. An optical decoupling hologram or the like is formed on the substrate 4.

The left side of objective lens 5 comprises an aspheric surface having annular segments formed in steps to provide a diffractive lens surface, and the right side of the objective lens 5 provides a continuous aspheric surface.

A bright objective lens of the finite system that is shown in Example 3 has a strong power or it must handle light at varying wavelength that are not close to each other. In these cases, the refractive lens alone will experience wavelength-dependent changes not only in focal position but also in the amount of spherical aberration; however, the diffractive lens can be used to produce spherical aberrations that are sufficient to cancel those changes in spherical aberration.

In a wavelength range near visible light, it can generally be the that the spherical aberration in a positive lens that is properly corrected at the reference wavelength will be under-corrected with respect to shorter-wavelength light which experiences higher refractive index whereas it is overcorrected with respect to longer-wavelength light which experiences lower refractive index.

Therefore, in order to cancel the change that occurs in spherical aberration on account of such variations in wavelength, the geometry of the diffractive lens may be so set that its power will increase gradually toward the periphery. The change in a lower-order spherical aberration can be expressed in a biquadratic function in terms of wavefront aberration; therefore, one can also suppress the variations in spherical aberration due to wavelength changes by defining the shape of the diffractive lens in terms of a function of two parts, one being proportional to the square of h and the other being proportional to the fourth power of h.

Figure 8:
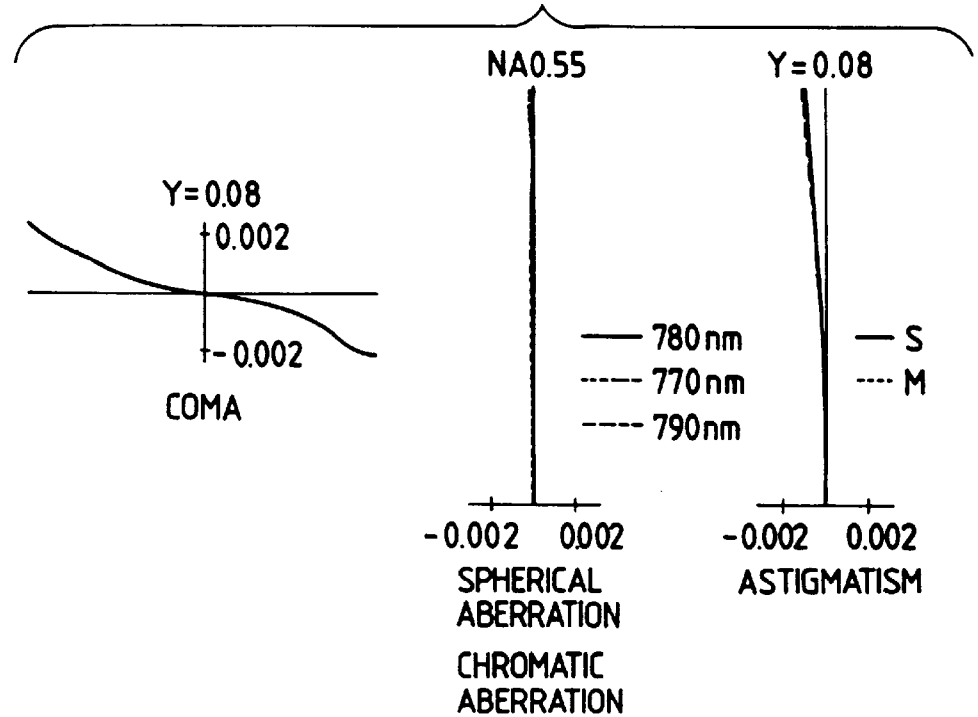
FIG. 8 is a set of graphs plotting the aberration curves obtained with the optical system shown in FIG. 7.

The specific numerical data for Example 3 are listed in Tables 6 to 8 below. The shape of the first surface of the objective lens 5 which is on the left side as seen in FIG. 7 is given by equation (13) (see Example 1) into which the values listed in Table 8 are substituted. FIG. 8 shows the three aberrations that develop in the system composed in accordance with the data listed in Tables 6 to 8: coma, chromatic aberration expressed in terms of spherical aberrations, and astigmatism.

TABLE 6

| Reference wavelength | $\lambda_0$ | 780 nm |
|---|---|---|
| Magnification | m | −0.250 |
| Focal length | f | 2.64 mm |
| Object-to-image distance | IO | 17.76 mm |
| Numerical aperture | NA | 0.55 |
| Lens quality | n780 | 1.53677 |
|  | $\Delta$n | 0.000025/nm |
| Lens thickness | t | 2.00 mm |
| Cover glass thickness | tC | 1.00 mm |
| Refractive index of cover glass | nC | 1.51072 |
| Disk thickness | tD | 1.20 mm |
| Refractive index of disk | nD | 1.57346 |

TABLE 7

$N = \text{INT}(7.54*h^2 + 0.161*h^4 + 0.5)$
$rN = 1.939 + 1.95 \times 10^{-4}*N$
$KN = -0.4290 + 6.90 \times 10^{-5}*N$
$A4N = -8.120 \times 10^{-3} + 6.90 \times 10^{-7}*N$
$A6N = -3.900 \times 10^{-4} - 2.07 \times 10^{-7}*N$
$A8N = -8.260 \times 10^{-5} + 1.45 \times 10^{-7}*N$
$A10N = -1.910 \times 10^{-5} - 1.03 \times 10^{-8}*N$
$\Delta N = -0.001453*N$

TABLE 8

$r = -3.377$
$K = 0.000$
$A4 = 2.768 \times 10^{-2}$
$A6 = -4.261 \times 10^{-3}$
$A8 = 5.157 \times 10^{-4}$
$A10 = -1.940 \times 10^{-5}$ As described on the foregoing pages, the present invention enables a single aspheric lens to correct chromatic aberration while suppressing other aberrations such as spherical aberration and coma. Therefore, if this lens is used as an objective lens, it offers the advantage that its size and weight are not much different from those of the prior art aspheric objective lens and that it yet is capable of correcting chromatic aberration to suppress defocusing that will occur on account of variations in the wavelength of the light source used.

If a diffractive lens surface is formed on the side closer to the far conjugate point, namely, on the side where beams of parallel light enter when the lens of the invention is used as an objective lens for an optical disk, one can avoid the deposition of dirt or dust that is carried by an air stream generated by the revolving optical disk. Conversely, if a diffractive lens surface is to be formed on the side closer to the near conjugate point when the lens of the invention is used as a collimator lens, the diffractive lens surface can be formed on a substantially powerless side by properly selecting the refractive index of the optical material used. In this case, the diffractive lens surface may assume a single shape that is just shifted from a plane surface and, hence, it can be manufactured easily.

Various examples of the present invention are described below.

Figure 9:
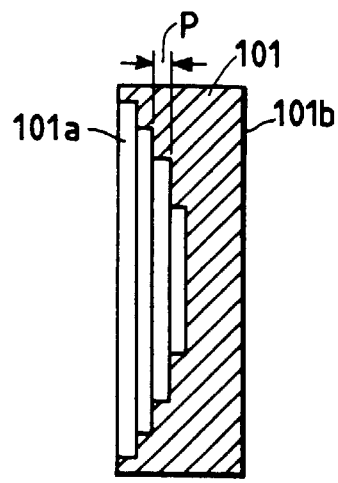
FIG. 9 is a cross section showing an example of the chromatic aberration correcting device of the present invention as it is taken on line IX—IX of FIG. 10.

A chromatic aberration correcting device according to an example of the present invention is shown in FIG. 9.

A chromatic correction element is provided with a central surface having a revolution center about the optical axis and a plurality of annular zone surfaces which are coaxial with the central surface. The positions of the central surface, the zonal surfaces outside of the central surface and the adjacent annular zonal surfaces are displaced by a constant step distance t, so that these surfaces constitute a convex surface or a concave surface in a macroscopic manner. The step distance t is determined so that rays of light which are introduced as planar waves relative to a reference wave length light are emitted as planar waves, and when rays of light which are different from the reference wave length light in wavelength, the rays of light which have been introduced as planar waves are emitted as divergent or convergent wave surfaces. The width of each annular zone is preferably set to a value which is in reverse proportion to the square of the distance from the optical axis. With this dimension, in the case of the wavelength variation, it is possible to make the generated wave surface substantially spherical.

Figure 10:
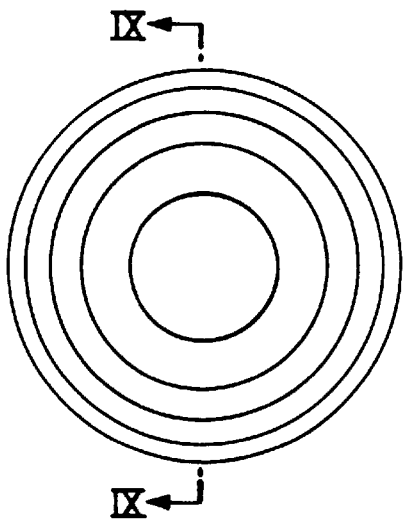
FIG. 10 is a plan view of the device shown in FIG. 9.

The device is generally indicated by 101 and has a plurality of step-like planes formed on the light entrance surface 101a which is on the left side whereas the exit surface 101b is composed of a single plane. The planes at the entrance surface 101a are formed as annular segments that are concentric with the optical axis as shown in FIG. 10. In FIGS. 9 and 10, the width of each annular segment and the difference in height between annular segments are shown enlarged to provide better understanding.

The shift amount in the optical direction of adjacent annular zone t of individual planes is defined by the following condition:

$$t = m\lambda_0/(n-1)$$

where m is an integer, n is the refractive index, and $\lambda_0$ is an arbitrary wavelength in the operating wavelength range.

Figure 11:
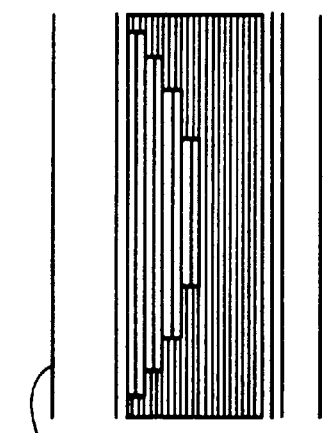
FIG. 11 is a diagram showing the wavefront of light as it passes through the chromatic aberration correcting device at the design wavelength.

As shown in FIG. 11, the optical pathlength of rays of light at the wavelength $\lambda_0$ is offset by $m\lambda_0$ as they pass through adjacent planes and, after emerging from the exit surface, they will form a plane wave again.

Figure 12:
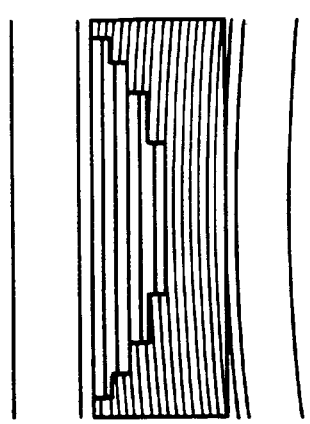
FIG. 12 is a diagram showing the wavefront of light as it passes through the chromatic aberration correcting device at a wavelength other than the design wavelength.

If the wavelength changes to $\lambda_0+\Delta\lambda$, the wavefront is offset by about $m\Delta\lambda$ between adjacent planes (ignoring the change that occurs in the refractive index of the constituent material of the chromatic aberration correcting device on account of the change in wavelength) and the optical pathlength difference will not be an integral multiple of the wavelength. Hence, the emerging wavefront is not a plane wave but a generally spherical wave having power as shown in FIG. 12.

Figure 13:
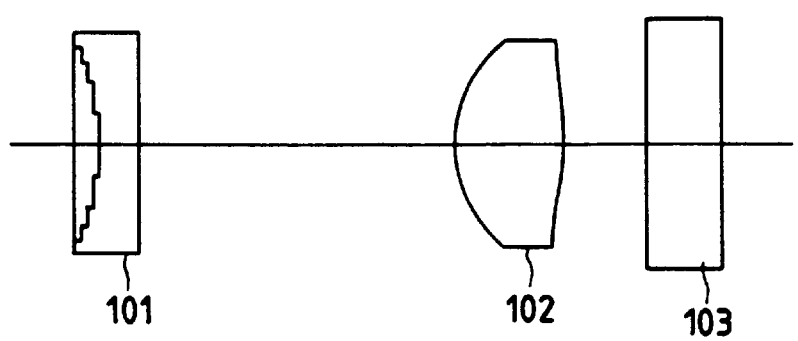
FIG. 13 shows schematically the case in which the chromatic aberration correcting device is combined with an objective lens.

If the chromatic aberration correcting device 101 is of a shape that resembles macroscopically a concavo-plane lens, it is capable of canceling the chromatic aberration that develops in an ordinary refractive using positive lens; hence, by using this device in combination with an objective lens for optical disk as shown in FIG. 13 where the objective lens is indicated by 102, correction of chromatic aberration can be accomplished. Shown by 103 in FIG. 13 is an optical disk cover glass.

We then describe the effect of the chromatic aberration correcting device when it is positioned a certain distance away from the objective lens.

Consider optical system in which two lens groups A and B are spaced by a distance of L. If parallel light enters this optical system, the distance from the last lens surface to the imaging plane, which is generally called the back focus fB, is expressed by the following equation (1A) in which φA and φB represent the powers of the respective lens groups. By differentiating equation (1) with respect to φB, L and φA, we get equations (2A), (3A) and 4(A), respectively:

$$fB=(1-\phi AL)/(\phi A+\phi B-\phi A\phi BL) \quad (1A)$$

$$dfB/d\phi B=-(1-\phi AL)^2/(\phi A+\phi B-\phi A\phi BL)^2 \quad (2A)$$

$$dfB/dL=-\phi A^2/(\phi A+\phi B-\phi A\phi BL)^2 \quad (3A)$$

$$dfB/d\phi A=-1/(\phi A+\phi B-\phi A\phi BL)^2 \quad (4A)$$

If the lens group A is assumed to be a chromatic aberration correcting device having no power, differential equations (2A), (3A) and (4A) can be simplified as follows:

$$dfB/d\phi B \approx -1/\phi B^2 \quad (5A)$$

$$dfB/dL \approx 0 \quad (6A)$$

$$dfB/d\phi A \approx -1/\phi B^2 \quad (7A)$$

Hence, the following conclusion is reached: if lens group A has a very weak power, a change in distance L will cause no change in the focusing position; if the power of lens group B changes, there occurs a shift in the focus position as represented by equation (5A); and if the power of lens group A changes, there occurs a change in the focus position as represented by equation (7A).

Thus, in order to insure that there will be no shift in the focusing position even if a change in wavelength causes corresponding changes in the powers of lens groups A and B, one may set the respective lens groups so that the amount of change in the power of one lens group will cancel the amount of change in the power of the other lens group, namely, the coefficients of differentiation of the powers of the respective lens groups with respect to wavelength λ will satisfy the relationship expressed by the following equation (8A):

$$d\phi A/d\lambda = -d\phi B/d\lambda \quad (8A)$$

The change in the power of lens group B in response to the change in wavelength is expressed by equation (9A) in relation to the change in back focus. If lens group A is assumed to be a diffractive lens, its power which is proportional to wavelength is expressed by the following equation (10A):

$$d\phi B/d\lambda = -(dfB/d\lambda)\phi B^2 \quad (9A)$$

$$d\phi A/d\lambda = \phi A/\lambda \quad (10A)$$

Substituting equations (9A) and (10A) into equation (8A), the power of the chromatic aberration correcting device which is composed as a diffractive lens is given by:

$$\phi A = -(dfB/d\lambda)\lambda\phi B^2 \quad (11A)$$

Take, for example, the case where lens group B is composed of an objective lens that has a focal length of 3 mm, that is to handle light from a laser operating at a wavelength of 780 nm and that has dfB/dλ=0.060 μm/nm. The chromatic aberration correcting device may be set to have power φA that is expressed by:

$$\phi A=0.06\times 10^{-3}\cdot 780\cdot (1/3)^2=1/192.3 \quad (12A)$$

Thus, the chromatic aberration that occurs in the objective lens can be corrected by using a positive diffractive lens having the focal length 192 mm. It should, however, be noted that in order to adjust the overall power of the chromatic aberration correcting device to zero, a negative refractive lens having a focal length of −192 mm must be positioned in contact with this diffractive lens. If the negative lens is composed of a diffractive lens, dispersion will contribute a slight improvement in the chromatic aberration correcting effect.

If the negative lens under discussion is made of BSL7 (trade name of Ohara Co., Ltd.; refractive index=1.51072 at wavelength $\lambda_0$=780 nm), the result is a concave-plane lens that has a spherical entrance surface with a curvature radius of −98.058 mm and a plane exit surface.

However, if the positive diffractive lens and the negative refractive lens are provided as separate members, the number of devices involved cannot be reduced to realize a lower manufacturing cost. To this end, the positive diffractive lens is desirably combined with the negative refractive lens into an integral unit.

To realize an integral unit, the concave surface of the negative lens may be composed of step-like planes that are arranged in such a way that the axial pitch P will satisfy the equation: $\lambda_0/(n-1)=1.5273$ μm. This design helps provide a chromatic aberration correcting device that is capable of correcting chromatic aberration by working as a diffractive lens having the focal length 192 mm and which has no power at the operating center wavelength 780 nm since the light of first-order diffraction will travel straight.

Assume a coordinate system that extends in the axial direction along the path of travelling light; if the coordinate of the point at the intersection with the optical axis is assumed to be zero, the coordinate X(h) of the area that departs from the optical axis by distance h is expressed by equation (13A) if the area is a curved plane and by equation (14A) if the area is composed of step-like planes:

$$X(h) = r\left(1 - \sqrt{1 - h^2/r^2}\right) \quad (13A)$$

$$X(h) = \lambda 0/(n-1)\cdot \text{Int}\left(\left(r\left(1 - \sqrt{1 - h^2/r^2}\right)\right)/\lambda 0/(n-1)\right) + C \quad (14A)$$

where Int(x) is a function that gives the integral portion of x, and C is any constant that satisfied 0≦C<1.

When using the chromatic aberration correcting device in combination with the aforementioned objective lens, the specific geometry of the device is as shown below in Table 9.

TABLE 9

| h (mm) | X (μm) | n: 1.51072 |
|---|---|---|
| 0.000~0.387 | 0.00 | |
| ~0.670 | ~1.53 | |
| ~0.865 | ~3.05 | |

TABLE 9-continued

| h (mm) | X (μm) | n: 1.51072 |
|---|---|---|
| ~1.024 | ~4.58 | |
| ~1.161 | ~6.11 | |
| ~1.284 | ~7.64 | |
| ~1.395 | ~9.16 | |
| ~1.499 | ~10.69 | |
| ~1.596 | ~12.22 | |
| ~1.687 | ~13.75 | |
| ~1.773 | ~15.27 | |
| ~1.856 | ~16.80 | |
| ~1.935 | ~18.33 | |
| ~2.011 | ~19.85 | |
| ~2.084 | ~21.38 | |
| ~2.155 | ~22.91 | |

In the example described above, the axial pitch is adjusted to $\lambda_0/(n-1)$; if the operating wavelength is within a narrow range, the axial pitch may be adjusted to $m\lambda_0/(n-1)$ (m: integer) and the light of mth-order diffraction may safely be used without lowering the diffraction efficiency.

It should be particularly noted here that the peripheral portion of the chromatic aberration correcting device is usually characterized by the smaller width of annular segments than those in the central portion. Hence, by gradually increasing the value of m starting from unity so as to give different pitches, one can prevent the width of annular segments in the peripheral portion from becoming unduly narrow. Equation (14A) may be modified as follows with m being taken into account:

$$X(h) = m\lambda_0/(n-1) \cdot \text{Int}\left(\left(r\left(1 - \sqrt{1 - h^2/r^2}\right)\right)/(m\lambda_0/(n-1)) + C\right) \quad (15A)$$

Figure 14:
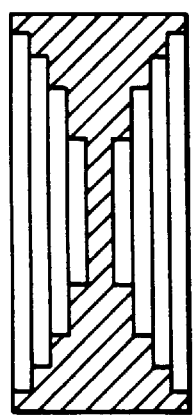
FIG. 14 shows schematically the case in which the chromatic aberration correcting device is macroscopically shaped like a biconcave lens.

In the example described above, the chromatic aberration correcting device is composed in such a manner that its shape is macroscopically like a concave-plane lens, whereby it is capable of correcting the chromatic aberration that has developed in a convex lens. It should be noted that the device may be turned around to produce a plano-concave lens which will function in entirely the same manner as the concave-plane lens. Alternatively, both sides of the chromatic aberration correcting device may be rendered to have macroscopically curved surfaces as shown in FIG. 14. The curved surface serving as a reference is not limited to the spherical surface used in the example and it may be an aspheric surface.

Figure 15:
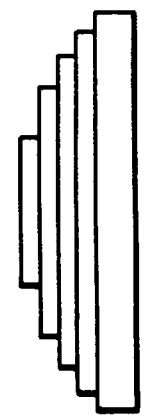
FIG. 15 shows schematically the case in which the chromatic aberration correcting device is macroscopically shaped like a convexo-plane lens.
Figure 16:
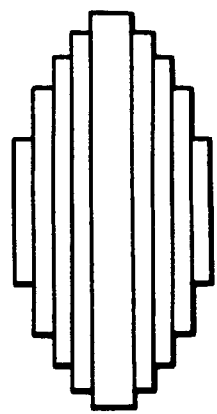
FIG. 16 shows schematically the case in which the chromatic aberration correcting device is macroscopically shaped like a biconvex lens.

Further, the chromatic aberration correcting device may be formed as a macroscopically convexo-plane lens of the type shown in FIG. 15 or as a biconvex lens of the type shown in FIG. 16; devices of these types can be used to correct the chromatic aberration that has developed in the negative refractive lens.

Figure 17:
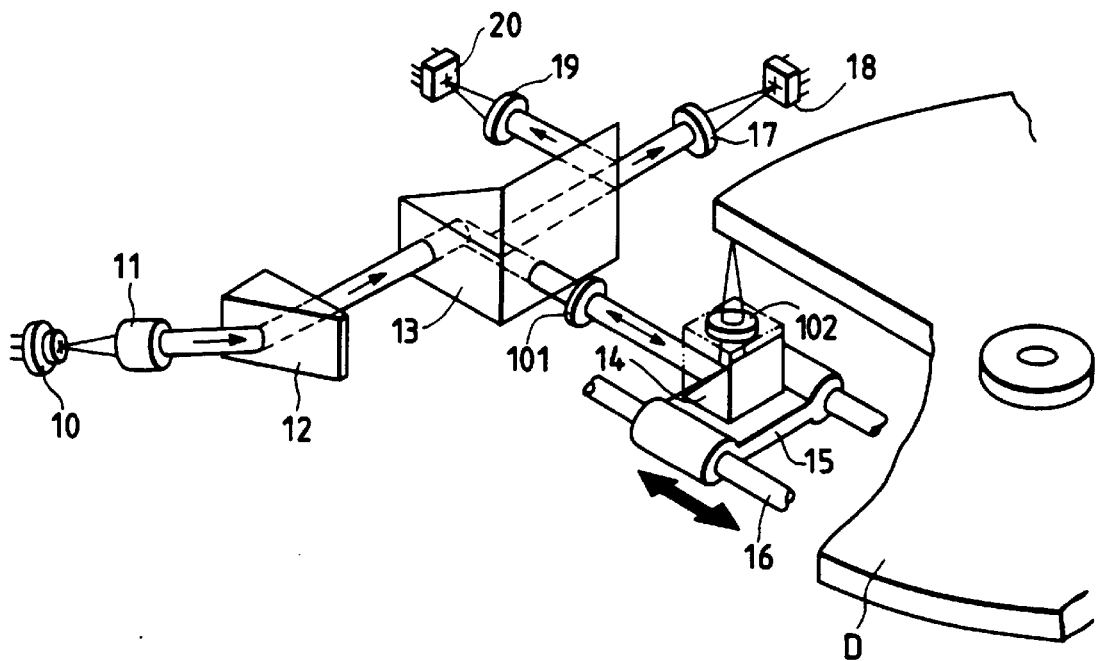
FIG. 17 shows schematically an example of optical system in an optical information recording and reproducing apparatus including the chromatic aberration correcting device.

FIG. 17 shows optical system in a magnetooptical information recording and reproducing apparatus that contains the chromatic aberration correcting device described hereinabove. Divergent light issuing from a laser diode 10 serving as a light source is collimated by a collimator lens 11 and thereafter shaped to have a circular cross section by means of a beam shaping prism 12. The shaped laser beam is reflected by a prism 13 to pass through the chromatic aberration correcting device 101; the beam is thereafter reflected by a mirror 14 and focused by an objective lens 102 to form a spot on disk D.

Both the objective lens 102 and the mirror 14 are mounted on a carriage 15, which is slidable along guide rails 16 in the radial direction of disk D indicated by the two-head arrow in FIG. 17.

The reflected light from disk D makes the second passage through objective lens 102, mirror 14 and chromatic aberration correcting lens 101 and is reflected by the prism 13; part of the reflected light passes through a condenser lens 17 to be collected on a light-receiving element 18 for signal reproduction and the remainder passes through a condenser lens 19 to be collected on a light-receiving element 20 for error signal detection. In accordance with the reflected light received, the element 18 outputs the information recorded on the disk whereas the element 19 outputs an error signal such as a tracking error or a focusing error signal.

Figure 18:
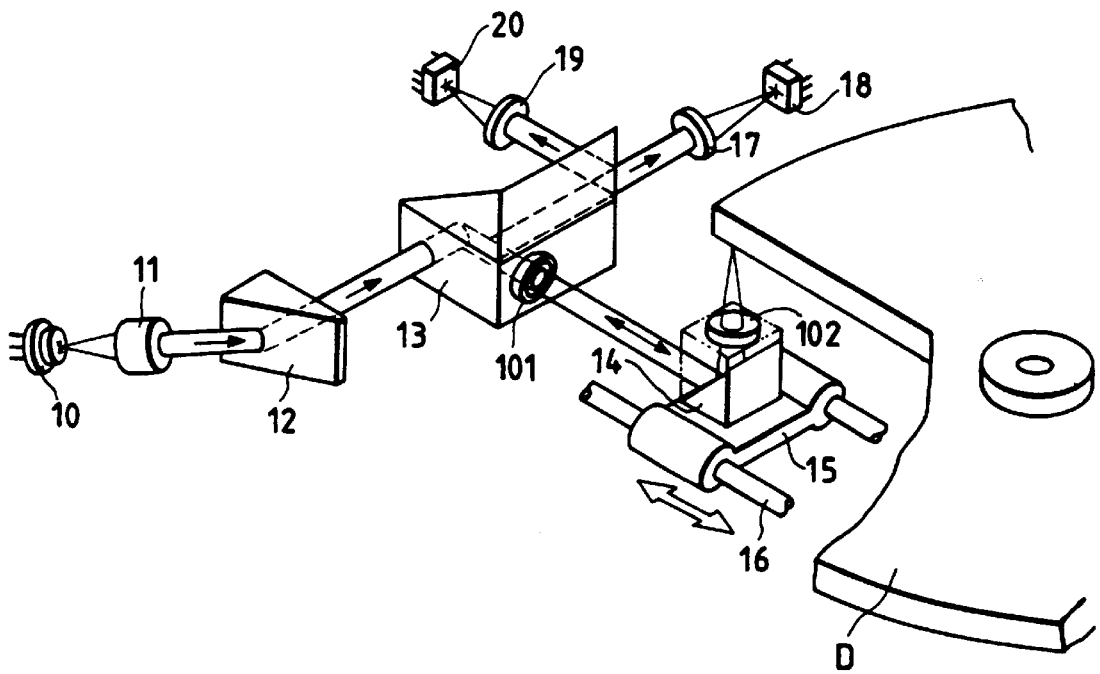
FIG. 18 shows schematically another example of optical system in an optical information recording and reproducing apparatus including the chromatic aberration correcting device.

A modification of the optical system described above is shown in FIG. 18. In this modified example, the chromatic aberration correcting device 101 is attached to the prism 13.

The laser diode 10 will produce an output which, in a recording mode, increases intermittently in a region where it changes the direction of magnetization on the disk and which is small and constant in a reproduction mode. This change in power causes a corresponding change in oscillation wavelength. However, as described above, the chromatic aberration correcting device 101 is inserted between the light source and the objective lens in accordance with the present invention, whereby the convergence of light beams can be varied slightly as there occurs a change in wavelength so as to suppress the undesired shift in the position where the condenser lens 102 collects light beams.

As described on the foregoing pages, the present invention permits a single optical element to correct the chromatic aberration that develops in a positive or a negative lens, thereby producing a lens system that uses a smaller number of optical elements and which yet is free from chromatic aberration. Therefore, the present invention will contribute to the manufacture of a lighter lens system at a lower cost.

If the chromatic aberration correcting device of the present invention is used in optical system for an optical information recording and reproducing apparatus, the position where the condenser lens collects light beams can be prevented from shifting on account of variations in the wavelength of light source and this insures the apparatus to be operated consistently even if the operating wavelength is switched from one value to another.

The following embodiments relate to a device for correcting the chromatic aberration inherent in optical system. More particularly, the present invention relates to a chromatic aberration correcting device that is intended for use in combination with a single aspheric surface that is corrected for aberrations other than chromatic aberration.

The conventional chromatic aberration correcting device is positioned in a substantially afocal portion of optical system and, depending upon of the wavelength of incident parallel light, transforms it to either divergent or convergent light so as to cancel the axial chromatic aberration that develops in an objective lens.

The lens to be corrected for chromatic aberration is typically a positive lens that is corrected for spherical aberration at a single wavelength. The focal length of a positive lens decreases at shorter wavelengths and increases at longer wavelengths (assuming that the lens is used at wavelengths near visible light). Therefore, in order to cancel the axial chromatic aberration and prevent the shifting of focus position, the rays of light entering the positive lens may be transformed to divergent light if the incident light has short wavelength and to convergent light if it has long wavelength.

Optical system using this conventional chromatic aberration correcting device is capable of correcting axial chromatic aberration; however, it experiences varying spherical aberrations in response to changes in wavelength and, hence, under those conditions which cause a wide range of changes in wavelength, it has been impossible for the optical system to maintain good performance both at the wavelength before change and at the wavelength after change.

Even if a positive lens is corrected for spherical aberration at a reference wavelength, the spherical aberration is under-corrected with respect to shorter-wavelength light that experiences a higher refractive index and it is overcorrected with respect to longer-wavelength light that experiences a lower refractive index. This is the change that occurs to spherical aberration depending upon wavelength.

If parallel light is transformed to either divergent or convergent light under the action of the conventional chromatic aberration correcting device, this transformation, which is equivalent to the change from an object at infinity from a positive lens to an object at finite distance, will cause a change in spherical aberration. As a result of this change, the spherical aberration is undercorrected if divergent light enters the positive lens and it is overcorrected if convergent light enters the positive lens. This is the change that develops in spherical aberration under the action of the chromatic aberration correcting device.

The changes in spherical aberration due to these two factors take place in the same direction and, hence, it has been impossible to correct them by optical system that uses the conventional chromatic aberration correcting device.

If the operating wavelength band is as narrow as the expected range of change in the oscillation wavelength of a laser diode, the change in spherical aberration is very small and causes no great problems. However, if the operating wavelength is expected to change over a wider range as in the case where two light sources emitting at wavelengths that are not close to each other are selectively operated, as exemplified by the use of a near infrared laser diode (780 nm) and a visible red laser diode (680 nm) or the use of a He—Ne laser (633 nm) and the SHG wave from a YAG laser (532 nm), or if a plurality of wavelengths are used simultaneously, a greater change in spherical aberration is also expected and must be dealt with by some method.

The present invention has been accomplished under these circumstances and has an object providing a chromatic aberration correcting device that not only corrects the axial chromatic aberration developing in a positive lens but which also is capable of suppressing the change in spherical aberration even if it is used on two light sources that emit light beams at wavelengths that are not close to each other and which are selectively operated at those wavelengths.

EXAMPLES

Several examples of the chromatic aberration correcting device according to the present invention are described below.

In order to insure that both the change in spherical aberration that develops in a positive lens depending upon wavelength and the spherical aberration that occurs in response to the incidence of divergent or convergent light on the positive lens are corrected by the chromatic aberration correcting device, the surface of the device that has a chromatic aberration correcting action need be adjusted have to a geometry that generates spherical aberration. Hence, the chromatic aberration correcting device of the present invention is so adapted that it generates a divergent wavefront having an overcorrected spherical aberration in response to the incidence of parallel beams of light at a wavelength shorter than a reference wavelength and that it generates a concentrating wavefront having an undercorrected spherical aberration in response to the incidence of parallel beams of light at a wavelength longer than the reference wavelength.

The chromatic aberration correcting device is available in two specific types: a refractive type that is composed by cementing a positive and a negative lens that are formed of materials having substantially no difference in refractive index but having different dispersion values at the reference wavelength; and a diffraction type that has annular segments formed in steps on either a light entrance surface or a light exit surface or both, the annular segments being composed of planes perpendicular to and concentric with the optical axis. The above-described spherical aberration can be generated by insuring that the cemented surface (in the case of a refractive type) or the base curve which is a macroscopic curvature of the radius of curvature of the planes formed in steps (in the case of diffraction type) is an aspheric surface the radius of curvature of which decreases in absolute value with the increasing distance from the optical axis.

Lower-order spherical aberrations can generally be expressed by a biquadratic function of the height of ray incidence; therefore, most of the changes in spherical aberration can be effectively corrected by providing the chromatic aberration correcting device with a surface having fourth-order asphericity. It should, however, be noted that if a single aspheric lens is to be used as the positive lens to be corrected, the aspheric surface of the chromatic aberration correcting device is preferably designed as an aspheric surface that resembles a spheroidal surface having a positive conic constant and this enables more effective correction in that it can handle the component of a change in higher-order aberrations.

When the departure $\epsilon(h)$ from the spheroidal surface at a point having distance h from the optical axis is expressed by the following equation (1B), the aspheric surface of interest which resembles the spheroidal surface desirably satisfies the following condition (2B) (in the case of a refractive type) or (4B) (in the case of a diffraction type) at all values of distance h within the effective maximum radius of passing beams of light:

$$\epsilon(h) = \Delta X(h) - Ch^2 / \left(1 - \sqrt{1 - (1+K)C^2h^2}\right) \quad (1B)$$

$$|\epsilon(h)| < \lambda / \Delta n\text{MAX} \quad (2B)$$

$$|\epsilon(h)| < \lambda / (n-1) \quad (4B)$$

where $\Delta X(h)$ is the sag of the aspheric surface; C is the paraxial curvature; K is the conic constant; $\lambda$ is the maximum operating wavelength; and $\Delta n$MAX is the absolute value of difference in refractive index in the case where the difference between the refractive indices of the media on both sides of the cemented surface is the greatest in the operating wavelength band; and n is the refractive index.

In the case of a diffraction-type chromatic aberration correcting device, when the axial displacement of the base curve at a point having distance h from the optical axis is written as $\Delta X(h)$, the displacement $\Delta X'(h)$ of the planes formed in steps at a point having distance h from the optical axis is given by the following equation (3B):

$$\Delta X'(h) = (m\lambda_0/(n-1))\text{Int}((\Delta X(h)/(m\lambda_0/(n-1))) + 0.5) \quad (3B)$$

where m is an integer; n is the refractive index; $X_0$ is the wavelength at which the chromatic aberration correcting device is used or an arbitrary wavelength within the operating wavelength range of the device; and Int(x) is a function giving an integer not greater then x.

Condition (2B) must be satisfied in order to produce an optical pathlength difference of 1λ or less when a chromatic aberration correcting device of a refractive type is used. Similarly, condition (4B) must be satisfied in order to produce an optical pathlength difference of 1λ or less when a chromatic aberration correcting device of a diffraction type is used. If these conditions are not met, the rms (root mean square) value of wavefront aberrations will exceed 0.1λ and the device is no longer suitable for use in the recording or reproduction of optical information.

Figure 19:
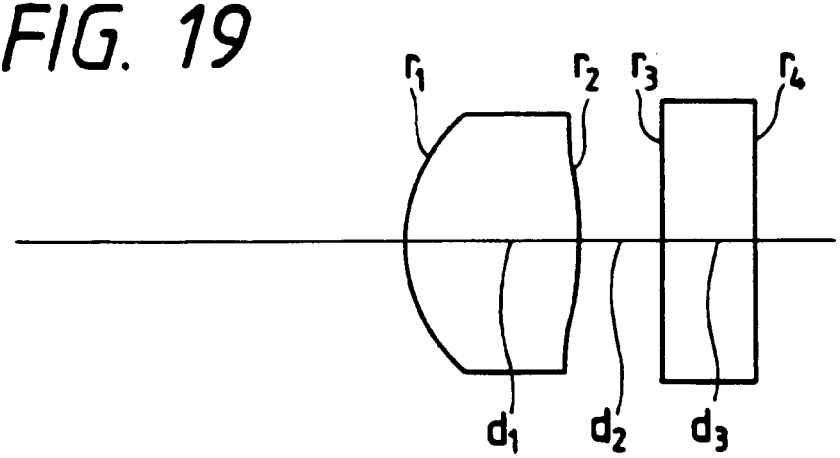
FIG. 19 is a simplified diagram showing schematically a positive objective lens that is to be corrected by the chromatic aberration correcting devices of Examples 1B to 3B.

FIG. 19 is a simplified diagram showing schematically a positive objective lens to be corrected by the chromatic aberration correcting devices used in Examples 1B to 3B that follow. The specific numerical data for this lens are listed in Table 1B, in which NA denotes the numerical aperture, f the focal length, ω the half view angle, fb the back focus, r the radius of curvature, d the lens thickness or the aerial distance between adjacent lenses, ni the refractive index at wavelength i nm, and ν the Abbe number. The first and second surfaces in FIG. 19 define the objective lens having an aspheric surface on both sides, and the third and fourth surfaces define the cover glass of an optical disk.

The aspheric surface is expressed by the following equation:

$$X = \left(CY^2 / \left(1 + \sqrt{1-(1+K)C^2Y^2}\right)\right) + A4Y^4 + A6Y^6 + A8Y^8 + A10Y^{10}$$

$A4Y^4 + A6Y^6 + A8Y^8 + A10Y^{10}$ where x is the distance by which the coordinates at the point on the aspheric surface where the height from the optical axis is Y are departed from the plane tangent to the vertex of the aspheric surface; C is the curvature (1/r) of the vertex of the aspheric surface; K is the conic constant; and A4, A6, A8 and A10 are the aspheric coefficients of the fourth, sixth, eighth and tenth orders, respectively.

Figure 20:
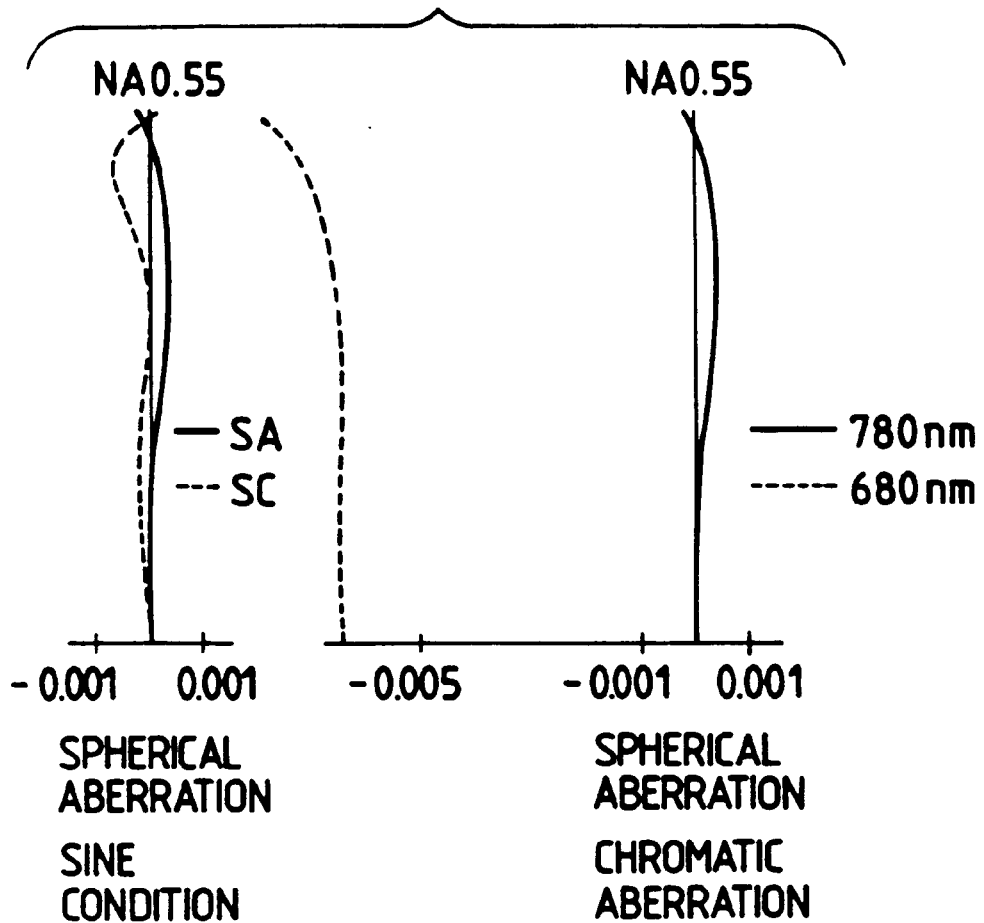
FIG. 20 is a set of graphs plotting the spherical and chromatic aberration curves obtained with the objective lens alone that is shown in FIG. 19.

The conic constants and aspheric coefficients for the first and second surfaces are listed in Table 2B. FIG. 20 shows the spherical aberration SA, sine condition SC, and the chromatic aberration that is expressed in terms of spherical aberrations at wavelengths of 780 nm and 680 nm.

TABLE 1B

| NA = 0.55 | f = 3.00 | ω = 1.4° | fb = 1.088 | | |
|---|---|---|---|---|---|
| Surface No. | r | d | n588 | ν | n780 | n680 |
| 1 | 1.894 | 2.200 | 1.49700 | 81.6 | 1.49282 | 1.49461 |
| 2 | −4.186 | 1.088 | | | | |
| 3 | ∞ | 1.200 | 1.58547 | 29.9 | 1.57346 | 1.57834 |
| 4 | ∞ | | | | | |

TABLE 2B

| 1st surface | 2nd surface |
|---|---|
| K = −0.5800 | K = 0.000 |
| A4 = 0.7540 × 10⁻³ | A4 = 0.3250 × 10⁻¹ |
| A6 = −0.3670 × 10⁻⁴ | A6 = −0.1000 × 10⁻¹ |
| A8 = 0.2800 × 10⁻⁴ | A8 = 0.2000 × 10⁻² |
| A10 = −0.3600 × 10⁻⁴ | A10 = −0.1820 × 10⁻³ |

Example 1B

Figure 21:
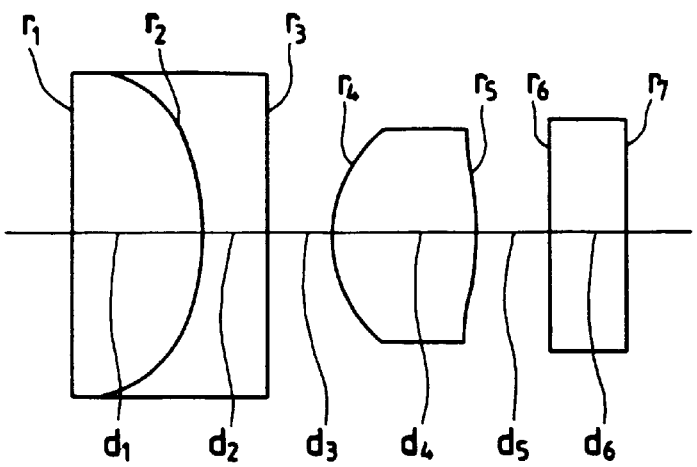
FIG. 21 is a simplified diagram showing schematically optical system in which the lens shown in FIG. 19 is combined with the refractive-type chromatic aberration correcting device of Example 1B in which the cemented surface is ellipsoidal.
Figure 22:
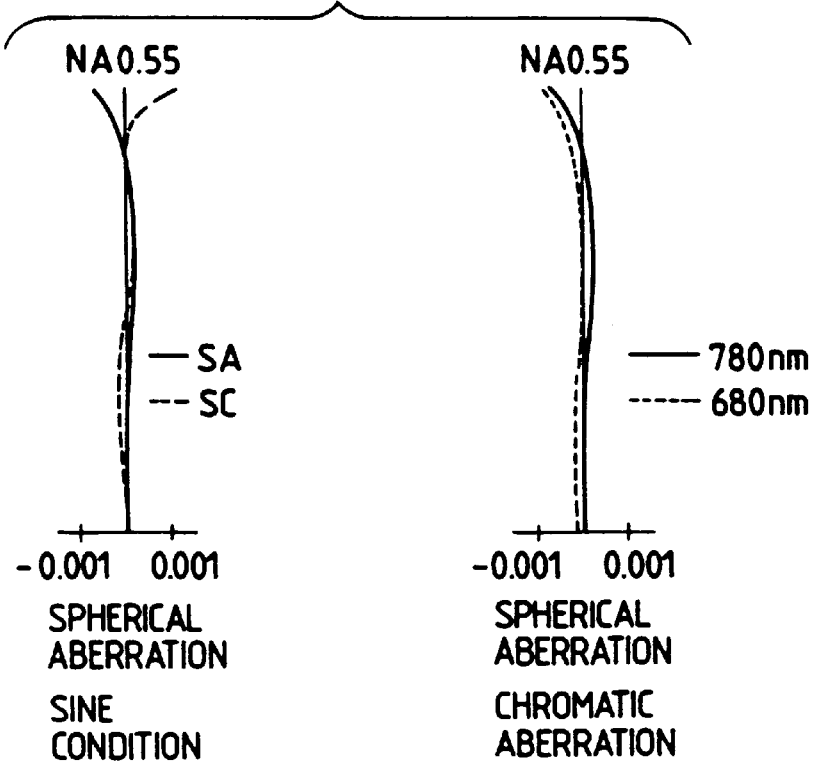
FIG. 22 is a set of graphs plotting the spherical and chromatic aberration curves obtained with the optical system shown in FIG. 21.

FIG. 21 shows optical system in which the refractive-type chromatic aberration correcting device according to Example 1B of the present invention is combined with the objective lens shown in FIG. 19. The cemented surface r2 of the correcting device is ellipsoidal and ε(h) is zero within the effective radius. The specific numerical data for the optical system are listed in Table 3B. The first to third surfaces define the chromatic aberration correcting device, the fourth and fifth surfaces define the objective lens, and the sixth and seventh surfaces define the cover glass of an optical disk. In Example 1B, the second, fourth and fifth surfaces are aspheric and the associated aspheric coefficients are listed in Table 4B. FIG. 22 shows the aspheric and chromatic aberrations that develop in the optical system composed in accordance with the data listed in Table 3B.

TABLE 3B

| FNO - 1:0.9 | f = 3.00 | ω = 1.4° | fb = 0.00 | | |
|---|---|---|---|---|---|
| Surface No. | r | d | n588 | ν | n780 | n680 |
| 1 | ∞ | 2.000 | 1.75500 | 52.3 | 1.74523 | 1.74940 |
| 2 | −4.400 | 1.000 | 1.76182 | 26.5 | 1.74404 | 1.75132 |
| 3 | ∞ | any distance | | | | |
| 4 | 1.894 | 2.200 | 1.49700 | 81.6 | 1.49282 | 1.49461 |
| 5 | −4.186 | 1.088 | | | | |
| 6 | ∞ | 1.200 | 1.58547 | 29.9 | 1.57346 | 1.57834 |
| 7 | ∞ | | | | | |

TABLE 4B

| 4th surface | 5th surface | 2nd surface |
|---|---|---|
| K = −0.5800 | K = 0.0000 | K = 0.2500 × 10 |
| A4 = 0.7540 × 10⁻³ | A4 = 0.3250 × 10⁻¹ | |
| A6 = −0.3670 × 10⁻⁴ | A6 = −0.1000 × 10⁻¹ | |
| A8 = 0.2800 × 10⁻⁴ | A8 = 0.2000 × 10⁻² | |
| A10 = −0.3600 × 10⁻⁴ | A10 = −0.1820 × 10⁻³ | |

Figure 23:
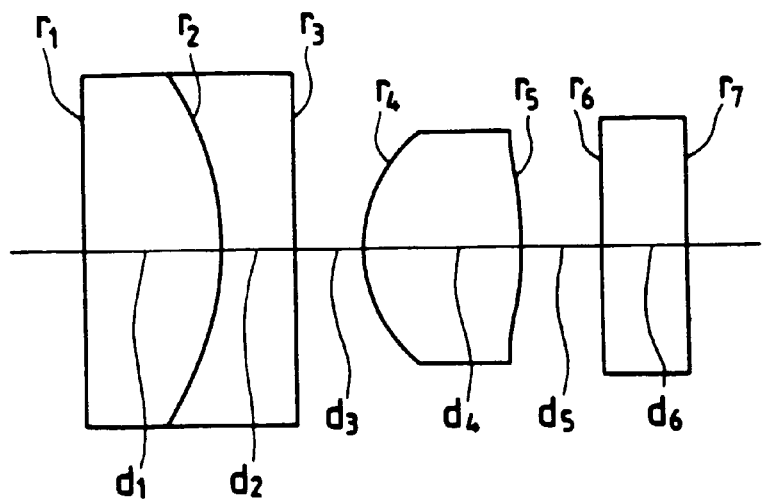
FIG. 23 is a simplified diagram showing schematically optical system in which the objective lens shown in FIG. 19 is combined with a refractive-type chromatic aberration correcting device in which the cemented surface is spherical.
Figure 24:
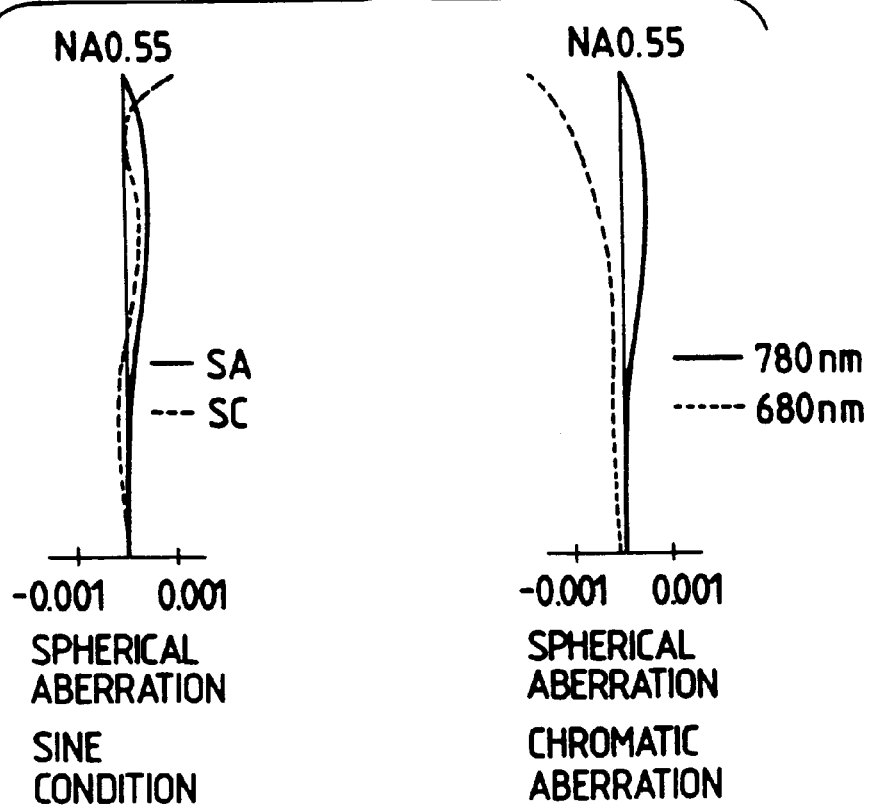
FIG. 24 is a set of graphs plotting the spherical and chromatic aberration curves obtained with the optical system shown in FIG. 23.

FIG. 23 shows optical system that has the same configuration as in Example 1B except that the cemented surface r2 is spherical. FIG. 24 shows the spheric and chromatic aberrations that develop in the optical system shown in FIG. 23. Comparing FIGS. 22 and 24, one can see that the amount of change in spherical aberration due to variations in wavelength is reduced if the geometry of the cemented surface is changed from spherical to ellipsoidal.

Example 2B

Figure 25:
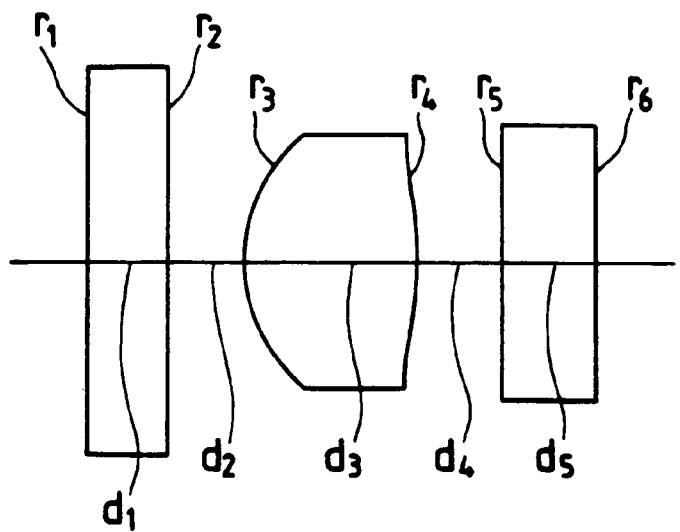
FIG. 25 is a simplified diagram showing schematically optical system in which the lens shown in FIG. 19 is combined with a diffraction-type chromatic aberration correcting device.
Figures 26A, 26B:
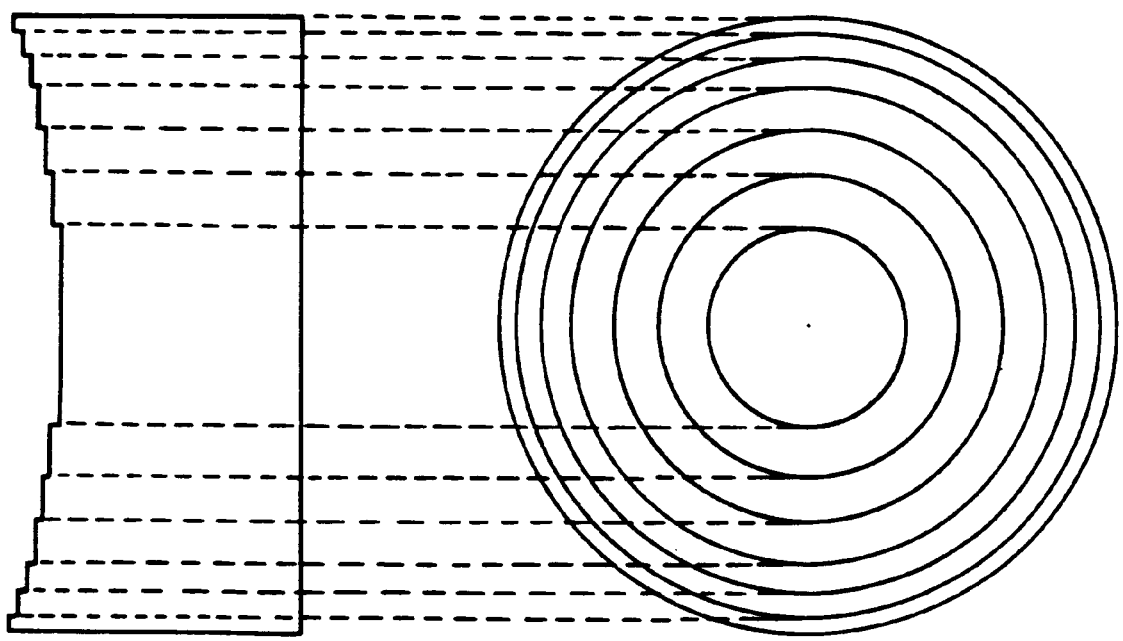
FIGS. 26A and 26B are a side view and a plan respectively, that show schematically the geometry of step-like planes formed on the diffraction-type chromatic aberration correcting device.

FIG. 25 shows optical system in which a chromatic aberration correcting device of a diffraction type is combined with the objective lens shown in FIG. 19. As shown in FIGS. 26A and 26B, a diffraction-type chromatic aberration correcting device has annular segments formed in steps as they are perpendicular to and concentric with the optical axis.

Figure 27:
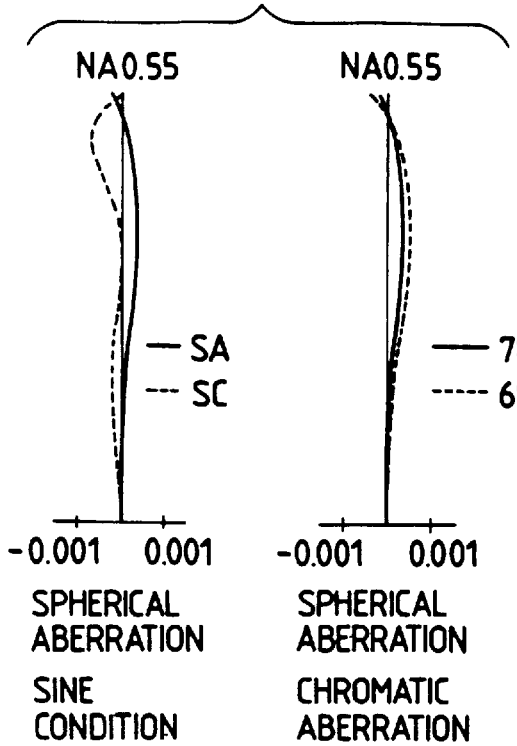
FIG. 27 is a set of graphs plotting the spherical and chromatic aberration curves obtained with the optical system shown in FIG. 25 for the case of using the diffraction-type chromatic aberration correcting device of Example 2B in which the base curve for the step-like planes provides an ellipsoidal surface.

Table 5B lists numerical data for the optical system in which the diffraction-type chromatic aberration correcting device of Example 2B is combined with the objective lens shown in FIG. 19. The correcting device is such that the base curve which is a macroscopic curvature of surface r1 formed in steps provides a fourth-order aspheric surface. FIG. 27 shows the spherical and chromatic aberrations that develop in the optical system composed in accordance with the data shown in Table 5B.

In Example 2B, the first, third and fourth surfaces are aspheric and the associated aspheric coefficients are listed in Table 6B.

TABLE 5B

| FNO – 1:0.9 | | f = 3.00 | | ω = 1.4° | | fb = 0.00 | |
|---|---|---|---|---|---|---|---|
| Surface No. | r | d | n588 | ν | n780 | | n680 |
| 1 | –104.400 | 1.000 | 1.51633 | 64.1 | 1.51072 | | 1.51315 |
| 2 | ∞ | any distance | | | | | |
| 3 | 1.894 | 2.200 | 1.49700 | 81.6 | 1.49282 | | 1.49461 |
| 4 | –4.186 | 1.090 | | | | | |
| 5 | ∞ | 1.200 | 1.58547 | 29.9 | 1.57346 | | 1.57834 |
| 6 | ∞ | | | | | | |

TABLE 6B

| 3rd surface | 4th surface | 1st surface |
|---|---|---|
| K = –0.5800 | K = 0.0000 | K = 0.0000 |
| $A4 = 0.7540 \times 10^{-3}$ | $A4 = 0.3250 \times 10^{-1}$ | $A4 = -0.3400 \times 10^{-3}$ |
| $A6 = -0.3670 \times 10^{-4}$ | $A6 = -0.1000 \times 10^{-1}$ | |
| $A8 = 0.2800 \times 10^{-4}$ | $A8 = 0.2000 \times 10^{-2}$ | |
| $A10 = -0.3600 \times 10^{-4}$ | $A10 = -0.1820 \times 10^{-3}$ | |

Example 3B

Figure 28:
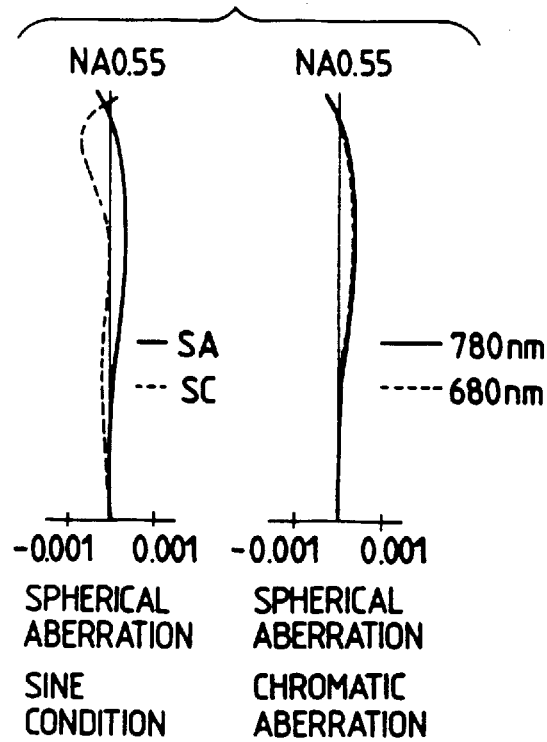
FIG. 28 is a set of graphs plotting the spherical and chromatic aberration curves obtained with the optical system shown in FIG. 25 for the case of using the diffraction-type chromatic aberration correcting device of Example 3B in which the base curve for the step-like planes provides a fourth-order aspheric surface.

Table 7B lists numerical data for optical system in which the chromatic aberration correcting device of Example 3B is combined with the objective lens shown in FIG. 19. The correcting device is such that the base curve which is a macroscopic curvature of surface r1 formed in steps provides an ellipsoidal surface and $\epsilon(h)$ is zero within the effective radius. FIG. 28 shows the spherical and chromatic aberrations that develop in the optical system composed in accordance with the data listed in Table 7B. In Example 3B, the first, third and fourth surfaces are aspheric and the associated coefficients are listed in Table 8B.

TABLE 7B

| FNO – 1:0.9 | | f = 3.00 | | ω = 1.4° | | fb = 0.00 | |
|---|---|---|---|---|---|---|---|
| Surface No. | r | d | n588 | ν | n780 | | n680 |
| 1 | –104.400 | 1.000 | 1.51633 | 64.1 | 1.51072 | | 1.51315 |
| 2 | ∞ | any distance | | | | | |
| 3 | 1.894 | 2.200 | 1.49700 | 81.6 | 1.49282 | | 1.49461 |
| 4 | –4.186 | | | | | | |
| 5 | ∞ | 1.200 | 1.58547 | 29.9 | 1.57346 | | 1.57834 |
| 6 | ∞ | | | | | | |

TABLE 8B

| 3rd surface | 4th surface | 1st surface |
|---|---|---|
| K = –0.5800 | K = 0.0000 | $K = 0.2000 \times 10^{-4}$ |
| $A4 = 0.7540 \times 10^{-3}$ | $A4 = 0.3250 \times 10^{-1}$ | |
| $A6 = -0.3670 \times 10^{-4}$ | $A6 = -0.1000 \times 10^{-1}$ | |
| $A8 = 0.2800 \times 10^{-4}$ | $A8 = 0.2000 \times 10^{-2}$ | |
| $A10 = -0.3600 \times 10^{-4}$ | $A10 = -0.1820 \times 10^{-3}$ | |

Figure 29:
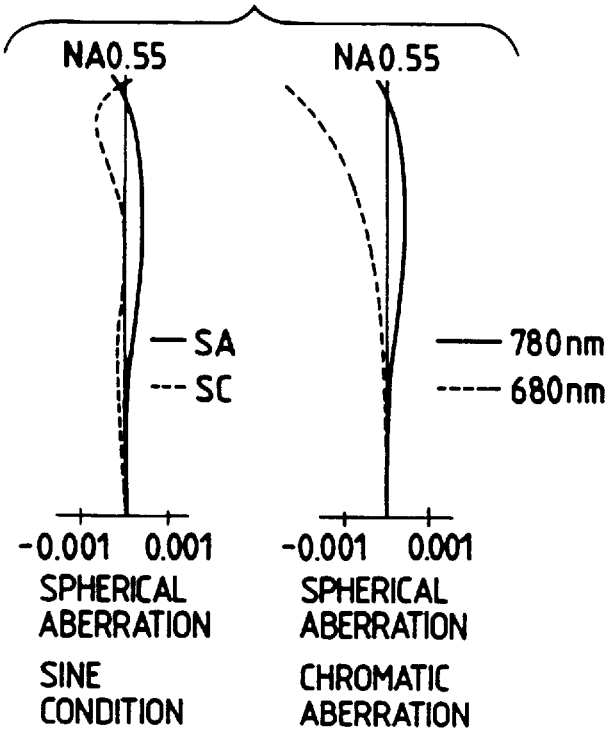
FIG. 29 is a set of graphs plotting the spherical and chromatic aberration curves obtained with the optical system shown in FIG. 25 for the case of using a diffraction-type chromatic aberration correcting device in which the base curve for the step-like planes provides a spherical surface.

FIG. 29 shows the spherical and chromatic aberrations that develop in optical system that has the same configuration as in Examples 2B and 3B except that the base curve for the surface formed in steps provides a spherical y surface. Comparing FIGS. 27 and 28, one can see that the amount of change in spherical aberration due to variations in wavelength is reduced if the geometry of the base curve provides either a fourth-order aspheric or an ellipsoidal surface rather than a spherical surface.

Figure 30:
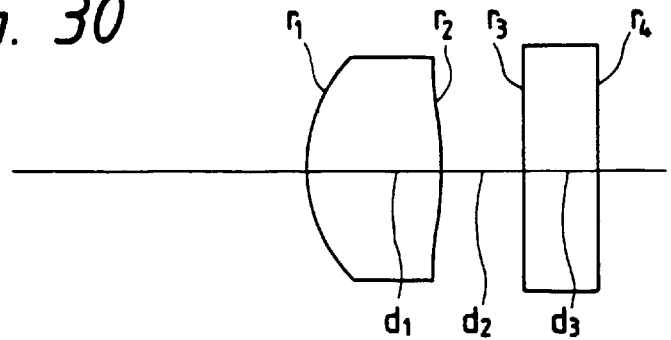
FIG. 30 is a simplified diagram showing schematically the positive objective lens that is to be corrected by the chromatic aberration correcting devices of Examples 4B and 5B.
Figure 31:
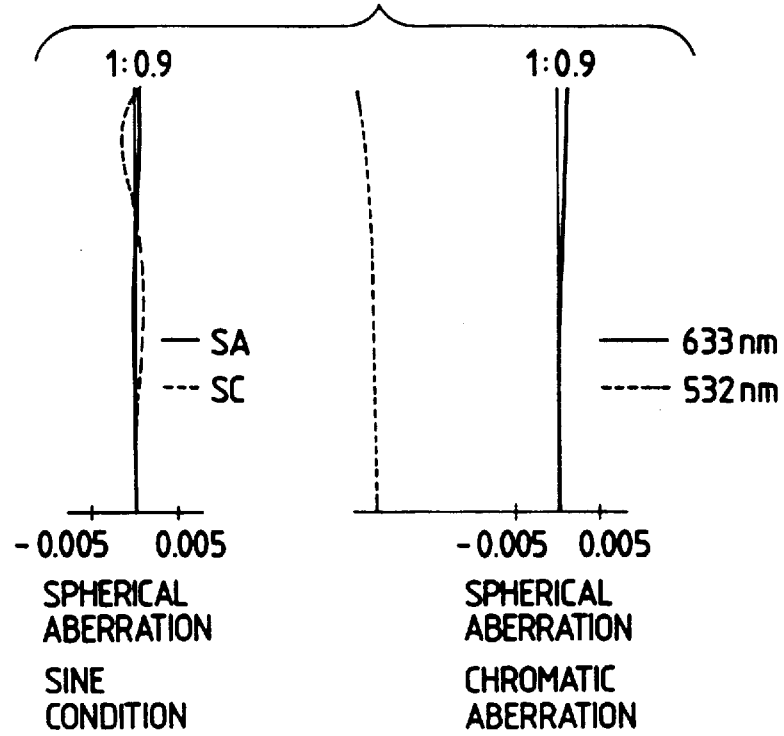
FIG. 31 is a set of graphs plotting the spherical and chromatic aberration curves obtained with the objective lens alone that is shown in FIG. 30.

FIG. 30 is a simplified diagram showing schematically the single positive lens having an aspheric surface on both sides that is to be corrected by the chromatic aberration correcting devices according to Examples 4B and 5B. The specific numerical data for this lens are listed in Tables 9B and 10B. The spherical aberration that develops in this lens alone, as well as the chromatic aberration that is expressed in terms of spherical aberrations at wavelengths of 633 nm and 532 nm are shown in FIG. 31.

TABLE 9B

| NA = 0.55 | | f = 3.29 | | ω = 1.7° | | fb = 1.332 |
|---|---|---|---|---|---|---|
| Surface No. | r | d | n588 | ν | | n633 |
| 1 | 2.180 | 2.250 | 1.54358 | 55.6 | | 1.54151 |
| 2 | –6.250 | 1.332 | | | | |
| 3 | ∞ | 1.200 | 1.58547 | 29.9 | | 1.58156 |
| 4 | ∞ | | | | | |

TABLE 10B

| 1st surface | 2nd surface |
|---|---|
| K = –0.3265 | K = 0.0000 |
| $A4 = -0.2265 \times 10^{-2}$ | $A4 = 0.1670 \times 10^{-1}$ |
| $A6 = -0.5014 \times 10^{-3}$ | $A6 = -0.5080 \times 10^{-2}$ |
| $A8 = -0.7162.10^{-5}$ | $A8 = 0.8000 \times 10^{-3}$ |
| $A10 = -0.3194 \times 10^{-4}$ | $A10 = -0.4848 \times 10^{-4}$ |

Example 4B

Figure 32:
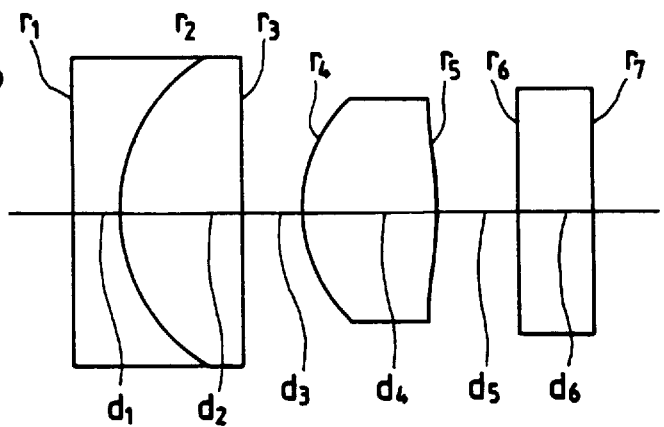
FIG. 32 is a simplified diagram showing schematically optical system in which the objective lens shown in FIG. 30 is combined with a refractive-type chromatic aberration correcting device in which the cemented surface is spherical.
Figure 33:
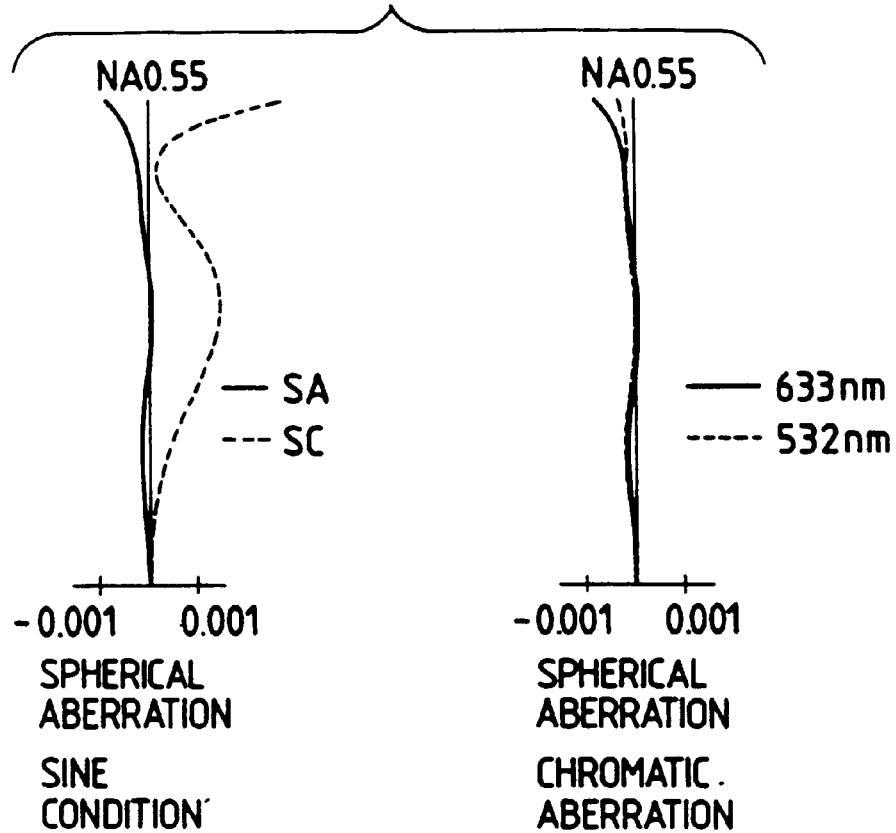
FIG. 33 is a set of graphs plotting the spherical and chromatic aberration curves obtained with the optical system shown in FIG. 32.

FIG. 32 is a simplified diagram showing schematically optical system in which the refractive-type chromatic aberration correcting device according to Example 4B of the present invention is combined with the objective lens shown in FIG. 30. The specific numerical data for the optical system are listed in Tables 11B and 12B. The cemented surface r2 of the correcting device is ellipsoidal and $\epsilon(h)$ is zero within the effective radius. FIG. 33 shows the spherical and chromatic aberrations that develop in the optical system composed in accordance with the data listed in Tables 11B and 12B.

TABLE 11B

| FNO = 1:0.9 | | f = 3.29 | | ω = 1.7° | | fb = 0.00 |
|---|---|---|---|---|---|---|
| Surface No. | r | d | n588 | ν | n633 | n532 |
| 1 | ∞ | 0.800 | 1.74077 | 27.8 | 1.73541 | 1.74959 |
| 2 | 2.280 | 2.000 | 1.74100 | 52.7 | 1.73804 | 1.74567 |
| 3 | ∞ | any distance | | | | |
| 4 | 2.180 | 2.250 | 1.54358 | 55.6 | 1.54151 | 1.54680 |
| 5 | –6.250 | 1.332 | | | | |
| 6 | ∞ | 1.200 | 1.58547 | 29.9 | 1.58156 | 1.59194 |
| 7 | ∞ | | | | | |

TABLE 12B

| 4th surface | 5th surface | 2nd surface |
|---|---|---|
| K = –0.3265 | K = 0.0000 | K = 0.6000 |
| $A4 = -0.2263 \times 10^{-2}$ | $A4 = 0.1670 \times 10^{-1}$ | |
| $A6 = -0.5014 \times 10^{-3}$ | $A6 = -0.5080 \times 10^{-2}$ | |
| $A8 = -0.7162 \times 10^{-5}$ | $A8 = 0.8000 \times 10^{-3}$ | |
| $A10 = -0.3194 \times 10^{-4}$ | $A10 = -0.4848 \times 10^{-4}$ | |

Figure 34:
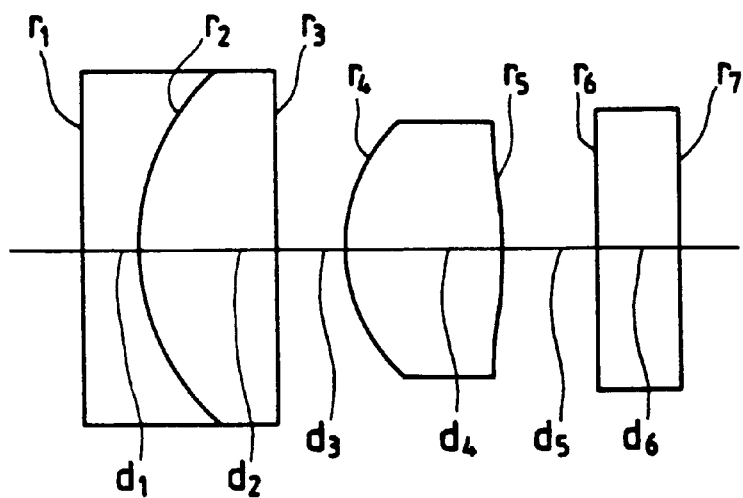
FIG. 34 is a simplified diagram showing schematically optical system in which the lens shown in FIG. 30 is combined with the refractive-type chromatic aberration correcting device of Example 4B in which the cemented surface is ellipsoidal.
Figure 35:
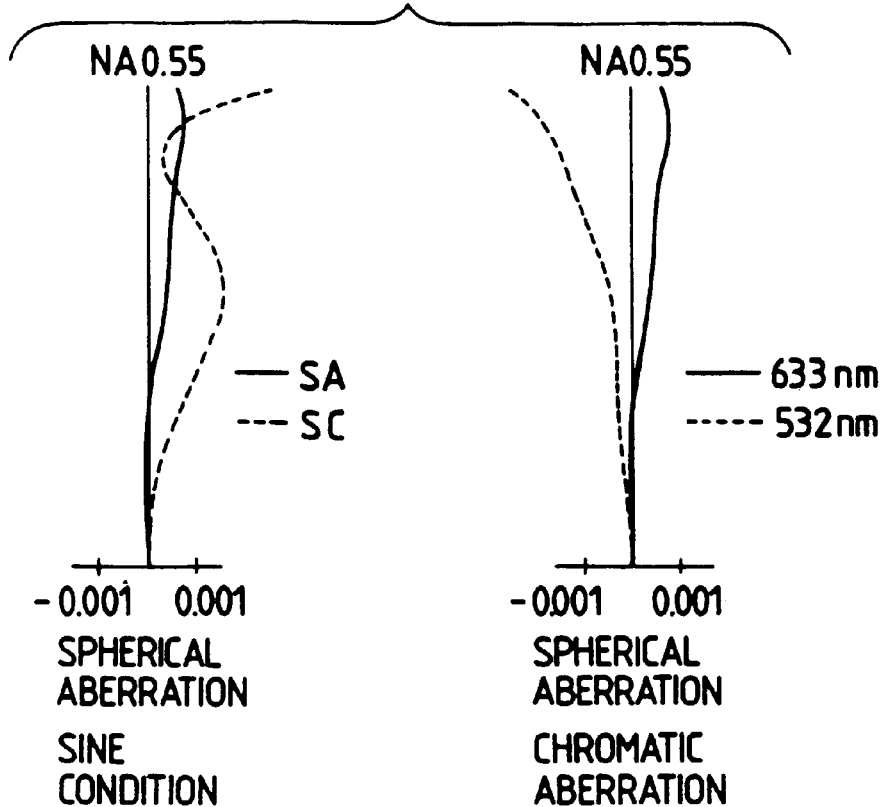
FIG. 35 is a set of graphs plotting the spherical and chromatic aberration curves obtained with the optical system shown in FIG. 34.

FIG. 34 shows optical system having the same configuration as described above except that the cemented surface r2 of the chromatic aberration correcting device is spherical, and FIG. 35 shows the spherical and chromatic aberrations that develop in the optical system under consideration. Obviously, the use of an ellipsoidal cemented surface is effective not only in bringing the profiles of spherical aberration curves close to each other at the two wavelengths but also in reducing the overall amount of spherical aberrations.

Example 5B

Figure 36:
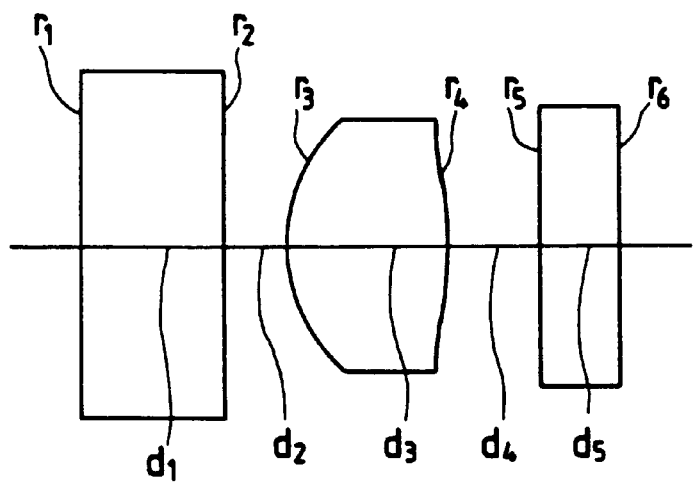
FIG. 36 is a simplified diagram showing schematically optical system in which the lens shown in FIG. 30 is combined with a diffraction-type chromatic aberration correcting device.
Figure 37:
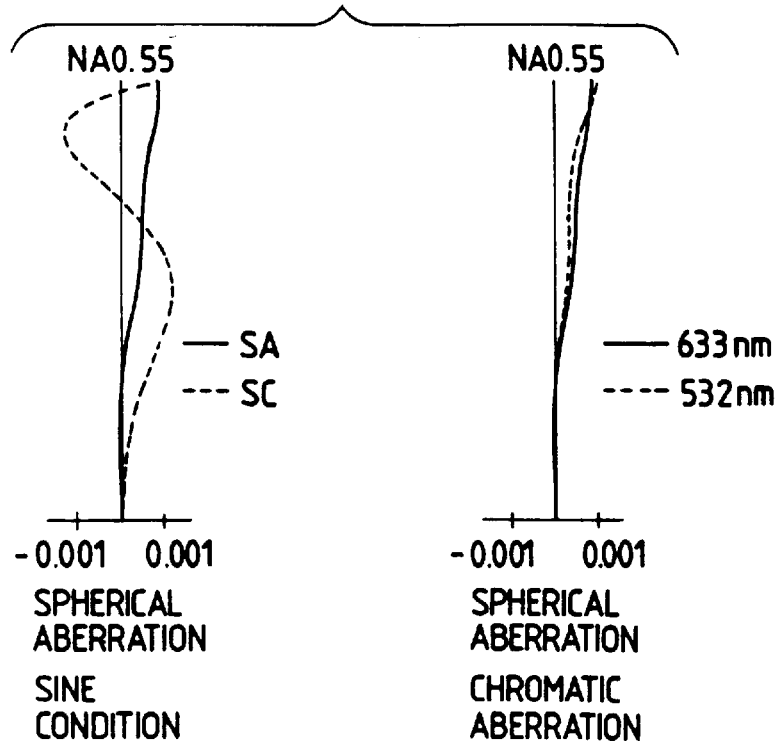
FIG. 37 is a set of graphs plotting the spherical and chromatic aberration curves obtained with the optical system shown in FIG. 36 for the case of using the diffraction-type chromatic aberration correcting device of Example 5B in which the base curve for the step-like planes provides an ellipsoidal surface.

FIG. 36 in a simplified diagram showing schematically optical system in which the diffraction-type chromatic aberration correcting device according to Example 5B of the present invention is combined with the objective lens shown in FIG. 30. The specific numerical data for the optical system are listed in Tables 13b and 14B. In the correcting device of Example 5B, the base curve for the planes formed in steps is ellipsoidal and $\epsilon(h)$ is zero within the effective radius. The spherical and chromatic aberrations that develop in the optical system composed in accordance with the data listed in Tables 13B and 14B shown in FIG. 37.

TABLE 13B f = 3.29   ω = 1.7°   fb = 0.00

| Surface No. | r | d | n588 | ν | n633 | n532 |
|---|---|---|---|---|---|---|
| 1 | ∞ | 2.000 | 1.51633 | 64.1 | 1.51462 | 1.51900 |
| 2 | 41.000 | any distance | | | | |
| 3 | 2.180 | 2.250 | 1.54358 | 55.6 | 1.54151 | 1.54680 |
| 4 | −6.250 | 1.341 | | | | |
| 5 | ∞ | 1.200 | 1.58547 | 29.9 | 1.58156 | 1.59194 |
| 6 | ∞ | | | | | |

TABLE 14B

| 3rd surface | 4th surface | 1st surface |
|---|---|---|
| K = −0.3265 | K = 0.0000 | K = 0.2450 × 10$^{+3}$ |
| A4 = −0.2263 × 10$^{-2}$ | A4 = 0.1670 × 10$^{-1}$ | |
| A6 = −0.5014 × 10$^{-3}$ | A6 = −0.5080 × 10$^{-2}$ | |
| A8 = −0.7162 × 10$^{-5}$ | A8 = 0.8000 × 10$^{-3}$ | |
| A10 = −0.3194 × 10$^{-4}$ | A10 = −0.4848 × 10$^{-4}$ | |

Figure 38:
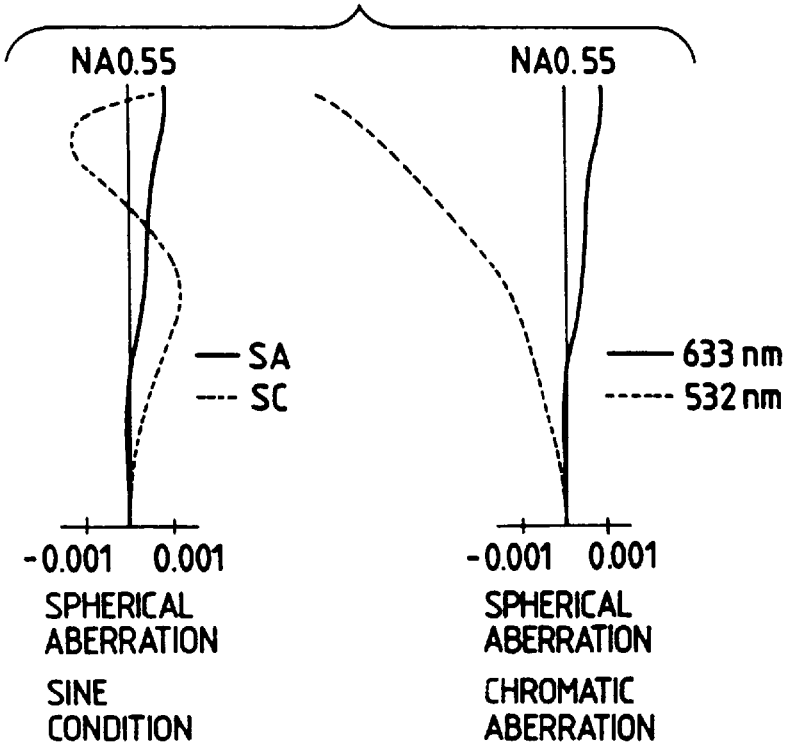
FIG. 38 is a set of graphs plotting the spherical and chromatic aberration curves obtained with the optical system shown in FIG. 36 for the case of using a diffraction-type chromatic aberration correcting device in which the base curve for the step-like planes provides a spherical surface.

FIG. 38 shows the spherical and chromatic aberrations that develop in optical system having the same configuration as in Example 5B except that the base curve for the planes formed in steps in the chromatic aberration correcting device is spherical. Comparing FIGS. 37 and 38, one can see that the variation in spherical aberration is reduced if the base curve is made ellipsoidal.

As described on the foregoing pages, the present invention not only corrects the axial chromatic aberration that develops in a condenser lens on account of variations in wavelength but it also is capable of suppressing the variations in spherical aberration. Hence, it has the advantage of expanding the range over which the fluctuation in the performance of optical system due to variations in wavelength can be suppressed.

Because of these advantages, the present invention offers a practical benefit in that even a lens that is yet to be corrected for chromatic aberration can be used on an optical information recording apparatus that employs two wavelengths fairly remote from each other or on an information reading apparatus that employs a light-emitting diode and a white light source, and this helps realize a compact unit of optical system.

The following embodiments relate to optical system for an optical information recording and reproducing apparatus which records or reproduces information on a medium such as an optical disk. The embodiments of the present invention also relate to a chromatic aberration correcting device that is to be installed in the optical system.

The present invention has been accomplished under these circumstances and has as an object providing optical system for an optical information recording and reproducing apparatus that is effectively corrected for chromatic aberration without using more optical elements than in the case where chromatic aberration is not corrected. Another object of the present invention is to provide a chromatic aberration correcting device that is to be used in the optical system.

Examples of the optical system for optical information recording and reproducing apparatus according to the present invention, as well as the chromatic aberration correcting device of the same invention are described below.

Example 1C

Figure 39:
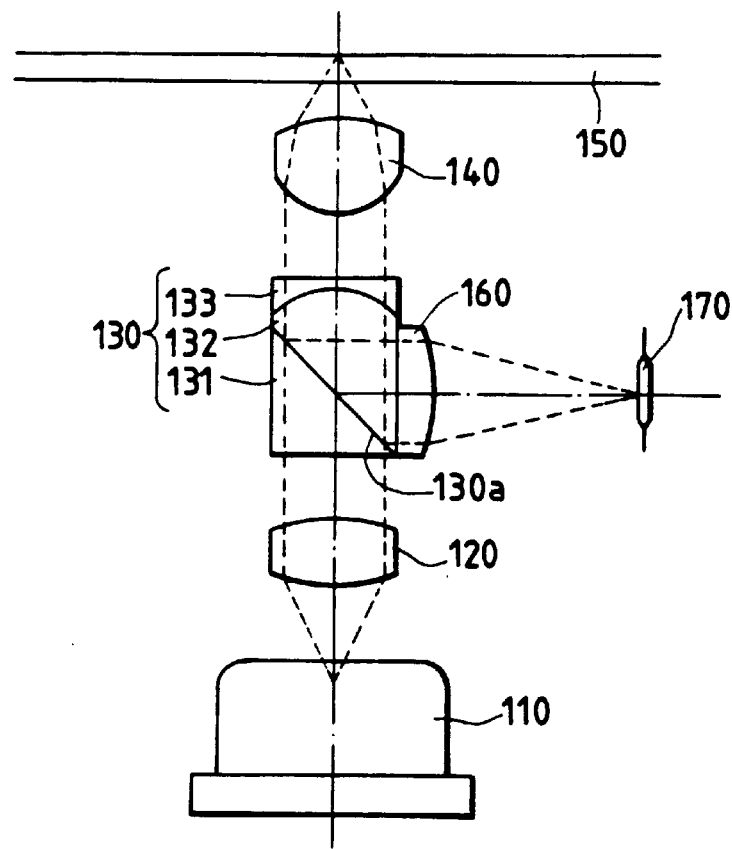
FIG. 39 is a simplified diagram showing schematically the optical system for optical information recording and reproducing apparatus according to Example 1C.

FIG. 39 shows the optical system for optical information recording and reproducing apparatus according to Example 1C of the present invention. Divergent light issuing from a laser diode 110 serving as a light source is collimated by a collimator lens 120; the collimated light then passes through a beam splitter 130 and is focused by an objective lens 140 to form a spot on an optical disk 150. The reflected light from the optical disk 150 makes reentry into the beam splitter 130 and part of it is reflected and passes through a condenser lens 160 to be collected by a light-receiving element 170. Depending upon the reflected light it receives, the element 170 outputs either the information recorded on the optical disk or a signal such as a tracking error or focusing error signal.

The beam splitter 130 is composed of two prisms 131 and 132 joined together by a beam splitting surface 130a, and a concavo-plane lens 133 that is cemented to prism 132 which faces the objective lens 140. Prism 132 and lens 133 are typically made of two materials that have substantially the same refractive index but which have different Abbe numbers as shown in Table 1C below. This arrangement offers the advantage that the cemented surface which is substantially powerless is capable of generating chromatic aberration that is at least sufficient to cancel the chromatic aberration that develops in objective lens 140.

TABLE 1C

| | Material | nA' | nd | νd |
|---|---|---|---|---|
| Prism 132 | YGH51 | 1.74566 | 1.75500 | 52.33 |
| Lens 133 | TIH14 | 1.74475 | 1.76182 | 26.55 |

(Names under "Material" are trade names of Ohara Co., Ltd.)

If desired, a concave surface may be formed on the side facing the prisms using a high-dispersion material whereas a plano-convex lens may be formed of a low dispersion material. This arrangement also produces equally good chromatic aberration correcting effects.

Whichever arrangement is adopted, the only difference from the case where chromatic aberration is not corrected is that the shape of beam splitter 130 is modified; hence, optical system that is effectively corrected for chromatic aberration can be offered without using any additional elements.

In Example 1C, one surface of prism 132 is made convex. If desired, this surface may be rendered planar and a plano-convex lens may be combined with a convexo-plane lens to constitute a chromatic aberration correcting device, which is attached to the beam splitter 130.

Figure 40:
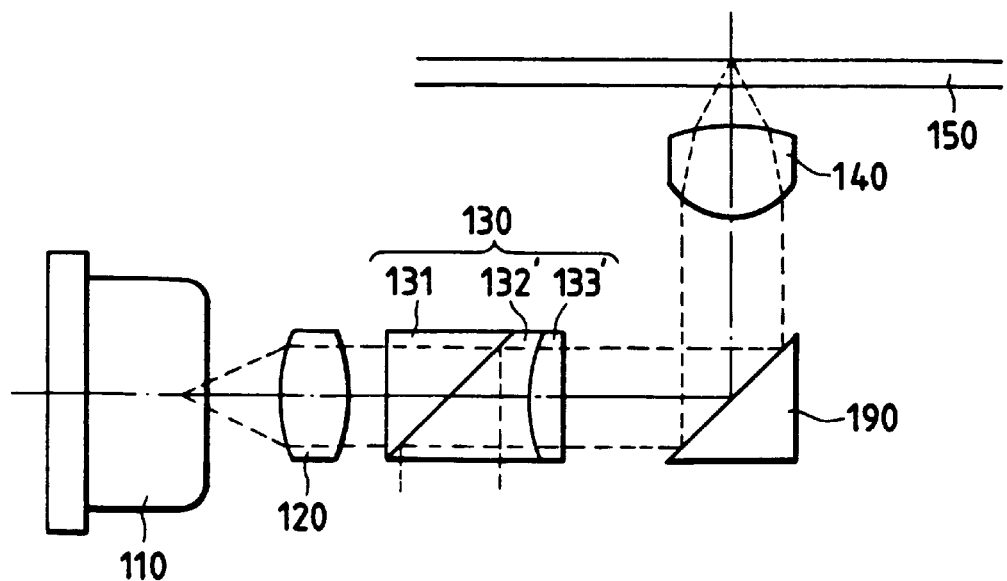
FIG. 40 is a simplified diagram showing a modification of the optical system shown in FIG. 39.

FIG. 40 shows a modification of Example 1C. In this modified example, laser light issues from laser diode 110 in a direction parallel to the surface of optical disk 150; it then passes through collimator lens 120 and beam splitter 130. A mirror 190 serving as an optical path deflecting means reflects the laser light toward the optical disk 150 and the reflected light is focused by objective lens 140 to form a spot on the optical disk 150. As shown, the beam splitter 130 is composed of prisms 131 and 132', as well as a convexo-plane lens 133'.

Example 2C

Figure 41:
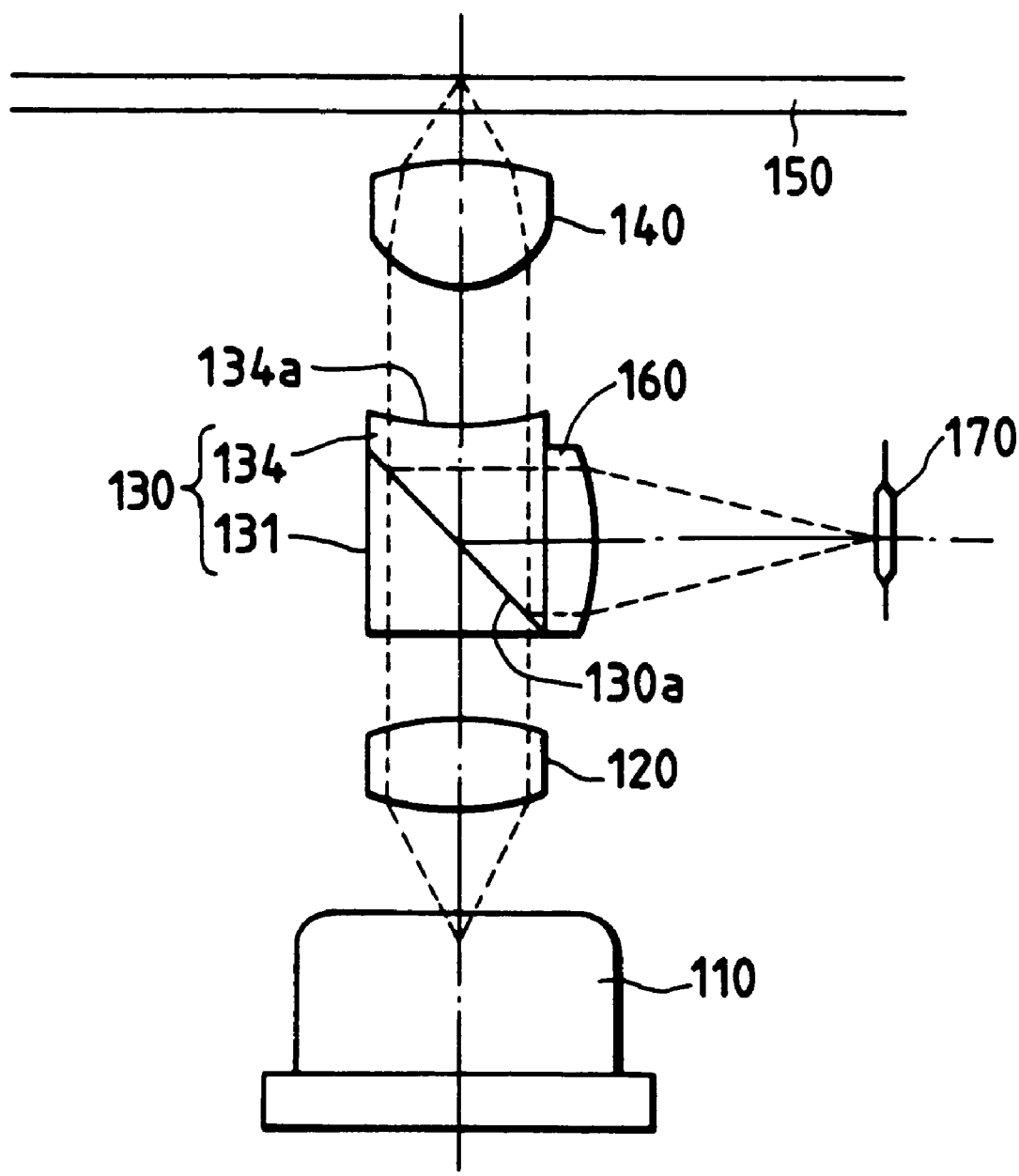
FIG. 41 is a simplified diagram showing schematically the optical system for optical information recording and reproducing apparatus according to Example 2C.

FIG. 41 shows the optical system for optical information recording and reproducing apparatus according to Example 2C of the present invention. In this example, beam splitter 130 is composed of two prisms 131 and 134 joined together by the beam splitting surface 130a, and planes perpendicular to the optical axis are formed in steps on one beam passing surface 134a of prism 134 as annular segments concentric with the optical axis in such a way that they produce a macroscopically concave shape.

The axial pitch P of annular planes is expressed by the following equation:

$$P = \lambda/(n-1)$$

where n is the refractive index of prism 134 and $\lambda$ is the reference wavelength at which there is no change in wavefront, or at which no chromatic aberration will develop.

The surface 134a on which annular planes are formed in steps works as a diffraction grating; if incident light has a wavelength equal to the reference wavelength, the surface 134a will transmit the incident light without causing any change in the wavefront but if the wavelength of the incident light is different from the reference wavelength, the surface will generate a predetermined chromatic aberration that is sufficient to cancel the chromatic aberration that develops in the objective lens 140.

Example 3C

Figure 42:
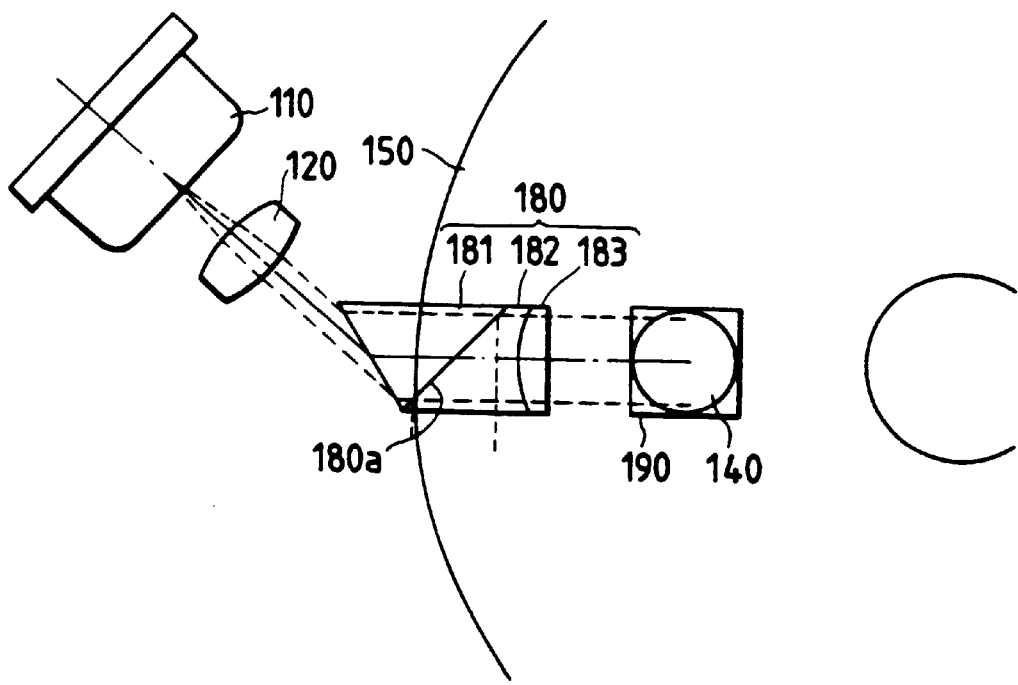
FIG. 42 is a plan view showing the optical system for optical information recording and reproducing apparatus according to Example 3C.
Figure 43:
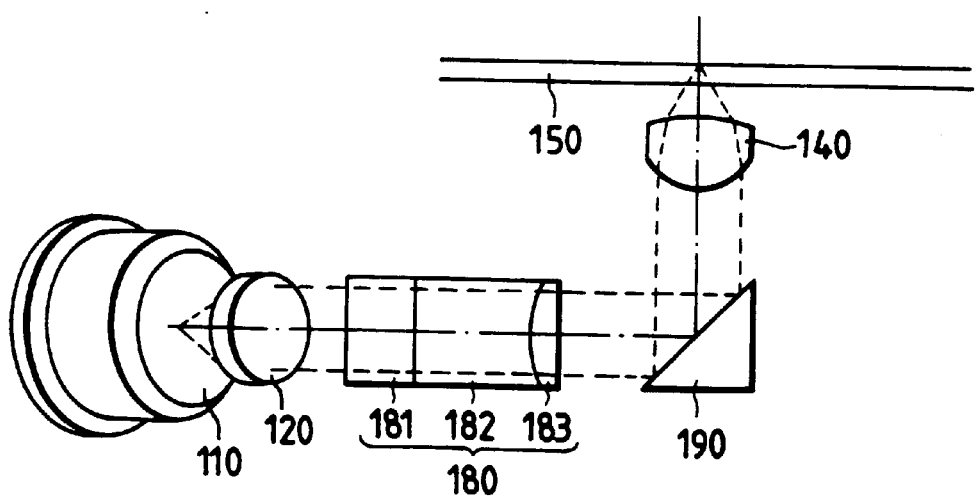
FIG. 43 is a side view showing the same optical system according to Example 3C.

FIGS. 42 and 43 show the optical system for optical information recording and reproducing apparatus according to Example 3C of the present invention. In this example, beams of light issuing from laser diode 110 pass through collimator lens 120 and the resulting parallel light passes through a beam splitter 180 that has a beam shaping capability. The light is then reflected by mirror 190 and is focused by objective lens 140 to form a spot on optical disk 150.

The beam splitter 180 is composed of two prisms 181 and 182 joined together by a beam splitting surface 180a, and a convexo-plane lens 183 cemented to the prism 182. The prisms and the lens are formed of the materials listed in Table, 2C below.

TABLE 2C

|  | Material | nA' | nd | vd |
| --- | --- | --- | --- | --- |
| Prism 181 | LAM54 | 1.74688 | 1.75700 | 47.82 |
| Prism 182 | TIH14 | 1.74475 | 1.76182 | 26.5 |
| Lens 183 | YGH51 | 1.74566 | 1.75500 | 52.33 |

Since prisms 181 and 182 are made of two materials that have substantially the same refractive index but which have different dispersion values, the bend in the optical path across the cemented surface 180a is small and the desired beam shaping and chromatic aberration correcting effects can be exhibited without unduly increasing the size of beam splitter 180.

As in the case shown in FIG. 39, the beams of light that has been isolated by the beam splitter 180 from the light reflected from the optical disk 150 pass through a condenser lens (not shown) to be collected on the light-receiving element 170.

Example 4C

Figure 44:
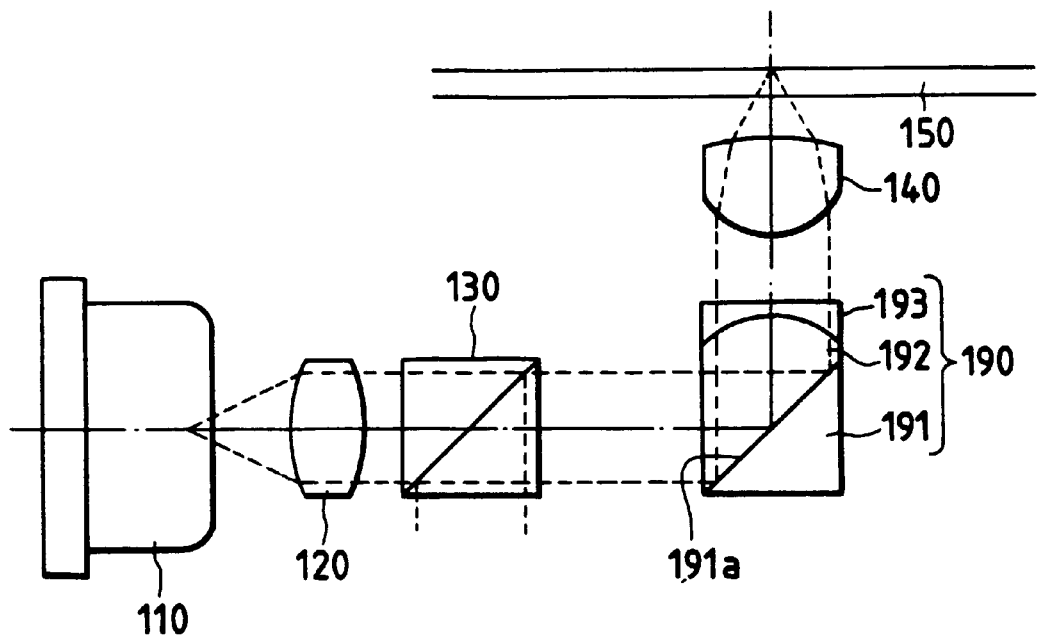
FIG. 44 is a simplified diagram showing schematically the optical system for optical information recording and reproducing apparatus according to Example 4C.

FIG. 44 shows the optical system for optical information recording and reproducing apparatus according to Example 4C of the present invention. Beams of light issuing from laser diode 110 pass through collimator lens 120 and beam splitter 130. The light emerging from the beam splitter 130 enters an optical path deflector 190 which deflects the light towards optical disk 150. In Example 4C, the optical path deflector 190 is adapted to have a chromatic aberration correcting action.

The optical path deflector 190 is composed of two prisms 191 and 192 joined, together by a mirror surface 191a, as well as a concavo-plane lens 193 cemented to the prism 192. Prism 192 and lens 193 are made of two materials that have substantially the same refractive index but which have different dispersion values, and this arrangement enables the deflector 190 to correct the chromatic aberration that develops in the objective lens 140. In this example, the optical path deflector 190 is so positioned that the chromatic aberration correcting surface faces the objective lens; if desired, the deflector 190 may be reversed so that the chromatic aberration correcting surface will be positioned closer to the collimator lens.

The light reflected from the optical disk 150 is then reflected by the beam splitter 130 and passes through a condenser lens (not shown) to be collected on the light-receiving element.

Example 5C

Figure 45:
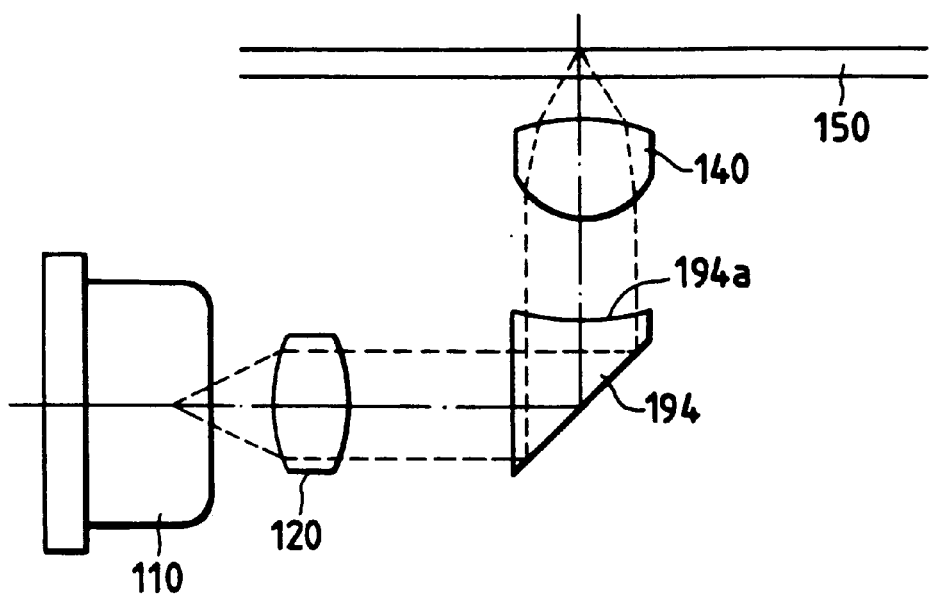
FIG. 45 is a simplified diagram showing schematically the optical system for optical information recording and reproducing apparatus according to Example 5C.

FIG. 45 shows the optical system for optical information recording and reproducing apparatus according to Example 5C of the present invention. In this example, a prism 194 is provided as an optical path deflecting member and annular planes concentric with the optical axis are formed in steps on the light-transmitting surface 194a in such a way that those annular planes will produce a macroscopically concave shape, and those step-like planes on the surface 194a exhibit the ability to correct the chromatic aberration that develops in the objective lens 140.

The pitch of the annular planes and the function of the light-transmitting surface 194a are the same as described in Example 2C. In the actual system, a beam splitter, a condenser lens and a light-receiving element are provided between the collimator lens 120 and the prism 194 but they are not shown in FIG. 45.

As in Example 4C, the prism 194 may be so positioned that the surface having step-like planes faces either the objective lens or the collimator lens.

As described on the foregoing pages, the present invention depends on a beam splitter or an optical path deflector to provide a chromatic aberration correcting action and this helps provide improved optical system that is effectively corrected for chromatic aberration without increasing the number of elements that compose the optical system.

According to still another aspect, the present invention relates to the correction of chromatic aberration in a lens, more particularly, to a hybrid lens that uses a diffraction element to correct the chromatic aberration that develops in a single lens.

The degree of chromatic aberration that develops in a lens is determined by the characteristics, in particular, the dispersion value, of the constituent material of that lens. In the presence of dispersion, the power of a lens varies with wavelength and, hence, the chromatic aberration that develops in a single lens cannot be effectively corrected by itself. Therefore, when designing optical system that requires the correction of chromatic aberration, the common practice is to combine two or more lens elements so that the lens powers which differ with wavelength on account of dispersion cancel each other to accomplish the intended correction of chromatic aberration.

A different approach was proposed in "Applications of Diffractive Optical system", SPIE Vol. 1354, International Lens Design Conference (1990). According to this technique, annular planes that are concentric with the optical axis are formed in steps on one surface of a glass lens to provide a diffractive action so that it is used to correct the chromatic aberration that develops in the glass lens. Annular planes may be formed in steps on the surface of glass lens by etching but this method of working is not suitable for large-scale production and must be replaced by a glass molding technique. Theoretically, this technique is capable of producing single glass lenses that are corrected for chromatic aberration.

In practice, however, glass is so viscous that a structure as fine as the diffraction surface cannot be exactly transferred from the mold to the glass. If the diffraction surface cannot be transferred correctly and if portions that should have differences in height come out smooth, light other than the diffracted light of the desired order will leak out; therefore, if the molded lens is used on an optical information recording and reproducing apparatus, the diameter of a beam spot formed on the medium will increases to such an extent that the bit error rate in the writing or reading of optical information will increase. If the lens is used as a photographic lens, the flare will increase or the resolution will decrease.

Compared to glass lenses, plastic lenses have the advantage that a fine structure can be easily transferred from the mold; therefore, plastic lenses are suitable for the making of a diffraction element. However, there is high likelihood that plastic lenses already become nonuniform in refractive index in the molding process; furthermore, the performance of plastic lenses is apt to vary with the humidity of a use environment or in response to the change in humidity.

If a plastic lens whose refractive index is not uniform in its interior is used as a focusing lens, the spot diameter will increase. If that plastic lens is used as a large-aperture lens like photographic lens, marked image deterioration will take place. Therefore, plastic lenses having uneven index distribution are not suitable for use in either application.

The present invention has been accomplished under these circumstances and has as an object providing a chromatic-aberration corrected hybrid lens to which the pattern of a diffraction element can be transferred precisely and which will not experience uneven distribution of internal refractive indices even in the presence of environmental changes, etc., thereby exhibiting consistent lens performance.

Examples of the hybrid lens according to the present invention are described below with reference to the accompanying drawings. As shown schematically in FIG. 46A, the hybrid lens of the examples comprises a glass lens 201 having a refractive action and a plastic diffraction element 202 that is joined to one surface of the glass lens 201.

Depending on the type of diffraction, diffraction elements are available either as an amplitude type or as a phase type, the latter being divided into an index modulation type and a relief type. In the examples, a phase- and a relief-type diffraction element is used in view of the high utilization of light and the ease of manufacture.

Figures 46A, 46B:
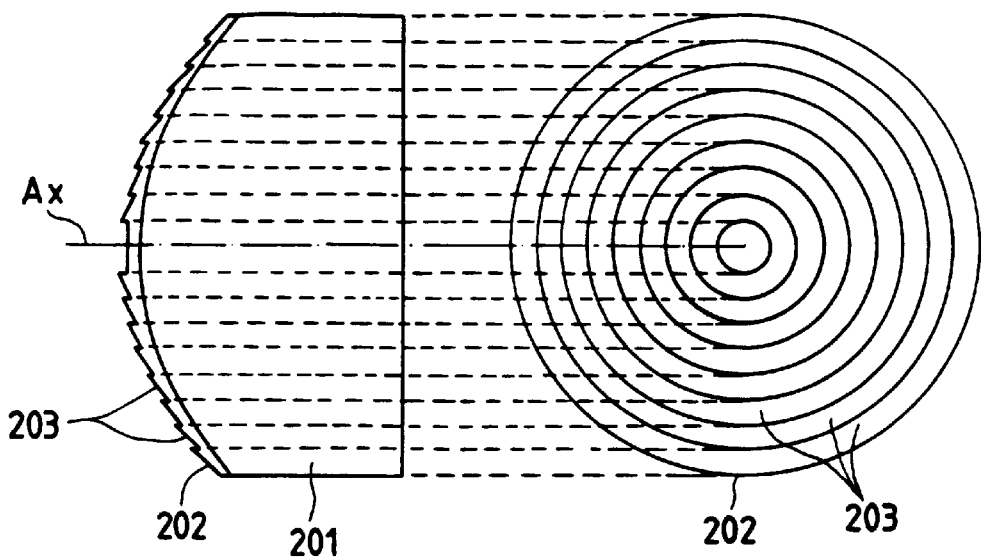
FIG. 46A is a side view showing schematically the hybrid lens according to the examples of the present invention.
FIG. 46B is a plan view of the same hybrid lens.

As shown in FIG. 46B, the side of the phase- and relief-type diffraction element 202 that is not joined to the glass lens 201 is provided with a plurality of annular surfaces 203 that are concentric with the optical axis Ax and which are formed in steps in such a way that the lens thickness increases as a function of the distance from the optical axis Ax.

An optical pathlength difference occurs between light that passes through a medium having a thickness of t and light that passes through air, and this pathlength difference is given by (n−1)t, with n being the refractive index of the medium. Therefore, the axial difference in the thickness of the diffraction element 202 between adjacent annular segments must be equal to t that is given by the following equation (1D), or an integral multiple of t:

$$t(h) = \lambda/(n-1) \tag{1D}$$

where $\lambda$ is the operating wavelength.

Furthermore, the ratio between t(n−1), or the optical pathlength difference due to t(i.e., the axial difference in the thickness of the diffraction element between individual annular segments), and wavelength $\lambda_0$ desirably satisfies the following condition (A):

$$0.8 \leq t(n-1)/\lambda_0 \leq 10 \tag{A}$$

If the hybrid lens of the examples is to be used as a bright (high NA) lens such as one that is to be used on an optical information recording and reproducing apparatus or in the case where the lens is to be used as a wide-angle lens, the ratio between t(n−1) and $\lambda_0$ desirably satisfies the following condition (2D):

$$0.8 \leq t(n-1)/\lambda_0 \leq 1.0 \tag{2D}$$

Suppose here that $t(n-1)/\lambda_0$ is unity. If a lens that uses a laser diode as a light source that operates at varying wavelengths with the reference value ($\lambda_0$) lying at 780 nm is to be manufactured from LAL 13 (trade name of Ohara Co., Ltd.; n780=1.68468), the axial difference (t) in the thickness of the diffraction element between individual annular surfaces is calculated as follows:

$$t = 0.780 \times 10^{-3}/(n-1)$$

$$= 0.780 \times 10^{-3}/0.68468 = 1.14 \times 10^{-3} \tag{3D}$$

The 1.14-$\mu$m difference in thickness is so fine that it is impossible for the glass molding technique to have the pattern of the mold transferred precisely to the highly viscous glass. It is for solving this problem that the plastic diffraction element 202 is used in the present invention.

Example 1D

Figure 47:
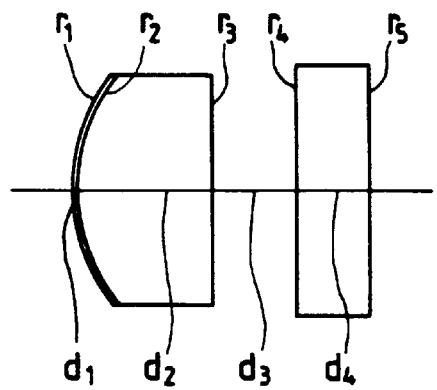
FIG. 47 is a simplified diagram showing schematically an objective lens that uses the hybrid lens of Example 1D.

FIG. 47 shows optical system that uses the hybrid lens according to Example 1D of the present invention, in which the hybrid lens is used as an objective lens in an optical disk system. Beams of parallel light entering the optical system from the left are focused by the objective lens composed of glass lens 201 and diffraction element 202, so as to form a spot on the recording surface located on the inner (right) side of the cover glass of the optical disk D.

The surface that is on the left side, or the side the closest to the object, is a discontinuous surface on which annular segments are formed and which serves as a diffracting surface. The base curve which is a macroscopic shape of that discontinuous surface is aspheric. Glass lens 201 has a spherical surface on both sides.

Figure 48:
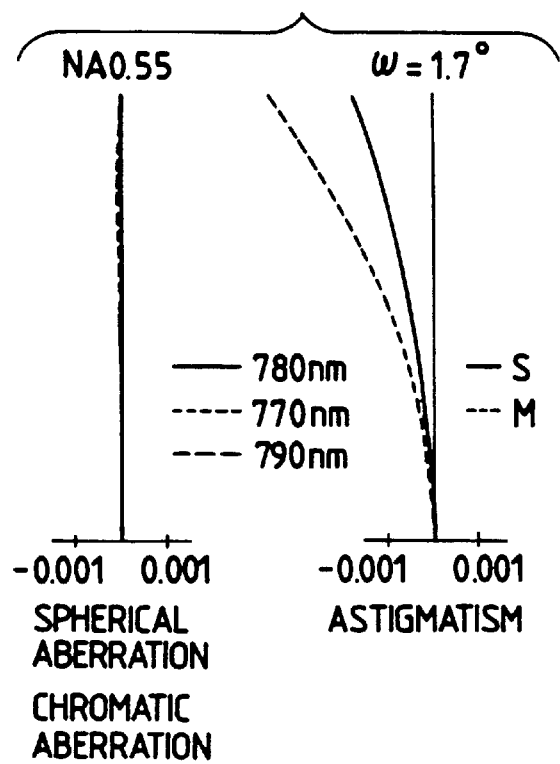
FIG. 48 is a set of graphs plotting the aberration curves obtained with the objective lens shown in FIG. 47.

The specific numerical data for Example 1D are listed in Table 1D, in which symbol $\lambda_0$ denotes the operating wavelength, f the focal length, NA the numerical aperture, r the radius of curvature, d the lens thickness or the aerial distance between individual lenses, and the refractive index at the d-line, vd the Abbe number, and n780 the refractive index at the wavelength 780 nm. FIG. 48 shows the two aberrations that develop in the system composed in accordance with the data listed in Table 1D: chromatic aberration expressed in terms of spherical aberrations at 770 nm, 780 nm and 790 nm, as well as astigmatism (S, sagittal; M, meridional).

TABLE D1

| | $\lambda_0$ = 780 nm | f = 3.30 mm | NA = 0.55 | | |
|---|---|---|---|---|---|
| Surface No. | r | d | nd | vd | n780 |
| 1 | Diffracting surface | 0.40 | | | 1.51653 |
| 2 | 2.900 | 2.110 | 1.89799 | 34.0 | 1.88115 |
| 3 | 42.460 | 1.339 | | | |
| 4 | ∞ | 1.200 | 1.58547 | 29.9 | 1.57346 |
| 5 | ∞ | | | | |

The shape of the first surface of the hybrid lens is given by the coefficients listed in Table 2D (see below) if the sag X(h) of the aspheric surface at the point that is departed from the optical axis by distance h is defined by the following equation (4D) which has the term $\Delta N$ added to the common expression of aspheric surface. Symbol N denotes the number for the annular segment to which the point at height h belongs, and each of the coefficients that define the aspheric surface is a function of N. Symbol INT(x) denotes a function for separating out the integral part of x:

$$X(h) = h^2 \Big/ \left( r_N * \left(1 + \sqrt{1 - (1 + K_N) * h^2 / r_N^2}\right) \right) + \quad (4D)$$
$$A4_N * h^4 + A6_N * h^6 + A8_N * h^8 + A10_N * h^{10} + \Delta_N$$

where r is the radius of curvature of the vertex of the aspheric surface; K is the conic constant; and A4, A6, A8 and A10 are the aspheric coefficients of the fourth, sixth, eighth and tenth orders, respectively.

TABLE 2D

N = INT (7.20 × $h^2$ + 0.33 × $h^4$ × 0.5)
rN = 2.700 + 5.13 × $10^{-4}$ × N
KN = −0.5000
A4N = −1.570 × $10^{-3}$ + 1.00 × $10^{-6}$ × N
A6N = −1.900 × $10^{-4}$ + 3.02 × $10^{-7}$ × N
A8N = −1.900 × $10^{-5}$ + 1.51 × $10^{-8}$ × N
A10N = −9.000 × $10^{-7}$
$\Delta N$ = −0.001510 × N In the case where an objective lens is manufactured from a high-index glass, lens performance satisfactory as a high-NA objective lens can be achieved without using an aspheric surface and, therefore, a spherical lens can effectively be used as in Example 1D discussed above.

Example 2D

Figure 49:
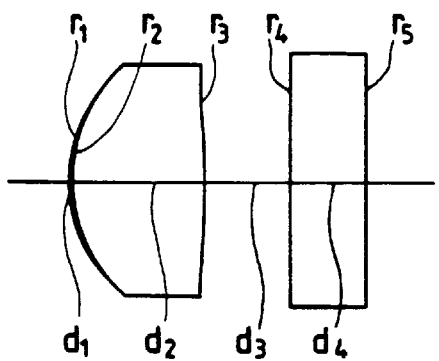
FIG. 49 is a simplified diagram showing schematically an objective lens that uses the hybrid lens of Example 2D.
Figure 50:
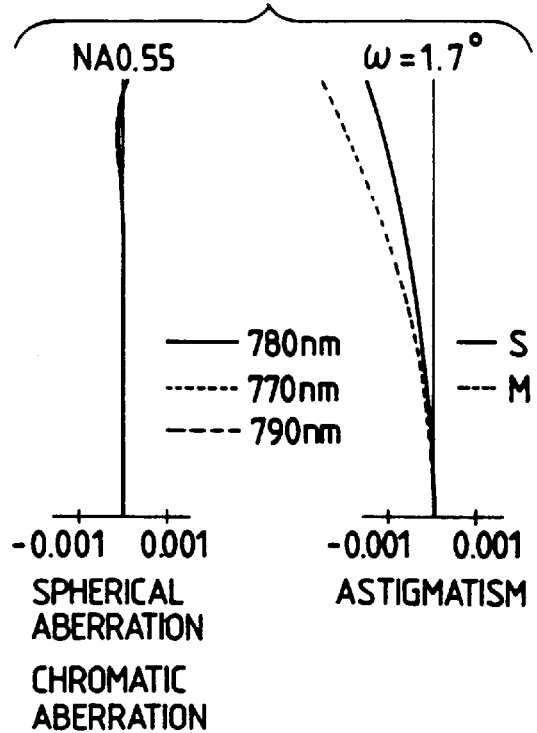
FIG. 50 is a set of graphs plotting the aberration curves obtained with the objective lens shown in FIG. 49.

FIG. 49 shows optical system that uses the hybrid lens according to Example 2D of the present invention. In this example, too, the hybrid lens is used as an objective lens in an optical disk system. The specific numerical data for Example 2D are listed in Table 3D. The first surface of the hybrid lens under consideration is a diffraction surface whereas the third surface is an ordinary smooth aspheric surface. FIG. 50 shows the aberrations that develop in the system composed in accordance with the data listed in Table 3D.

TABLE 3D

| | $\lambda_0$ = 780 nm | f = 3.30 mm | NA = 0.55 | | |
|---|---|---|---|---|---|
| Surface No. | r | d | nd | vd | n780 |
| 1 | Diffracting surface | 0.040 | | | 1.51653 |
| 2 | 2.400 | 2.110 | 1.58913 | 61.2 | 1.58252 |
| 3 | Aspheric surface | 1.355 | | | |
| 4 | ∞ | 1.200 | 1.58547 | 29.9 | 1.57346 |
| 5 | ∞ | | | | |

The shape of the first surface is given by the coefficients listed in Table 4D (see below) if the sag X(h) of the aspheric surface at the point that is departed from the optical axis by distance h is defined by the aforementioned equation (4D).

TABLE 4D

N = INT (4.41 × $h^2$ + 0.20 × $h^4$ + 0.5)
rN = 2.182 + 5.14 × $10^{-4}$ × N
KN = −0.3610
A4N = −1.731 × $10^{-3}$ + 1.27 × $10^{-6}$ × N
A6N = −2.010 × $10^{-4}$ + 4.23 × $10^{-7}$ × N
A8N = −3.170 × $10^{-5}$ − 6.04 × $10^{-9}$ × N
A10N = 6.000 × $10^{-7}$ + 6.04 × $10^{-9}$ × N
$\Delta N$ = −0.001510 × N The asphericity of the third surface is given by the coefficients listed in Table 5D (see below) if the sag X(h) of the aspheric surface at the point that is departed from the optical axis by distance h is defined by the following equation (5D), in which the respective symbols have the same meanings as in equation (4D).

The lower the refractive index, the lower the temperature at which optical materials can be molded to fabricate glass molded lenses. Therefore, using a low-index optical material is desired when making a glass lens by the molding method. In that case, the surface of the lens on the side that is opposite the side where the cemented surface lies may be rendered aspheric as in Example 2D and this lens design is effective in correcting chromatic aberration by a sufficient degree to make it satisfactory as a high-NA objective lens.

$$X(h) = h^2 \Big/ \left( r \times \left(1 + \sqrt{1 - (1 + K) \times h^2 / r^2}\right) \right) + \quad (5D)$$
$$A4 \times h^4 + A6 \times h^6 + A8 + h^8 + A10 \times h^{10}$$

TABLE 5D r = −9.585
K = 0.000
A4 = 1.320 × $10^{-2}$
A6 = −2.520 × $10^{-3}$

TABLE 5D-continued

A8 = 5.580 × 10$^{-4}$
A10 = -5.340 × 10$^{-5}$

Figure 51:
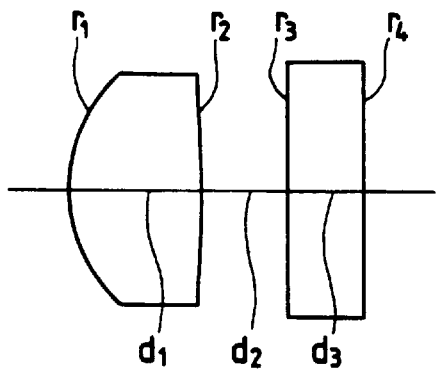
FIG. 51 is a simplified diagram showing schematically an objective lens that is a comparison with Example 2D in that it does not have a diffraction element.
Figure 52:
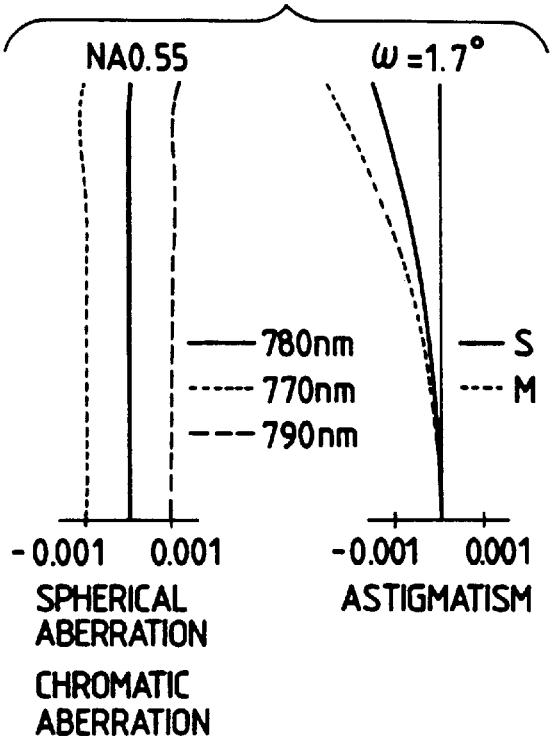
FIG. 52 is a set of graphs plotting the aberration curves obtained with the objective lens shown in FIG. 51.

FIG. 51 shows a prior art single lens that has an aspheric surface on both sides and which performs as well as the lens of Example 2D except in chromatic aberration. The specific numerical data for that prior art lens are listed in Table 6D (see below) and the associated aspheric coefficients are as listed in Table 7D (also see below). The aberrations that develop in the system composed to those data are shown in FIG. 52. Comparing FIGS. 50 and 52, one can clearly see the chromatic aberration correcting effect of the diffraction element.

TABLE 6D $\lambda_0$ = 780 nm    f = 3.30 mm    NA = 0.55

| Surface No. | r | d | nd | vd | n780 |
|---|---|---|---|---|---|
| 1 | Aspheric surface | 2.145 | 1.58913 | 61.2 | 1.58252 |
| 2 | Aspheric surface | 1.355 | | | |
| 3 | ∞ | 1.200 | 1.58547 | 29.9 | 1.57346 |
| 4 | ∞ | | | | |

TABLE 7D

| 1st Surface | 2nd Surface |
|---|---|
| r = 2.206 | r = -9.585 |
| K = -0.328 | K = 0.000 |
| A4 = -0.150 × 10$^{-2}$ | A4 = 0.132 × 10$^{-1}$ |
| A6 = -0.167 × 10$^{-3}$ | A6 = -0.252 × 10$^{-2}$ |
| A8 = -0.305 × 10$^{-4}$ | A8 = 0.558 × 10$^{-3}$ |
| A10 = 0.800 × 10$^{-6}$ | A10 = -0.530 × 10$^{-4}$ |

According to Examples 1D and 2D, objective lenses can be provided that are of substantially the same size and weight as the prior art aspheric lens and which yet are effectively corrected for chromatic aberration. As a further advantage, the portion of those lenses that has a refractive power is a glass lens and, hence, the imaging performance of the lenses is completely immune to the effect of humidity changes and substantially immune to temperature changes.

Example 3D

Figure 53:
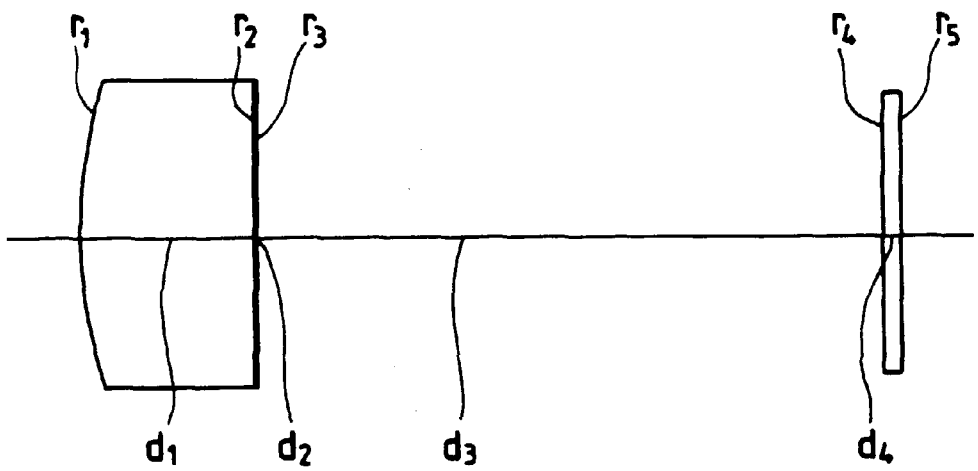
FIG. 53 is a simplified diagram showing schematically a collimator lens that uses the hybrid lens of Example 3D.
Figure 54:
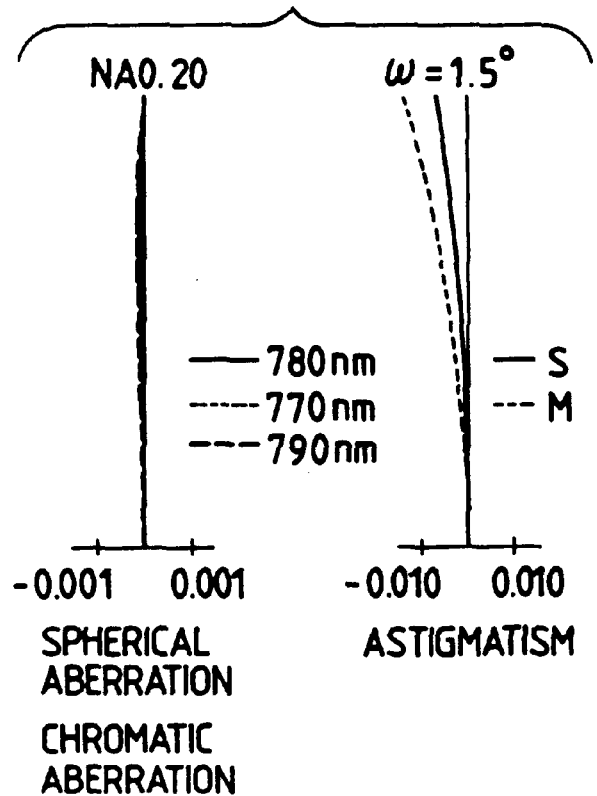
FIG. 54 is a set of graphs plotting the aberration curves obtained with the collimator lens shown in FIG. 53.

FIG. 53 shows optical system that uses the hybrid lens according to Example 3D of the present invention. In this example, the hybrid lens is used as a collimator lens in an optical disk apparatus. Plane parallel plate C shown on the right side of FIG. 53 is a cover glass for the laser diode. The specific numerical data for Example 3D are shown in Table 8D. In the example under consideration, the first surface is an ordinary aspheric surface and the third surface is a diffraction surface. FIG. 54 shows the aberrations that develop in the system composed in accordance with the data listed in Table 8D.

TABLE 8D $\lambda_0$ = 780 nm    f = 10.8 mm    NA = 0.20

| Surface No. | r | d | nd | vd | n780 |
|---|---|---|---|---|---|
| 1 | Aspheric surface | 2.460 | 1.67790 | 55.3 | 1.66959 |
| 2 | ∞ | 0.040 | | | 1.51653 |
| 3 | Diffracting surface | 9.000 | — | | |
| 4 | ∞ | 0.250 | 1.51633 | 64.1 | 1.51072 |
| 5 | ∞ | — | | — | |

The asphericity of the first surface is given by the coefficients listed in Table 9D (see below) if the sag X(h) of the aspheric surface at the point that is departed from the optical axis by distance h is defined by the aforementioned equation (5D).

TABLE 9D r = 7.231
K = -0.5933
A4 = 0.000
A6 = -3.440 × 10$^{-7}$
A8 = -4.370 × 10$^{-9}$
A10 = 0.000

The shape of the third surface is given by the coefficients listed in Table 10D (see below) if the sag X(h) at the point that is departed from the optical axis by distance h is expressed by the following equation (6D):

$$X(h) = \Delta N \tag{6D}$$

TABLE 10D

N = INT (2.61 × h$^2$ - 0.0212 × h$^4$ + 0.5)
ΔN = 0.001510 × N

With a high-NA lens, beams of light enter the diffraction element obliquely in the peripheral portion of the lens and, therefore, compared to the central portion where almost normal incidence occurs, the peripheral portion of the lens provides a longer optical path even if the two areas have the same thickness. Hence, in order to insure that the phase difference for each annular segment is the same in both the central and peripheral portions, the difference in the thickness of the diffraction element between individual annular segments must be rendered to decrease from the center outward.

Consider, for example, a lens having a comparable NA to that employed in Example 3D; in such a lens, continuity in phase can be assured by making the difference in thickness between annular segments in the outermost area smaller than the difference in the central area by about 1%. However, the discontinuity in phase that occurs if the difference in thickness between annular segments is made equal in the whole part of the lens will cause no problem in practical applications. Therefore, in Example 3D under discussion, ΔN is expressed as a linear function of N and the difference in thickness between individual annular segments is set to be equal in both the central and peripheral parts of the lens.

It should also be mentioned that in the case of a lens like that of Example 3D which does not have a very large NA, forming the diffraction surface of a plane surface alone is desired in view of the ease with which mold working and shape measurement can be accomplished.

Example 4D

Figure 55:
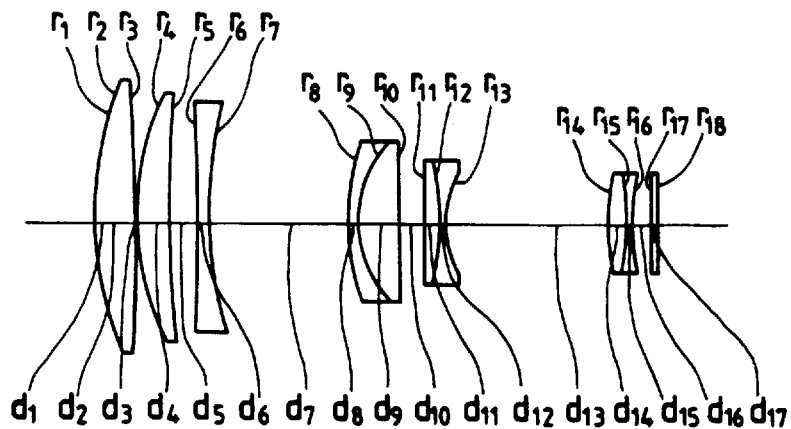
FIG. 55 is a simplified diagram showing schematically a telephoto lens system that uses the hybrid lens of Example 4D.

FIG. 55 shows optical system in which the hybrid lens of Example 4D of the present invention is used as part of a telephoto lens system. The specific numerical data for Example 4D are listed in Table 11D (see below), in which symbol ω denotes the half view angle and fb the back focus.

A diffraction element formed of a thermosetting plastic material is joined to the object side (which is on the left as seen in FIG. 55) of the first lens of this telephoto lens system which is positioned the closest to the object. However, because of the small thickness of the diffraction element, the first and second surfaces are shown to overlap each other in FIG. 55.

Figure 56:
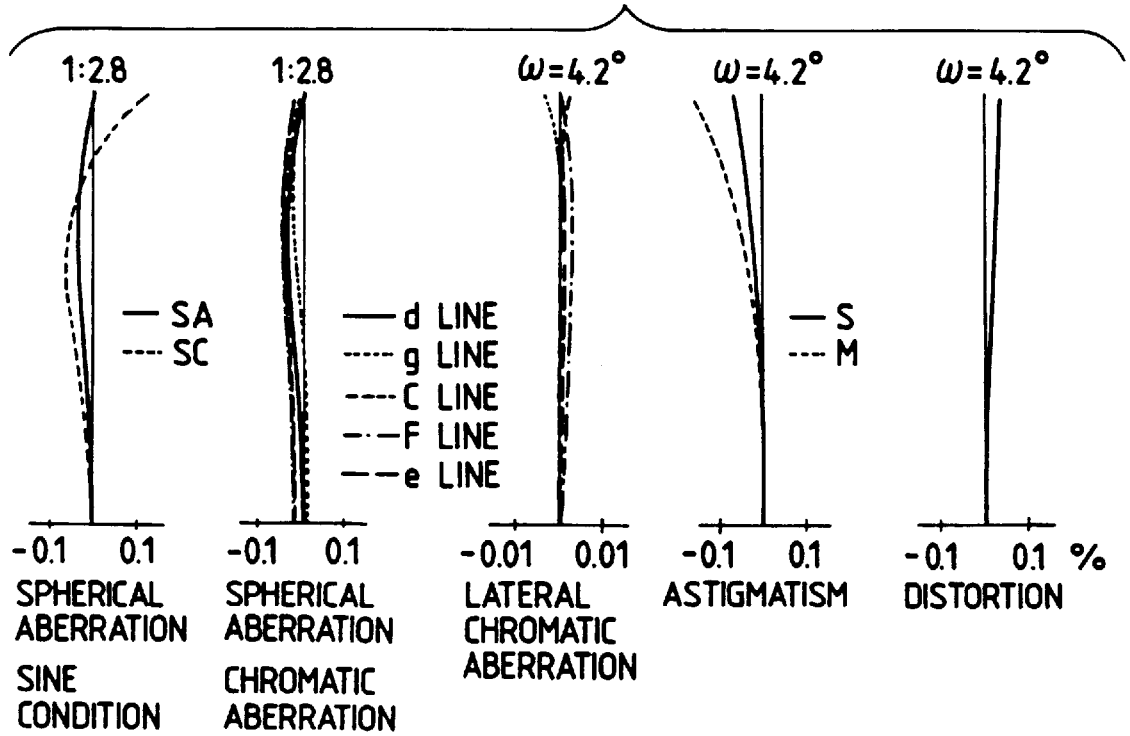
FIG. 56 is a set of graphs plotting the aberration curves obtained with the telephoto lens system shown in FIG. 55.

The telephoto lens system under consideration is intended to be used in a wavelength band of 435 to 656 nm and the reference wavelength $\lambda_0$ for the diffraction element at the time of its design is 546.07 nm. FIG. 56 shows the aberrations that develop in the system composed in accordance with the data listed in Table 11D.

TABLE 11D f = 293.1 mm (at 588 nm)
NA = 2.8   ω = 4.2°   fb = 72.40

| Surface No. | r | d | nd | νd |
|---|---|---|---|---|
| 1 | Diffracting surface | 0.04 | 1.52249 | 59.8 |
| 2 | 134.989 | 14.76 | 1.51633 | 64.1 |
| 3 | −1430.844 | 2.20 | — | |
| 4 | 113.600 | 11.80 | 1.51633 | 64.1 |
| 5 | 525.000 | 8.98 | — | |
| 6 | ∞ | 5.50 | 1.80610 | 33.3 |
| 7 | 178.352 | 50.0 | — | |
| 8 | 86.700 | 3.00 | 1.79952 | 42.2 |
| 9 | 42.660 | 14.80 | 1.62041 | 60.3 |
| 10 | 496.238 | 10.42 | — | |
| 11 | −585.886 | 5.00 | 1.80518 | 25.4 |
| 12 | −97.810 | 3.20 | 1.58875 | 51.2 |
| 13 | 50.630 | 60.09 | — | |
| 14 | 96.200 | 6.60 | 1.69680 | 55.5 |
| 15 | −80.000 | 2.70 | 1.53172 | 48.9 |
| 16 | 113.576 | 7.00 | — | |
| 17 | ∞ | 2.00 | 1.51633 | 64.1 |
| 18 | ∞ | — | — | |

The shape of the first surface is given by the coefficients listed in Table 12D (see below) if the sag X(h) at the point that is departed from the optical axis by distance h is expressed by the following equation (7D). The effective radius of the first lens is 52.3 mm and its first surface is a diffracting surface composed of 133 annular surfaces:

$$X(h) = rNx\left(1 - \sqrt{1 - h^2/rN^2}\right) + \Delta N \quad (7D)$$

Figure 57:
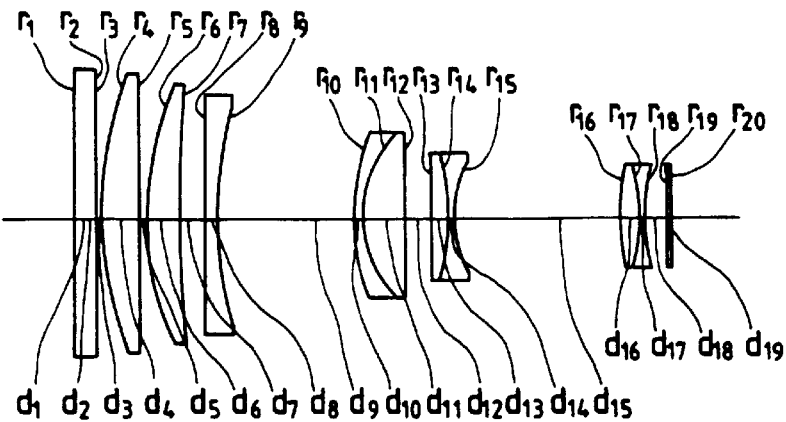
FIG. 57 is simplified diagram showing schematically a telephoto lens system that is a modification of Example 4D in that it has a diffraction element provided on a filter.

TABLE 12D $N = \text{INT}(4.43 \times 10^{-2} \times h^2 + 1.54 \times 10^{-6} \times h^4 + 0.5)$
$rN = 135.029 + 3.58 \times 10^{-4} \times N$
$\Delta N = -0.001041 \times N$ FIG. 57 shows a modification of the telephoto lens of Example 4D, in which the hybrid lens positioned the closest to the object is replaced by a single lens having no diffraction element and in which a chromatic aberration correcting filter joined with a diffraction element is positioned closer to the object than the single lens. The diffraction element is joined to the image side of the filter. In this case, too, the diffraction element is so thin that the second and third surfaces are shown to overlap each other in FIG. 57.

The specific numerical data for this modified lens system are as listed in Table 13D. The fifth and subsequent surfaces have the same data as the third and subsequent surfaces in the lens system of Example 4D and the aberration and other performance characteristics of the two lens systems are also the same.

TABLE 13D

| Surface No. | r | d | nd | νd |
|---|---|---|---|---|
| 1 | ∞ | 8.00 | 1.51633 | 64.1 |
| 2 | ∞ | 0.04 | 1.52249 | 59.8 |
| 3 | Diffracting surface | 2.00 | — | |
| 4 | 135.029 | 14.80 | 1.51633 | 64.1 |
| 5 | −1430.844 | 2.00 | — | |
| 6 | 113.600 | 11.80 | 1.51633 | 64.1 |
| 7 | 525.000 | 8.98 | — | |
| 8 | ∞ | 5.50 | 1.80610 | 33.3 |
| 9 | 178.352 | 50.00 | — | |
| 10 | 86.700 | 3.00 | 1.79952 | 42.2 |
| 11 | 42.660 | 14.80 | 1.62041 | 60.3 |
| 12 | 496.238 | 10.42 | — | |
| 13 | −585.886 | 5.00 | 1.80518 | 25.4 |
| 14 | −97.810 | 3.20 | 1.58875 | 51.2 |
| 15 | 50.630 | 60.09 | — | |
| 16 | 96.200 | 6.60 | 1.69680 | 55.5 |
| 17 | −80.000 | 2.70 | 1.53172 | 48.9 |
| 18 | 113.576 | 7.00 | — | |
| 19 | ∞ | 2.00 | 1.51633 | 64.1 |
| 20 | ∞ | — | — | |

The shape of the third surface is given by the coefficients listed in Table 14D (see below) if the sag X(h) at the point that is departed from the optical axis by distance h is expressed by the aforementioned equation (6D).

Figure 58:
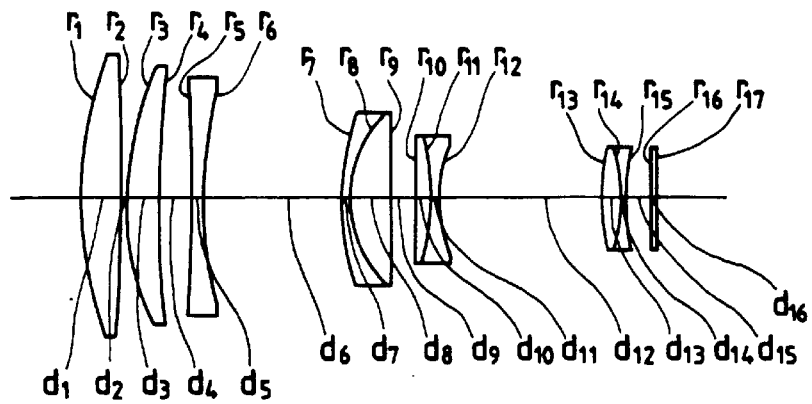
FIG. 58 is a simplified diagram showing schematically a telephoto lens system that is a comparison with Example 4D in that it does not have a diffraction element.
Figure 59:
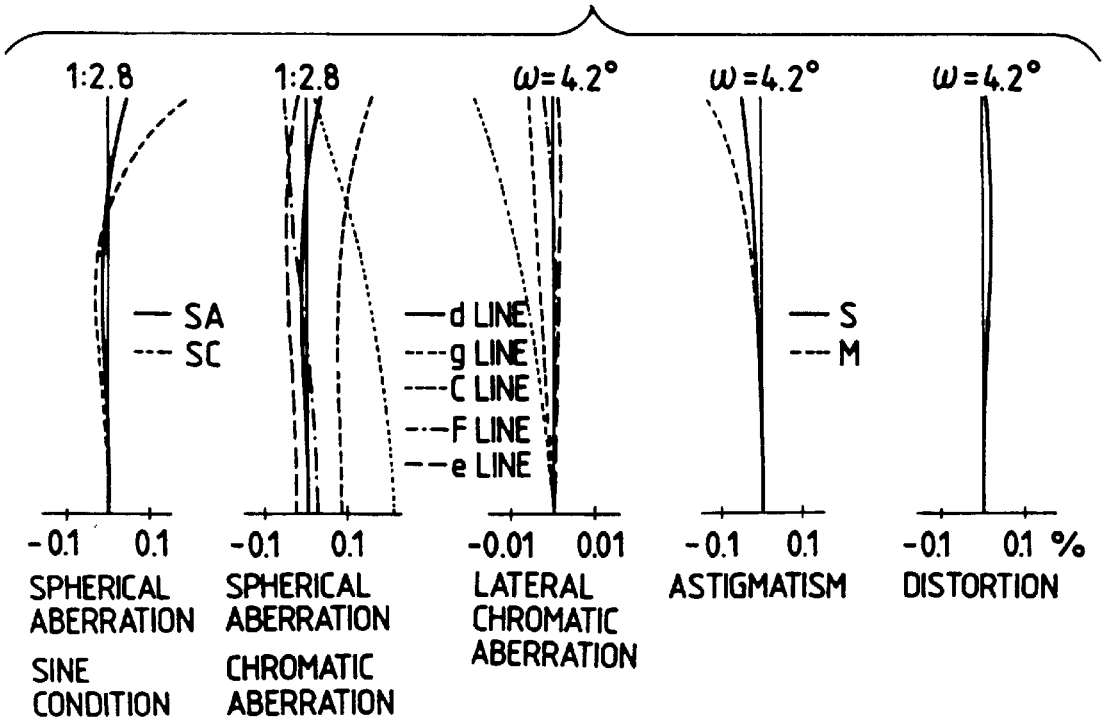
FIG. 59 is a set of graphs plotting the aberration curves obtained with the telephoto lens system shown in FIG. 58.

TABLE 14D $N = \text{INT}(4.43 \times 10^{-2} \times h^2 + 1.51 \times 10^{-6} \times h^4 + 0.5)$
$\Delta N = 0.001041 \times N$ FIG. 58 shows a telephoto lens system that has comparable performance to the system of Example 4D, except that chromatic aberration is corrected by a particular combination of optical materials without using a diffraction element. The specific numerical data for this lens system are as listed in Table 15D. The aberrations that develop in the system composed in accordance with those data are as shown in FIG. 59. Comparing FIGS. 56 and 59, one can see that if a diffraction element is used, chromatic aberration can selectively be corrected in a very efficient manner without affecting other performance characteristics.

TABLE 15D f = 293.1 mm (at 588 nm)
NA = 2.9   ω = 4.2°   fb = 72.00

| Surface No. | r | d | nd | νd |
|---|---|---|---|---|
| 1 | 140.152 | 14.80 | 1.49700 | 81.6 |
| 2 | −1148.125 | 2.00 | — | |
| 3 | 111.252 | 11.80 | 1.49700 | 81.6 |
| 4 | 440.000 | 10.33 | — | |
| 5 | ∞ | 5.50 | 1.72047 | 34.7 |

TABLE 15D-continued f = 293.1 mm (at 588 nm)
NA = 2.9   ω = 4.2°   fb = 72.00

| Surface No. | r | d | nd | vd |
|---|---|---|---|---|
| 6 | 180.590 | 49.79 | — | |
| 7 | 86.700 | 3.00 | 1.79952 | 42.2 |
| 8 | 42.690 | 14.50 | 1.62041 | 60.3 |
| 9 | 496.238 | 9.73 | — | |
| 10 | −585.886 | 5.00 | 1.80518 | 25.4 |
| 11 | −97.810 | 3.20 | 1.58875 | 51.2 |
| 12 | 50.630 | 60.11 | — | |
| 13 | 96.200 | 6.60 | 1.69680 | 55.5 |
| 14 | −80.000 | 2.70 | 1.53172 | 48.9 |
| 15 | 113.576 | 8.67 | — | |
| 16 | ∞ | 2.00 | 1.51633 | 64.1 |
| 17 | ∞ | — | — | |

The foregoing description in Examples 1D to 4D is limited to the case where the hybrid lens of the present invention is used either as an objective or collimator lens for optical disk or as part of a telephoto lens system. It should, however, be noted that the hybrid lens is also applicable to other types of optical system unless the view angle is very wide.

As described above, the present invention combines a glass lens with a plastic diffraction element so as to provide a chromatic aberration corrected hybrid lens whose performance is less susceptible to environmental changes and to which a diffraction pattern can be transferred in an exact manner.

The following embodiments of the present invention relate to an optical device for correcting chromatic aberration by making use of the reflection and diffraction of light.

According to yet another aspect of the present invention, there is provided an optical device that is capable of correcting the chromatic aberration that develops in a single lens when the operating wavelength is offset from the reference value. Stated more specifically, if a wavefront aberration (chromatic aberration) occurs in a single lens when the operating wavelength is offset from the reference value, the chromatic aberration correcting device of a reflection and diffraction type according to the present invention cancels that aberration by creating at a reflecting surface a divergent or convergent wavefront of opposite nature.

The chromatic aberration correcting device of a reflection and refractive type according to the present invention may be used not only for correcting the chromatic aberration that develops in a single lens but also for correcting the chromatic aberration that develops in a hybrid lens. A plurality of lens elements sometimes fails to correct chromatic aberration for various reasons associated with refractive index, transmittance, etc. and, especially at short wavelengths near $\lambda=300$ nm, only one type of optical material is available and the correction of chromatic aberration is difficult to accomplish. The chromatic aberration correcting device of a reflection and diffraction type according to the present invention is capable of correcting chromatic aberration even in such short wavelength range.

In one embodiment of the invention, the contours of the central reflecting surface and the annular reflecting surfaces in the chromatic aberration correcting device are made circular as seen in a direction perpendicular to those reflecting surfaces and the step distance t between adjacent reflecting surfaces is set to be as follows:

$t=\lambda m/2n$ (m is an integer)

where $\lambda$ is the reference wavelength within the operating wavelength band, and n is the refractive index of the reflecting surface on the incident side.

If the correcting device is to be inserted in the optical path obliquely, the contours of the central reflecting surface and the annular reflecting surfaces may be rendered elliptical as seen in a direction perpendicular to those reflecting surfaces and the step distance t is set to be as follows:

$t=A\lambda m/2n$ (m is an integer)

where $\lambda$ is the reference wavelength within the operating wavelength band, n is the refractive index of the reflecting surface on the incident side, and A is the ratio between the major and minor axes of the ellipse.

The value of m desirably satisfies the condition $1 \leq |m| \leq 10$. The zero value of m means a reflecting mirror the surface of which is planar as a whole; therefore, a chromatic aberration correcting device of a reflection and diffraction type cannot be fabricated unless m is 1 or more. On the other hand, if m exceeds 10, a serious disadvantage will occur under great variations in wavelength in that the proportion of light of higher-order diffraction increases to lower the efficiency of light utilization. The sign of the value m determines whether the reflecting surface, taken as a whole, is macroscopically convex or concave.

If the width of each annular reflecting surface is set to be in inverse proportion to the square of the distance from the optical axis, the wavefront generated upon variation in the wavelength of incident light can be made generally spherical. If the lens to be combined is expected to experience a large change in spherical aberration on account of the variation in wavelength, it may be corrected by properly adjusting the width of annular segments on the reflecting surface in design stage; however, from the viewpoint of wide applicability, it suffices that the width of each annular reflecting surface is set to be in inverse proportion to the square of the distance from the optical axis.

The central reflecting surface and the annular reflecting surfaces may comprise planes that are parallel to one another; alternatively, those surfaces may be curved.

The chromatic aberration correcting device of a reflection and diffraction type according to the present invention is to be combined with a lens to correct the chromatic aberration that will occur in that lens. Stated more specifically, when light having a wavelength different from a reference wavelength enters the lens, it will develop chromatic aberration and in order to correct this aberration, the device of the present invention changes the wavefront of the incident light by means of reflection.

The present invention also provides a chromatic aberration correcting apparatus, in which the chromatic aberration correcting device of a reflection and diffraction type described above is inserted in the optical path between a collimator for collimating the light entering a lens and the lens. An exemplary application of this apparatus is to correct the aberration that develops in a single lens used for focusing laser light to form a spot on an optical disk in an optical information recording and reproducing apparatus.

EXAMPLES

Figure 60:
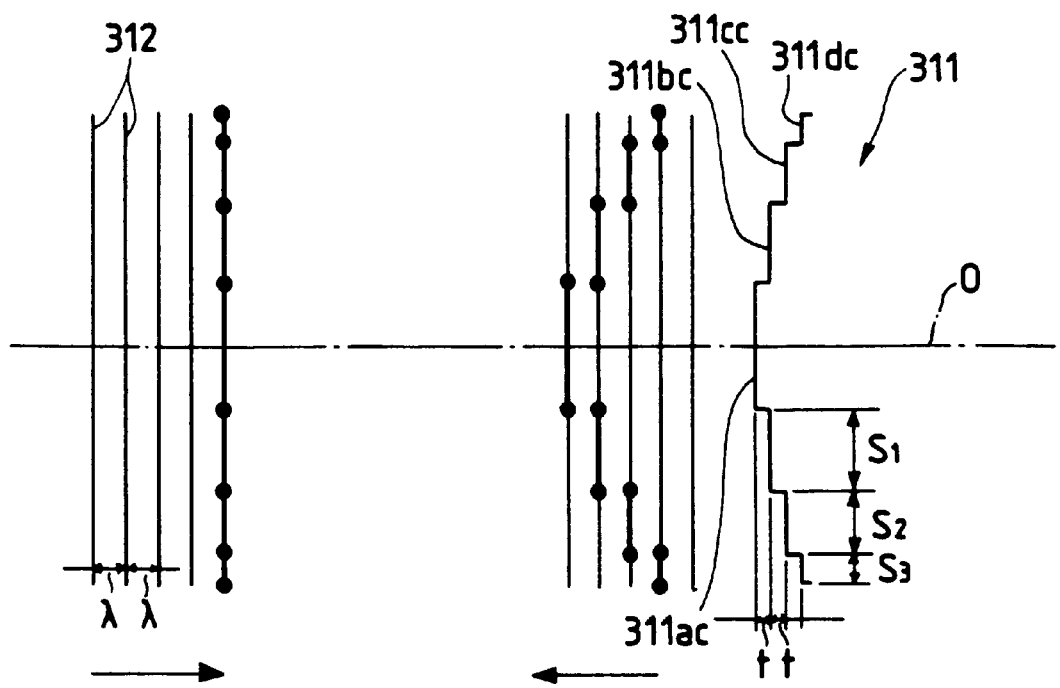
FIG. 60 is a cross-sectional view illustrating the operating principle of the chromatic aberration correcting device of a reflection and diffraction type according to one embodiment of the present invention.
Figure 61:
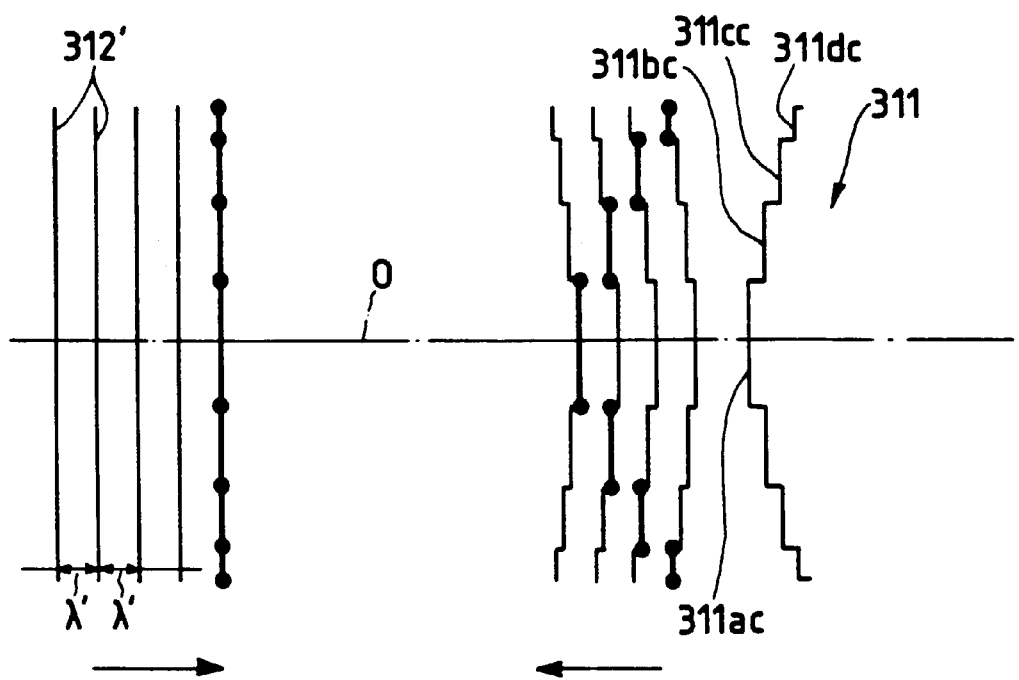
FIG. 61 is another cross-sectional view that also illustrates the operating principle of the chromatic aberration correcting device of a reflection and diffraction type according to the present invention.

The present invention is described below with reference to the examples shown in the accompanying drawings. FIGS. 60 and 61 show the operating theory of the chromatic aberration correcting device of the present invention.

Reference is first made to FIG. 60. The chromatic aberration correcting device of a reflection and diffraction type which is generally indicated by 311 comprises a circular central reflecting surface 311ac on the optical axis O and three coaxial circular annular reflecting surfaces 311bc, 311cc and 311dc that are located around the central reflecting surface 311ac. Only three annular reflecting surfaces are shown in FIG. 60 but in practice the correcting device of the present invention will be provided with from 10 to about 100 annular reflecting surfaces. The prior art diffractive lens has as many as several hundred annular segments and this is one of the factors by which the chromatic aberration correcting device of a reflection and diffraction type according to the present invention can be distinguished from the conventional diffractive lens.

The circular central reflecting surface 311ac and the circular annular reflecting surfaces 311bc, 311cc and 311dc comprise planes that are parallel to one another and which are offset in position along the optical axis O by step distance t; taken as a whole, those reflecting surfaces produce a macroscopically convex shape. For the sake of clarity, let the correcting device 311 be assumed to be in air (n=1). Also assume that the reference wavelength of light entering the reflecting surface is $\lambda$. Then, the step distance t is given by $t=\lambda/2$ and this corresponds to the case where m=1 and n=1 in the equation $t=\lambda m/2n$.

Consider here the case where plane-wave light (beams of parallel light) having the reference wavelength $\lambda$ enter the correcting device 311. Adjacent lines 312 indicate the positions taken along the optical path by the travelling plane-wave light of a specified phase (e.g. 0°) having the reference wavelength $\lambda$. Since the light having the reference wavelength satisfies the condition $t=\lambda/2$, it will remain as a plane wave even after it has been reflected by the circular central reflecting surface 311ac or the circular annular reflecting surfaces 311bc–311dc.

Stated in general terms, the optical pathlength difference that occurs upon reflection in a medium (refractive index, n; thickness, t) along the optical path is given by 2nt. Therefore, if the correcting device 311 has step-like reflecting surfaces whose step distance is t as expressed by $t(h)=\lambda/2n$ (h is the distance from the optical axis O), or mt (m is an integer), the wavefront of the light having the reference wavelength will in no way change in shape after reflection since if it is reflected by adjacent reflecting areas, the only change that occurs to its wavefront is a phase shift of $m\lambda$ and the reflected light will keep on travelling without changing its wavefront.

FIG. 61 shows the case where a plane wave having a wavelength $\lambda'$ slightly longer than the reference wavelength $\lambda$ enters the correcting device 311 which is the same as shown in FIG. 60. The distance between adjacent lines 312' is longer than the distance between adjacent lines 312 (see FIG. 60) by the shift in wavelength. In the case of reflection by the correcting device 311, the light that is reflected by the circular central reflecting surface 311ac travels the shortest distance through the medium whereas the light that is reflected by the circular annular reflecting surface 311dc will travel the longest distance. It should also be noted that light having a wavelength longer than the reference wavelength has such a nature that the longer the distance it travels, the more advanced its wavefront is. As a result, the phase of the wavefront of light that has been reflected by the circular central reflecting surface 311ac and the circular annular reflecting surfaces 311bc–311dc will lead as a function of the distance from the optical axis O and the wavefronts of the reflected light beams will, taken as a whole, be curved to create a single convergent wavefront. In other words, the correcting device 311 having step-like reflecting surfaces that provide macroscopically a shape convex to the ray entrance side will cause incident plane-wave light to be reflected as a convergent wavefront if it has a longer wavelength than the reference wavelength. This is equivalent to saying that the light reflection by the correcting device 311 will produce a chromatic aberration that cancels off the chromatic aberration that develops in a positive lens having a refractive action and the device can accordingly accomplish the necessary correction of chromatic aberration.

Conversely, the wavefront of light having a shorter wavelength than the reference wavelength will lag as it travels a longer distance through the medium and, hence, it is rendered divergent by the action of the correcting device 311. In other words, the correcting device 311 which has step-like reflecting surfaces that provide macroscopically a shape convex to the ray entrance side will cause incident plane-wave light to be reflected as a divergent wavefront if it has a shorter wavelength than the reference wavelength. This is equivalent to saying that the light reflection by the correcting device 311 will produce a chromatic aberration that cancels off the chromatic aberration that develops in a negative lens having a refractive action and the device can accordingly accomplish the necessary correction of chromatic aberration.

Whether the step-like reflecting surfaces to be formed on the correcting device 311 produce a macroscopically convex or concave shape depends on various factors such as whether the chromatic aberration to be corrected develops in a positive lens or a negative lens.

The widths s1, s2 and s3 of the circular annular reflecting surfaces 311bc, 311cc and 311dc, respectively, are each set to be in inverse proportion to the square of the distance from the optical axis O.

Figure 62:
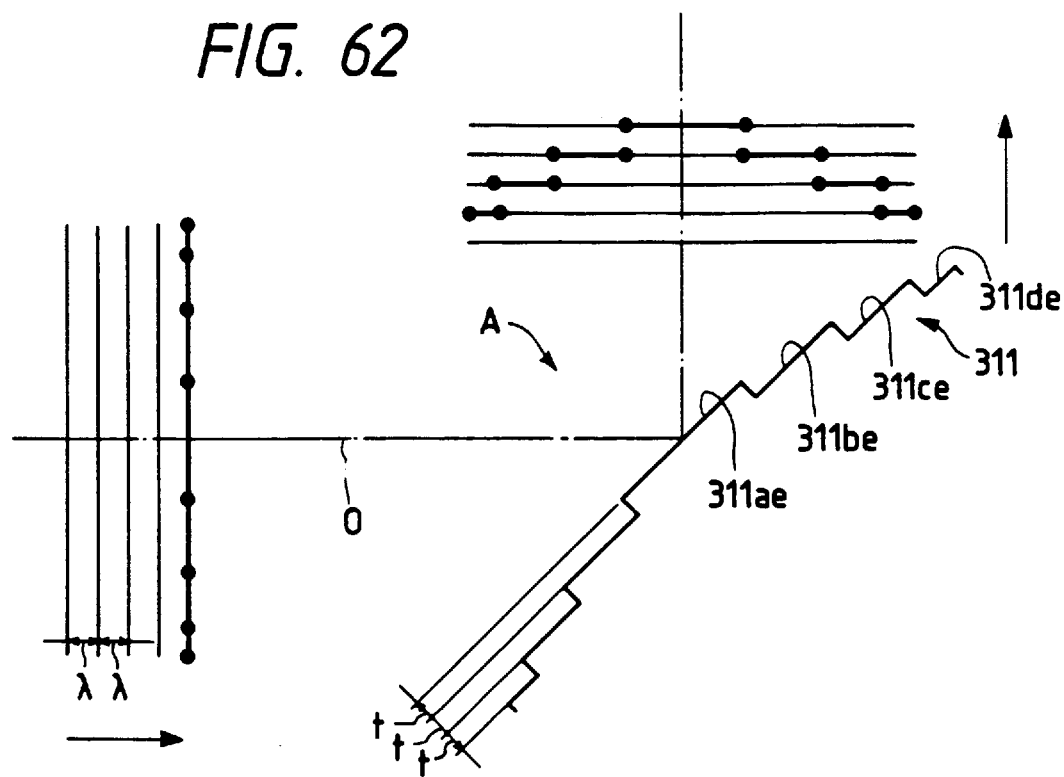
FIG. 62 is a cross-sectional view showing the operating principle of the chromatic aberration correcting device of a reflection and diffraction type according to another embodiment of the present invention.
Figure 63:
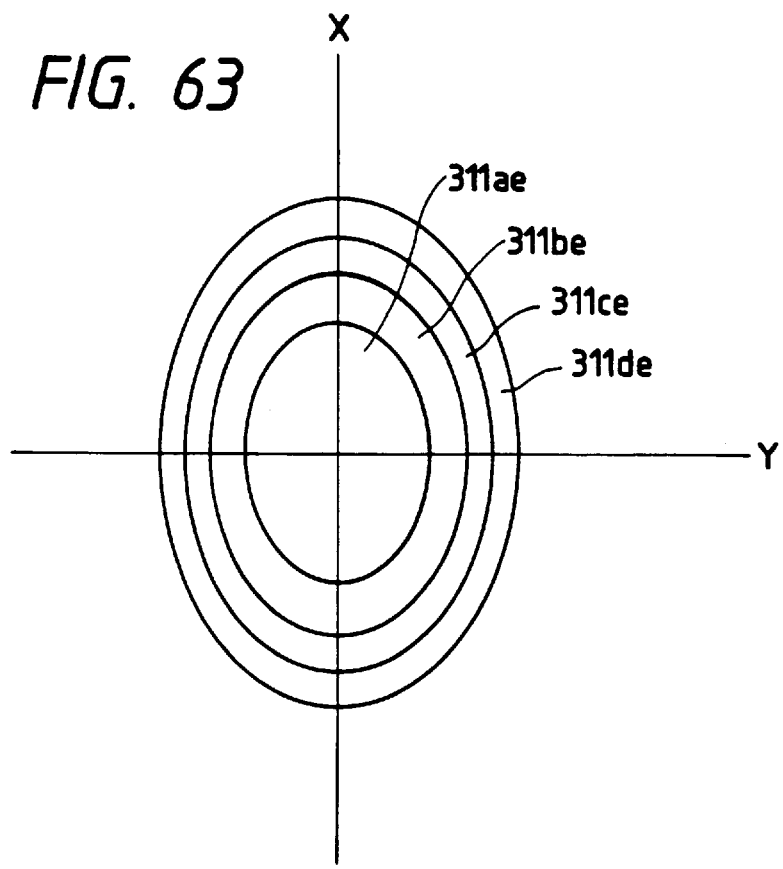
FIG. 63 is a section of FIG. 62 as it is seen in the direction indicated by arrow A.

FIGS. 62 and 63 show an example of the present invention in which the correcting device generally indicated by 311A is positioned at an angle of 450 with respect to the optical axis O. The reflecting surface of this correcting device comprises an elliptical reflecting surface 311ae which, as seen in a direction perpendicular to that reflecting surface, is positioned at the center of the optical axis O, and coaxial elliptical annular reflecting surfaces 311be, 311ce and 311de that are positioned around the central reflecting surface 311ae.

The ratio A between the major and minor axes of the ellipse is determined in such a way that each of the orthogonal projections of the reflecting surfaces 311ae–311de onto a plane perpendicular to the optical axis O will be a circle. In other words, A is $2^{1/2}$ If the ellipse defined by the elliptical reflecting surface 311ae is expressed by $(X^2/A^2)+(Y^2/1)=r^2$ (r is a constant) in an XY coordinate system, then the step distance t between the reflecting surface 311ae and the adjacent annular reflecting surface 311be and between individual annular reflecting surfaces 311be, 311ce and 311de is given by $t=\lambda \cdot 2^{1/2}$. As in the example shown in FIGS. 60 and 61, this corresponds to the case where n=1 and m=1 in the equation $t=A\lambda m/2n$ (m is an integer). Hence, the example under consideration provides entirely the same advantage as is obtained in the previous example.

The two examples discussed above concern the case where m=1; if the operating wavelength range is not very wide, the value of m may be adjusted to 2 or more when determining the step distance t and the light of mth-order diffraction may safely be used without lowering the diffraction efficiency. Particularly in the case where the width of annular segments decreases from the center outward, one may gradually increase the value of m starting from unity within a single device. In this case, the axial distance ΔX(h) of a particular annular reflecting surface from the central reflecting surface may be determined as a function of the distance h from the optical axis O by the following equation:

$$\Delta X(h)=(m\lambda/2n)\text{Int}\{[r-(1-h^2/r^2)^{1/2}]/(m\lambda/2n)]+0.5\}$$

where Int(x) is a function giving an integer not greater than x.

Figure 64:
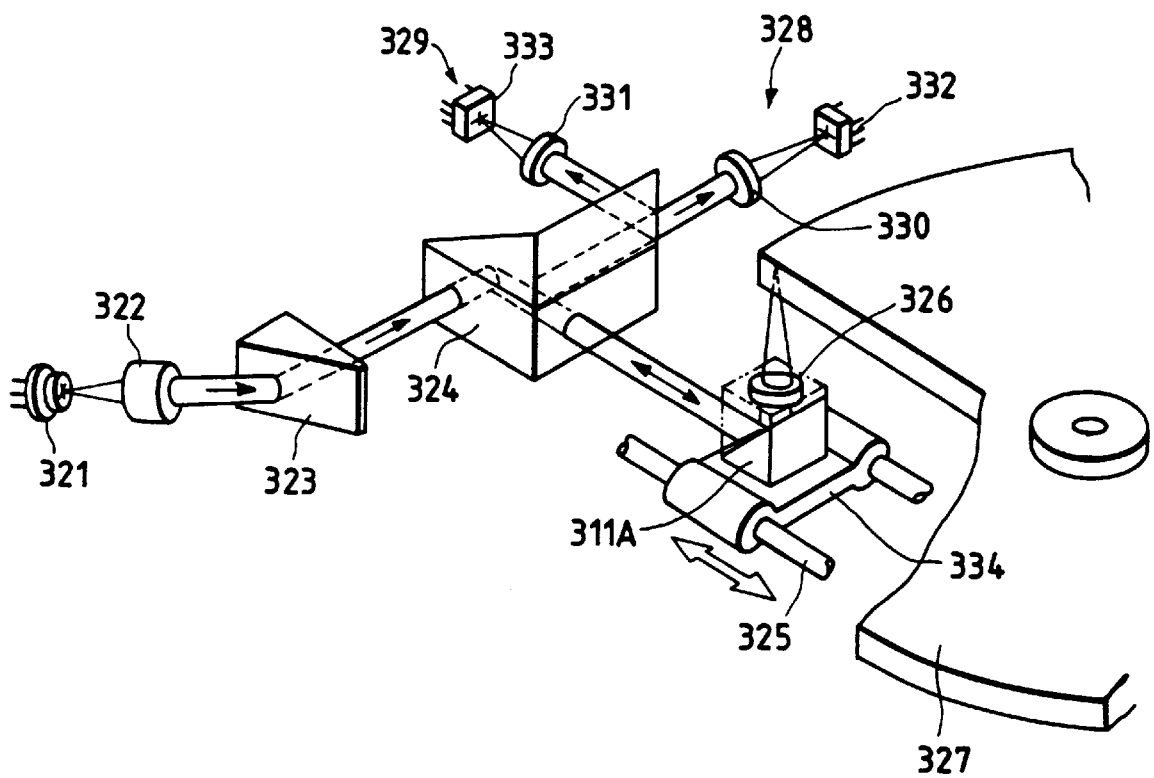
FIG. 64 is a perspective view showing an embodiment of the present invention in which the chromatic aberration correcting device of a reflection and diffraction type is applied to an optical information recording and reproducing apparatus.

FIG. 64 shows an embodiment of the present invention in which the chromatic aberration correcting device 311A of a reflection and diffraction type is applied to an optical information recording and reproducing apparatus. Laser light issuing from a laser light source 321 is collimated by a collimator lens 322, shaped by a beam shaping prism 323 to have a circular cross section and enters a beam splitter 324. Part of the separated laser light is reflected by the correcting device 311A fixed on a carriage 334 to enter an objective lens 326. The carriage 334 is slidable along guide rails 335 in the radial direction of an optical disk 327 indicated by the two-head arrow in FIG. 64. The laser light incident on the objective lens 326 is focused on the optical disk 327 and the reflected light from the disk makes reentry into the correcting device 311A which returns it to the beam splitter 324. Part of the return light passes through a lens 330 in signal reproducing optical system 328 to be supplied into a sensor 332 and the remainder passes through a lens 331 in servo optical system 329 to be supplied into a sensor 333.

Various types are known for the optical information recording and reproducing apparatus that operates in this manner and by combining the objective lens 326 (which is a single lens) with the correcting device 311A, the chromatic aberration that develops in the objective lens 326 can be effectively corrected.

On the pages that follow, the present invention is described in greater detail with reference to specific examples, all of which are intended to correct the chromatic aberration that developed in a positive objective lens.

Example 1E

Figure 65:
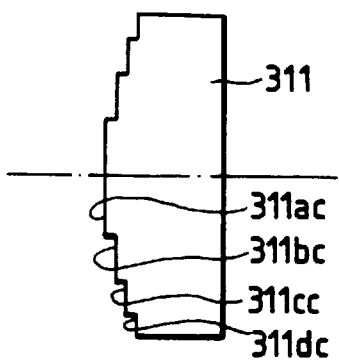
FIG. 65 is a cross-sectional view showing the first example of the chromatic aberration correcting device of a reflection and diffraction type according to the present invention.
Figure 70:
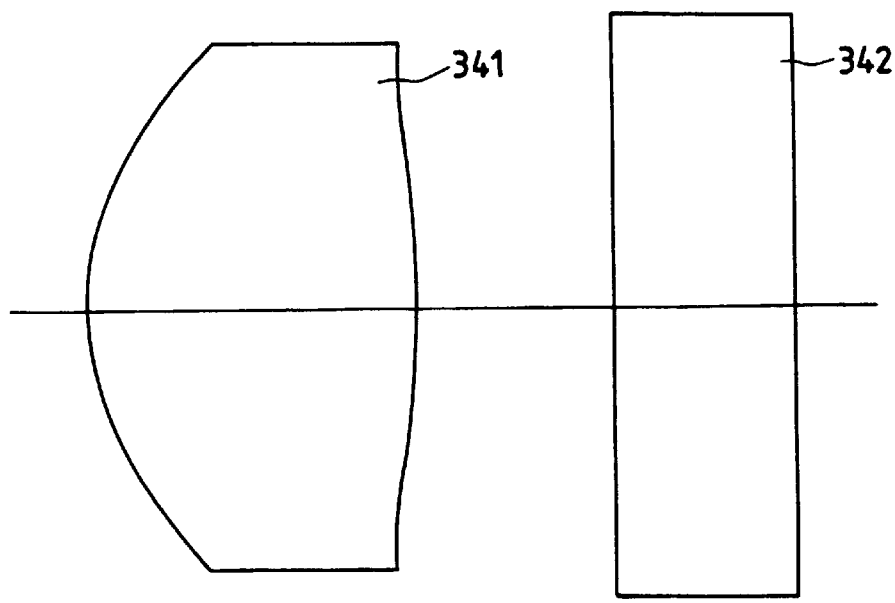
FIG. 70 is a simplified diagram showing an example of the single lens that is to be used in combination with the chromatic aberration correcting device of a reflection and diffraction type according to the present invention.

FIG. 65 shows a chromatic aberration correcting device that has a reflecting surface perpendicular to the optical axis O and which is generally indicated by 311. The device 311 is adapted to correct chromatic aberration that occurs in an objective lens having the geometry shown in FIG. 70 and the characteristics shown in FIG. 71. In FIG. 70, the objective lens is indicated by 341 and the reference numeral 342 denotes an optical disk. Parallel beams of laser light coming from a collimator lens are focused by the objective lens 341 to form a spot on the inner recording surface of the optical disk 342; hence, the objective lens 341 is equivalent to the objective lens 326 in the apparatus shown in FIG. 64.

The objective lens 341 has the following specifications:

| | |
|---|---|
| Focal length | 3.3 mm |
| Operating wavelength, (reference wavelength) | 780 nm |
| Shift in back focus in response to a change in wavelength by unit amount, $df_B/d\lambda$ | 11 μm/nm |

The numerical data for the objective lens 341 are listed in Table 1E.

Figure 71:
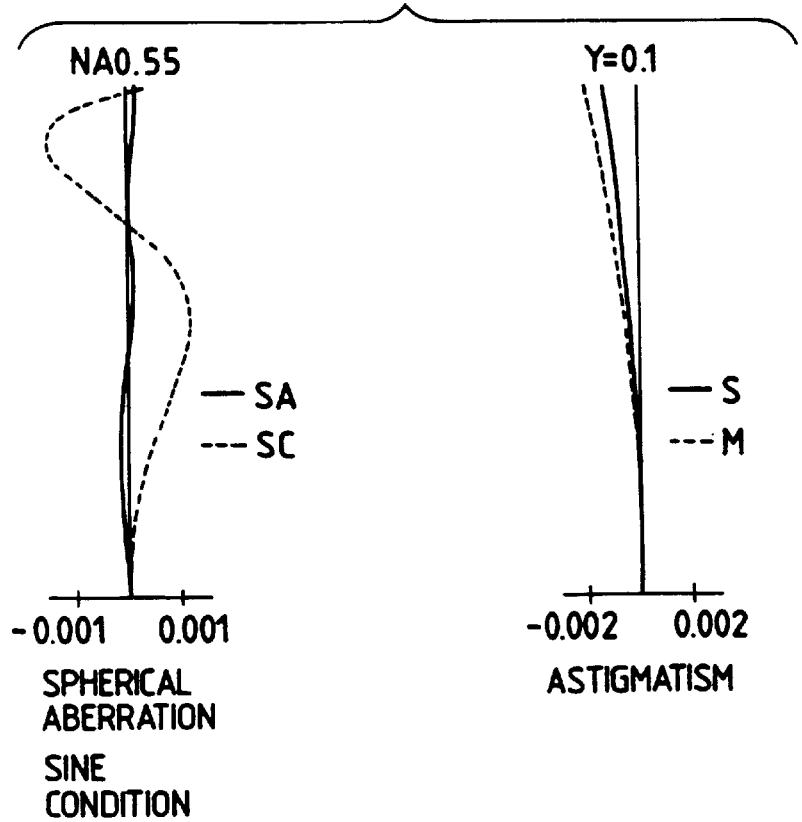
FIG. 71 is a set of graphs plotting the aberration curves obtained with the single lens shown in FIG. 70.

The symbols used in FIG. 71 have the following meanings: SA, spherical aberration; SC, sine condition; S, sagit-tal; M, meridional. In Table 1E, $r_i$ denotes the radius of curvature of an individual lens surface; $d_i$, the lens thickness or the aerial distance between individual lenses; N, refractive index.

TABLE 1E

| NA = 0.55 | F = 3.30 | ω −1.7 | |
|---|---|---|---|
| Surface No. | r | d | N |
| 1* | 2.168 | 2.230 | 1.53677 |
| 2* | −6.205 | 1.363 | |
| 3 | ∞ | 1.200 | 1.57346 |
| 4 | ∞ | | |

*denotes asphericity.

No. 1; K=−0.3265, A4=−0.2263×10⁻², A6=−0.5014×10⁻³,
 A8=−0.7162×10⁻⁵, A10=−0.3194×10⁻⁴
No. 2; K=−0.9120, A4=0.1648×10⁻¹ A6=−0.5064×10⁻²,
 A8=0.7995×10⁻³, A10=−0.4848×10⁻⁴

The correcting device 311 of Example 1E is intended for normal incidence and reflection by the obverse surface; if it is assumed that the correcting device 311 corresponds to a positive lens having a focal length of 126 mm, the power of the diffractive lens is proportional to wavelength and the chromatic aberration that develops in the objective lens 341 can be corrected. However, if the objective lens and the correcting devices are used as two separate elements, a change in their distance will cause a corresponding change in the height of ray incidence on the objective lens; to avoid this problem, the objective lens and the correcting device must be combined, in a unitary assembly. Hence, the correcting device of the present invention is designed to have a macroscopic shape that is equivalent to a negative lens having a focal length (f) of −126 mm and its reflecting surface is made planar in order to insure that first-order light will not be subjected to the refractive action of diffraction.

If reflection is obverse surface reflection in air, n=1.0 and to make a negative lens of f=−126 mm on the reflecting surface, the radius of curvature must be r=252.0 mm. If a surface having this curvature is made planar by providing planes with the axial step distance t being adjusted to λ/2=390 nm=0.390 μm, one can attain both the action of a diffractive lens having f=126 mm and the action of a refractive lens having f=−126 mm, thereby insuring that first-order light will travel in a straight path.

Stated more specifically, X(h), or the axial distance of each of the annular reflecting surfaces 311bc, 311cc and 311dc from the central reflecting surface 311ac, is expressed in a function of the distance h from the optical axis as follows:

$$\Delta X(h)=(\lambda/2n)\text{Int}\{(r-(1-h^2/r_2)^{1/2})/(\lambda/2n)]+0.5\}$$

where Int(x) is a function giving an integer not exceeding x. If those reflecting surfaces are arranged to provide a macroscopic shape expressed by that equation, one can correct the chromatic aberration that develops in the objective lens 341. Table 2E below gives data for describing the overall shape of the correcting device 311 shown in FIG. 65.

TABLE 2E

| h (mm) | ΔX (μm) |
|---|---|
| 0.000~0.313 | 0.0 |
| ~0.542 | 0.39 |
| ~0.700 | 0.78 |
| ~0.829 | 1.17 |
| ~0.940 | 1.56 |
| ~1.039 | 1.95 |
| ~1.130 | 2.34 |
| ~1.214 | 2.73 |
| ~1.292 | 3.12 |
| ~1.366 | 3.51 |
| ~1.436 | 3.90 |
| ~1.503 | 4.29 |
| ~1.567 | 4.68 |
| ~1.628 | 5.07 |
| ~1.688 | 5.46 |
| ~1.745 | 5.85 |
| ~1.800 | 6.24 |
| ~1.854 | 6.63 |
| ~1.906 | 7.02 |
| ~1.957 | 7.41 |
| ~2.007 | 7.80 |

If the correcting device 311 having this geometry is inserted in the beams of parallel light between the collimator lens and the objective lens 314 and if the reflected light from the device 311 is separated by the beam splitter, defocusing (chromatic aberration) due to the variation in the operating wavelength of the laser diode can be canceled. In other words, the chromatic aberration shown in FIG. 71 that developed in the single objective lens 314 can be effectively corrected.

Figure 69:
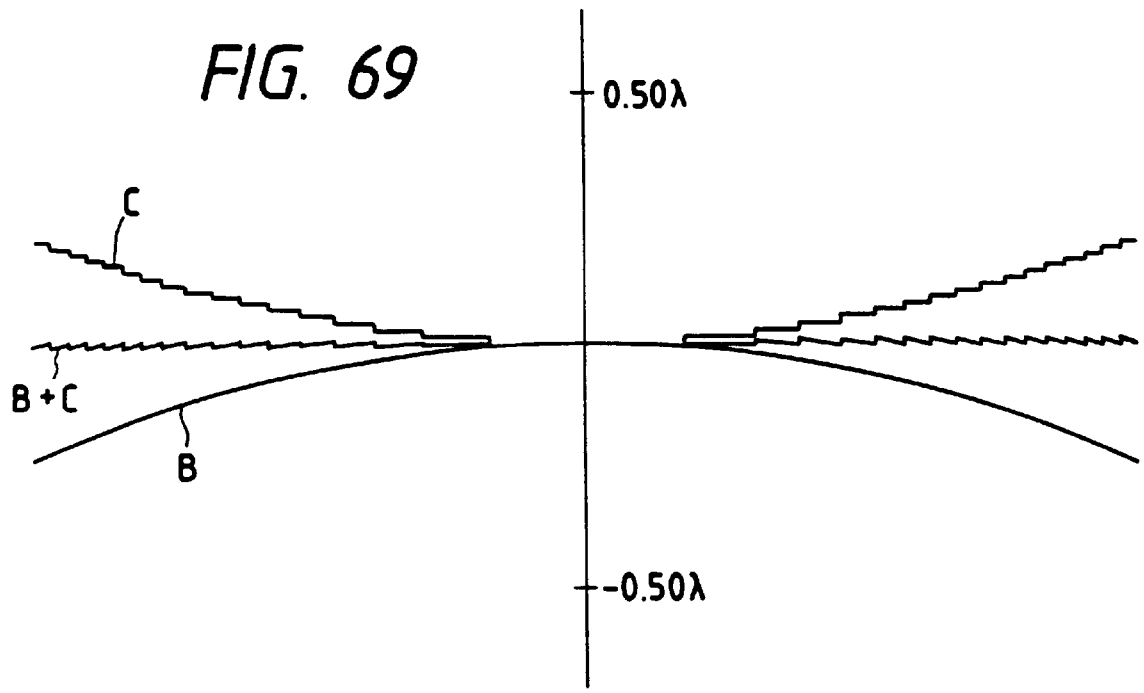
FIG. 69 shows schematically the chromatic aberration that develops in a single lens and how it is corrected by the chromatic aberration correcting device of a reflection and diffraction type according to the present invention.

FIG. 69 shows schematically the chromatic aberration that develops in the objective lens 341 and how it is corrected by the correcting device 311. If the incoming laser light has the reference wavelength λ=780 nm, the optical system works properly in that the desired image is picked up by the sensor 322 (see FIG. 64) as a result of processing through the objective lens 341 and the correcting device 311. In order words, no defocusing will occur.

However, if the wavelength of the incoming laser light changes to λ=770 nm, chromatic aberration (wavefront aberration) as show*n by curve B in FIG. 69 will develop in the objective lens 341. This wavefront aberration is more or less undercorrected in the peripheral portion of the lens. On the other hand, in response to the wavelength shift toward the shorter range, the correcting device 311 will transform the incident plane-wave light to produce a divergent wavefront. This divergent wavefront is more or less overcorrected as shown by curve C in FIG. 69. Hence, the two wavefronts cancel each other and the composite wavefront is such as to produce a desired image in focus. In other words, the chromatic aberration that develops in the objective lens 341 as a result of wavelength shift can be corrected by the correcting device 311 of the present invention.

Example 2E

In system of Example 1E, the reflected light from the correcting device 311 is separated by the beam splitter and a loss is prone to occur in the beam splitter. To solve this problem, it is preferred to position the correcting device as it is included by 45° with the optical axis as shown in FIG. 64, where the correcting device is indicated by 311A. In this case, as already described with reference to FIGS. 62 an 63, the reflecting surface of the correcting device 311A is composed of elliptical central reflecting surface 311ae and three elliptical annular reflecting surfaces 311be–311de.

Figure 66:
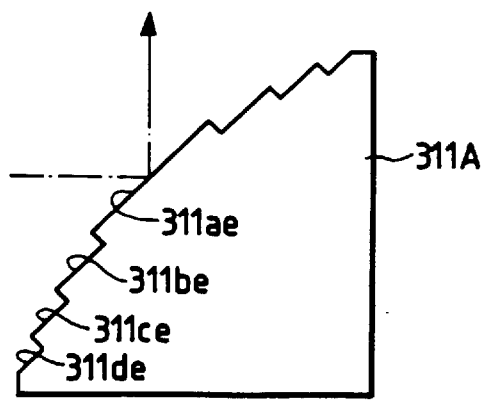
FIG. 66 is a cross-sectional view showing the second example of the chromatic aberration correcting device of a reflection and diffraction type according to the present invention.

Considering that the effective phase difference that is given to the wavefront by one step is sin 45°≅0.707, the step distance t is about 1.41 times as great as the step distance adopted in Example 1E (1/sin 45°≅1.41). Therefore, the 45° incidence correcting device 311A which performs as effectively as the device 311 of Example 1E has a geometry that is shown physically in FIG. 66 and numerically in Table 3E below.

TABLE 3E

| along minor axis h (mm) | along major axis h (mm) | ΔX (μm) |
|---|---|---|
| 0.000~0.313 | 0.000~0.443 | 0.0 |
| ~0.542 | ~0.767 | 0.55 |
| ~0.700 | ~.991 | 1.10 |
| ~0.829 | ~1.172 | 1.65 |
| ~0.940 | ~1.330 | 2.20 |
| ~1.039 | ~1.470 | 2.75 |
| ~1.130 | ~1.598 | 3.30 |
| ~1.214 | ~1.717 | 3.86 |
| ~1.292 | ~1.827 | 4.41 |
| ~1.366 | ~1.932 | 4.96 |
| ~1.436 | ~2.031 | 5.51 |
| ~1.503 | ~2.126 | 6.06 |
| ~1.567 | ~2.216 | 6.61 |
| ~1.628 | ~2.303 | 7.17 |
| ~1.688 | ~2.387 | 7.72 |
| ~1.745 | ~2.468 | 8.27 |
| ~1.800 | ~2.548 | 8.82 |
| ~1.854 | ~2.622 | 9.37 |
| ~1.906 | ~2.698 | 9.92 |
| ~1.957 | ~2.768 | 10.47 |
| ~2.007 | ~2.838 | 11.03 |

If the correcting device 311A having this geometry is inserted in the beams of parallel light between the collimator lens and the objective lens 314 (between collimator lens 322 and objective lens 326 in the case shown in FIG. 64), defocusing (chromatic aberration) due to the variation in the operating wavelength of the laser diode can be effectively canceled.

Example 3E

Figure 67:
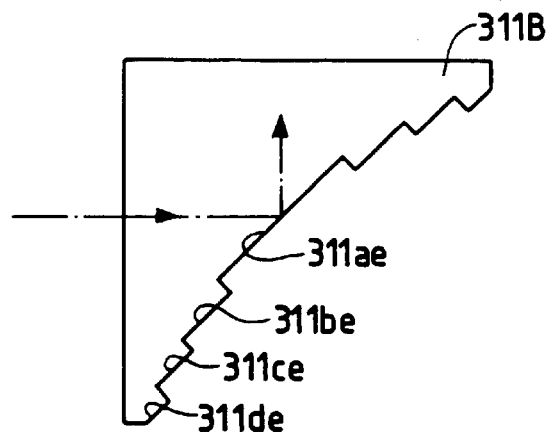
FIG. 67 is a cross-sectional view showing the third example of the chromatic aberration correcting device of a reflection and diffraction type according to the present invention.

In Examples 1E and 2E, the reflecting surface is provided on the obverse surface of the chromatic aberration correcting device. However, the chromatic aberration correcting device of the present invention may also be constructed as a reverse surface reflection type. FIG. 67 shows an example of the correcting device adapted for such reverse surface reflection, which is generally indicated by 311B in FIG. 67. The correcting device of this reverse surface reflection type has the advantage that its performance is in no way affected if dust or dirt is deposited on the steps formed on the reflecting surface on the reverse side. In the case of reverse surface reflection, the ratio of operating wavelength to refractive index decreases in the medium (n>1) and, hence, the step distance t becomes shorter than in Examples 1E and 2E (because n>1 in the equation t=λm/2n). Table 4E below shows the geometry of the reflecting surface of the 450 incidence aberration correcting device 311B that was fabricated from an optical material having n=1.51072.

TABLE 4E

| along minor axis h (mm) | along major axis h (mm) | ΔX (μm) |
|---|---|---|
| 0.000~0.313 | 0.000~0.443 | 0.0 |
| ~0.542 | ~0.767 | 0.36 |

TABLE 4E-continued

| along minor axis h (mm) | along major axis h (mm) | ΔX (μm) |
|---|---|---|
| ~0.700 | ~0.991 | 0.73 |
| ~0.829 | ~1.172 | 1.09 |
| ~0.940 | ~1.330 | 1.46 |
| ~1.039 | ~1.470 | 1.82 |
| ~1.130 | ~1.598 | 2.19 |
| ~1.214 | ~1.717 | 2.55 |
| ~1.292 | ~1.827 | 2.92 |
| ~1.366 | ~1.932 | 3.28 |
| ~1.436 | ~2.031 | 3.65 |
| ~1.503 | ~2.126 | 4.01 |
| ~1.567 | ~2.216 | 4.38 |
| ~1.628 | ~2.303 | 4.74 |
| ~1.688 | ~2.387 | 5.11 |
| ~1.745 | ~2.468 | 5.47 |
| ~1.800 | ~2.548 | 5.84 |
| ~1.854 | ~2.622 | 6.20 |
| ~1.906 | ~2.696 | 6.57 |
| ~1.957 | ~2.768 | 6.93 |
| ~2.007 | ~2.838 | 7.30 |

Example 4E

Figure 68:
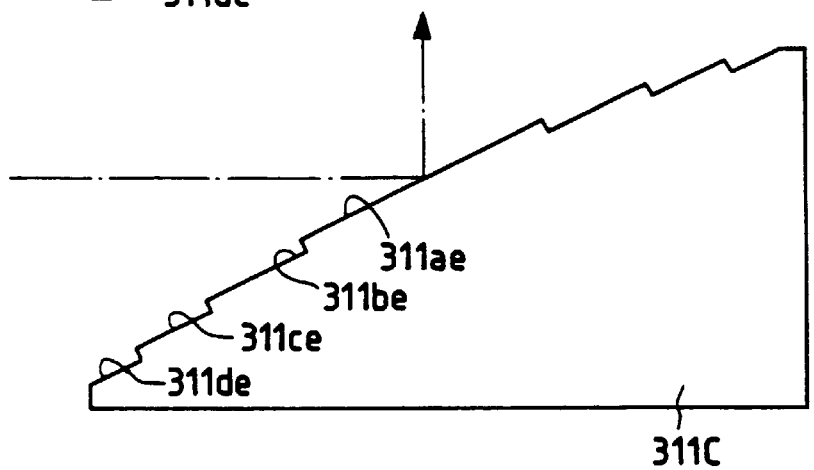
FIG. 68 is a cross-sectional view showing the fourth example of the chromatic aberration correcting device of a reflection and diffraction type according to the present invention.

The angle of incidence on the chromatic aberration correcting device of a reflection and diffraction type according to the present invention is in no way limited to 0° or 45°. All that is required is that the orthogonal projections of the central reflecting surface and the annular reflecting surfaces onto a plane perpendicular to the optical axis describe shapes that are of a rotation symmetry with respect to the optical axis which is the center of rotation. FIG. 68 and Table 5E show an example of the geometry of a chromatic aberration correcting device (which is indicated by 311C) that performs as effectively as the device of Examples 1E to 3E when the angle of incidence is 300. Since 1/sin 30°=2, the step distance t adopted in Example 4E is longer than those selected in Examples 1E to 3E; therefore, the correcting device of Example 4E has the advantage of greater ease in fabrication.

TABLE 5E

| along minor axis h (mm) | along major axis h (mm) | ΔX (μm) |
|---|---|---|
| 0.000~0.313 | 0.000~0.626 | 0.0 |
| ~0.542 | ~1.085 | 0.78 |
| ~0.700 | ~1.401 | 1.56 |
| ~0.829 | ~1.658 | 2.34 |
| ~0.940 | ~1.880 | 3.12 |
| ~1.039 | ~2.079 | 3.90 |
| ~1.130 | ~2.260 | 4.68 |
| ~1.214 | ~2.428 | 5.46 |
| ~1.292 | ~2.585 | 6.24 |
| ~1.366 | ~2.733 | 7.02 |
| ~1.436 | ~2.873 | 7.80 |
| ~1.503 | ~3.006 | 8.58 |
| ~1.567 | ~3.134 | 9.36 |
| ~1.628 | ~3.257 | 10.14 |
| ~1.688 | ~3.376 | 10.92 |
| ~1.745 | ~3.490 | 11.70 |
| ~1.800 | ~3.601 | 12.48 |
| ~1.854 | ~3.709 | 13.26 |
| ~1.906 | ~3.813 | 14.04 |
| ~1.957 | ~3.915 | 14.82 |
| ~2.007 | ~4.014 | 15.60 |

Example 5E

Figure 72:
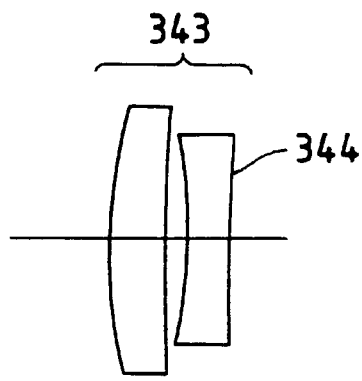
FIG. 72 is a diagram showing another lens system to which the chromatic aberration correcting device of a reflection and diffraction type according to the present invention is to be applied.
Figure 73:
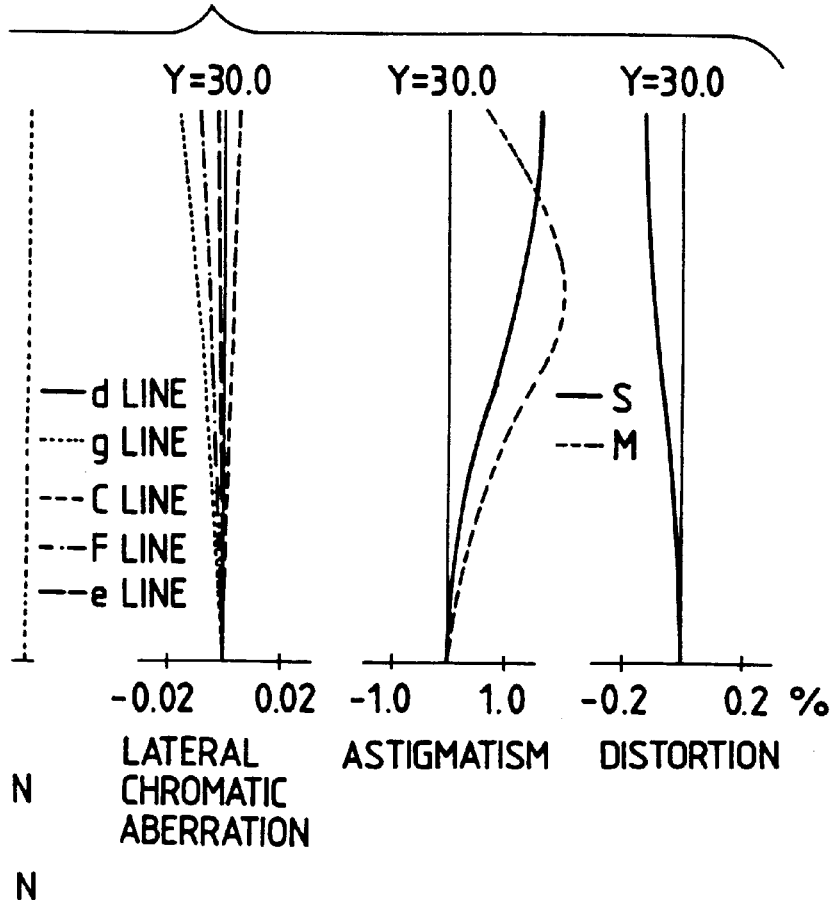
FIG. 73 is a set of graphs plotting the aberration curves obtained with the lens system shown in FIG. 72.

The chromatic aberration correcting device of a reflection and diffraction type according to the present invention may be provided in portions other than where beams of parallel light travel. In this Example 5E, the present invention is applied to the reflecting surface of a catadioptric lens as shown in FIG. 72, in which the catadioptric lens and the reflecting surface are indicated by 343 and 344, respectively. Numerical data for the catadioptric lens 343 are listed in Table 6E below and the various aberrations that are caused in that lens are shown in FIG. 73, in which d-, g-, C-, F- and e-lines refer to the chromatic aberrations as expressed in terms of spherical aberration, as well as the lateral chromatic aberrations that develop at the respective wavelengths. In Table 6E, ν denotes the Abbe number.

TABLE 6E $F_{NO} = 1:5.6$    $f = 44.68$

| Surface No. | r | d | N | ν |
|---|---|---|---|---|
| 1 | 25.000 | 3.00 | 1.77250 | 49.6 |
| 2 | 252.451 | 1.00 | | |
| 3 | −26.100 | 2.00 | 1.49176 | 57.4 |
| 4 | −800.000 | | | |

The fourth surface of this lens provides the reflecting surface 344.

The catadioptric lens 343 forms an image at a magnification of ⅙ and with this lens, the image of an abject lying above the optical axis can be focused below the axis. However, the lens is unable to achieve satisfactory correction of axial chromatic aberration and at wavelengths near 588 nm, $df_B/d\lambda$ is 7.0 μm/nm. In accordance with the theory of the present invention, the reflecting surface 344 of the lens 343 is formed of annular segments and the thus formed surface is capable of correcting the axial chromatic aberration that develops in the lens 343. In other words, the reflecting surface 344 is adapted for normal incidence and reflection by the rear surface (which is equivalent to the device shown in FIG. 65 except that the reflecting surface is adapted for reverse surface reflection as in the device shown in FIG. 67). Table 7E below shows the geometry of the reflecting surface 344 of the lens 343 that was fabricated from an optical material having n=1.49176.

TABLE 7E

| h (mm) | ΔX (μm) |
|---|---|
| 0.000~0.59 | 0.19 |
| ~1.02 | 0.39 |
| ~1.32 | 0.59 |
| ~1.56 | 0.78 |
| ~1.77 | 0.98 |
| ~1.96 | 1.18 |
| ~2.13 | 1.37 |
| ~2.29 | 1.57 |
| ~2.44 | 1.77 |
| ~2.58 | 1.96 |
| ~2.71 | 2.16 |
| ~2.84 | 2.36 |
| ~2.96 | 4.56 |
| ~3.07 | 2.75 |
| ~3.18 | 2.95 |
| ~3.29 | 3.15 |
| ~3.40 | 3.34 |
| ~3.50 | 3.54 |
| ~3.60 | 3.74 |
| ~3.69 | 3.98 |
| ~3.79 | 4.13 |
| ~3.88 | 4.33 |
| ~3.97 | 4.52 |

TABLE 7E-continued

| h (mm) | ΔX (μm) |
|---|---|
| −4.06 | 4.72 |
| −4.14 | 4.92 |
| −4.22 | 5.12 |
| −4.31 | 5.31 |

The reflecting surface having this geometry is capable of correcting the chromatic aberrations shown in 25 FIG. 73.

As described on the foregoing pages, the chromatic aberration correcting device of a reflection and diffraction type according to the present invention is fabricated from a single reflecting element and it yet is capable of effective correction of the chromatic aberration that develops in a lens being used in combination with that device. Since the reflecting element is used extensively in optical system, one only need process this reflecting element to fabricate the chromating aberration correcting device of the present invention and, hence, the desired correction of chromatic aberration can be achieved without adding any special optical elements. Furthermore, if the correcting device is used on an optical information recording and reproducing apparatus, defocusing due to the variation in the wavelength of laser light can be corrected by a low-cost system layout.

What is claimed is:

1. An optical system comprising:

a light source emitting divergent rays of light that are of substantially constant wavelength and shift over an operating wavelength range due to operating conditions;

a collimator lens placed in a path of said rays of light, said collimator lens comprising:

a first aspheric surface having a radius of curvature that increases with distance from an optical axis;

a second surface having a plurality of concentric planar rings formed thereon, each of said planar rings being perpendicular to the optical axis, said planar rings defining a diffractive surface;

wherein a thickness of said lens decreases with distance from the optical axis except at transition points of said planar rings, the thickness increasing abruptly at said transition points.

2. An optical system as claimed in claim 1, wherein the transition points are defined by the following relationship:

$$N=(Ah^2+Bh^4+C)$$

wherein N is an integer, h is the height of the planar ring from the optical axis, and A, B, and C are constants.

3. An optical system as claimed in claim 2, wherein said light source is a light emission diode device.

* * * * *

UNITED STATES PATENT AND TRADEMARK OFFICE
CERTIFICATE OF CORRECTION

PATENT NO.   : 6,118,597
DATED        : September 12, 2000
INVENTOR(S)  : Koichi MARUYAMA It is certified that error appears in the above-identified patent and that said Letters Patent is hereby corrected as shown below:

On the face page of the patent, following "Assignee"

Delete [ASAHI KOGAK KOGYO KABUSHIKI KAISHA]
    Insert --<u>ASAHI KOGAKU KOGYO KABUSHIKI KAISHA</u>--

Signed and Sealed this

Twenty-ninth Day of May, 2001

*Attest:*

NICHOLAS P. GODICI

*Attesting Officer*     *Acting Director of the United States Patent and Trademark Office*